US007128311B2

(12) United States Patent
Goto et al.

(10) Patent No.: US 7,128,311 B2
(45) Date of Patent: Oct. 31, 2006

(54) ACTIVE VIBRATION DAMPING ACTUATOR AND ACTIVE DAMPING APPARATUS USING THE SAME

(75) Inventors: Katsuhiro Goto, Inuyama (JP); Hajime Maeno, Kasugai (JP); Kazuhiko Kato, Komaki (JP); Kei Okumura, Kakamigahara (JP); Kouichi Maeda, Nishikamo-gun (JP); Tetsuo Mikasa, Wako (JP); Hirotomi Nemoto, Wako (JP); Hiroaki Ue, Wako (JP); Ken Iinuma, Wako (JP)

(73) Assignees: Tokai Rubber Industries, Ltd., Aichi-Ken (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/808,891

(22) Filed: Mar. 24, 2004

(65) Prior Publication Data

US 2004/0188905 A1 Sep. 30, 2004

(30) Foreign Application Priority Data

| Mar. 26, 2003 | (JP) | ............................. 2003-084453 |
| Mar. 26, 2003 | (JP) | ............................. 2003-084457 |
| Mar. 26, 2003 | (JP) | ............................. 2003-084464 |
| Mar. 26, 2003 | (JP) | ............................. 2003-084474 |

(51) Int. Cl.
*F16F 5/00* (2006.01)

(52) U.S. Cl. .............................................. 267/140.14

(58) Field of Classification Search ........... 267/140.13, 267/140.14, 140.11, 219, 220; 248/550, 248/636, 638
See application file for complete search history.

(56) References Cited

U.S. PATENT DOCUMENTS

| 5,730,547 | A | 3/1998 | Nogami |
| 6,113,279 | A | 9/2000 | Sawai et al. |
| 6,336,747 | B1 | 1/2002 | Sawai et al. |
| 6,406,010 | B1 | 6/2002 | Yano et al. |
| 6,422,546 | B1 * | 7/2002 | Nemoto et al. ........ 267/140.14 |
| 6,527,262 | B1 * | 3/2003 | Hagino et al. ......... 267/140.14 |

(Continued)

FOREIGN PATENT DOCUMENTS

JP 3-46035 3/1991

(Continued)

*Primary Examiner*—Robert A. Siconolfi
(74) *Attorney, Agent, or Firm*—Beyer Weaver & Thomas LLP

(57) ABSTRACT

A vibration damping actuator including: a cup-shaped housing; an output member disposed spaced apart from an opening end of the housing; a guide rod disposed on the output member and positioned inserted into a guide hole; a coil member provided to one of the housing and the output member; an armature disposed on an other of the housing and the output member, the armature being adapted to exert actuating force on the output member; an annular fixing member arranged about the output member; a support rubber plate disposed between the annular fixing member and the output member; and a positioning projection formed at an inside peripheral edge of the fixing member by projecting the inside peripheral edge of the fixing member in cylindrical configuration in an axial direction towards an inside of the housing. The positioning projection is disposed at a location situated inward by a predetermined distance from the opening of the housing for positioning the fixing member relative to the housing.

19 Claims, 12 Drawing Sheets

U.S. PATENT DOCUMENTS

| | | |
|---|---|---|
| 6,581,287 B1 | 6/2003 | Sawai et al. |
| 6,631,895 B1 * | 10/2003 | Nemoto .................. 267/140.14 |
| 6,772,615 B1 | 8/2004 | Hagiwara et al. |
| 6,785,965 B1 | 9/2004 | Sawai et al. |
| 2003/0001322 A1 | 1/2003 | Goto et al. |
| 2004/0086134 A1 | 5/2004 | Matsuoka et al. ......... 381/71.4 |

FOREIGN PATENT DOCUMENTS

| | | |
|---|---|---|
| JP | 06-117475 | 4/1994 |
| JP | 08-219224 | 8/1996 |
| JP | 9-49541 | 2/1997 |
| JP | 9-89040 | 3/1997 |
| JP | 10-078074 | 3/1998 |
| JP | 10-231886 | 9/1998 |
| JP | 10-272903 | 10/1998 |
| JP | 2000-227137 | 8/2000 |
| JP | 2001-1765 | 1/2001 |
| JP | 2001-59540 | 3/2001 |
| JP | 2001-065628 | 3/2001 |
| JP | 2002-213469 | 7/2002 |
| JP | 2002-286082 | 10/2002 |
| JP | 2003-014033 | 1/2003 |
| JP | 2004-052872 A | 2/2004 |
| JP | 2004-076819 | 3/2004 |

* cited by examiner

ACTIVE VIBRATION DAMPING ACTUATOR AND ACTIVE DAMPING APPARATUS USING THE SAME

INCORPORATED BY REFERENCE

The disclosure of Japanese Patent Application Nos. 2003-084457, 2003-084453, 2003-084464, and 2003-084474 all filed on Mar. 26, 2003 including their specifications, drawings and abstracts are incorporated herein by reference in its entirety.

BACKGROUND OF THE INVENTION

1. Field of the Invention

The present invention relates generally to a vibration damping actuator for use as an active vibration damping apparatus and to an active vibration damping apparatus employing the same, and particularly to a vibration damping actuator suitable for use in a vibration damping apparatus such as an automobile engine mount, body mount, damper, or the like, and to an active vibration damping apparatus employing the same.

2. Description of the Related Art

In order to reduce vibration in an automobile body or other component that is very expected to be vibration-damped, there have been employed vibration damping devices that typically utilize vibration attenuating means, such as a shock absorber or rubber elastic body, or alternatively vibration isolating means that utilize the spring action of a coil spring, rubber elastic body, or the like. However, all of these vibration damping devices exhibit only passive damping action, resulting in the problem of an inability to exhibit adequate damping action in instances where, for example, the vibration to be damped has a characteristics such as frequency, that varies; or in cases where advanced vibration damping is required. Accordingly, in recent years, there have been developed and researched a number of active vibration damping devices that actively and in an offsetting manner reduce vibration to be damped, by means of exerting oscillating force on the component to be damped or the vibration damping device. Examples include those disclosed in Citations 1–4 listed hereinbelow.

In such active vibration damping devices, an actuator is needed in order to generate oscillating force, and the actuator needs to have highly controllable frequency and phase as regards the oscillating force generated thereby. A vibration damping actuator appropriate for use in an active vibration damping device may employ a coil, controlling electromagnetic force or magnetic force generated by means of controlling current flow to the coil.

More specifically, as taught inter alia in Citations 1–4, a suitable design for such a vibration damping actuator typically has a guide hole extending on the center axis of a cup-shaped housing; an output member disposed spaced apart from the opening end of the housing, with the output member connected to the housing by an elastic connecting rubber part, and a guide rod disposed on the output member inserted into a guide hole; a coil member provided to either the housing or the output member; and an armature including a ferromagnetic body and/or permanent magnet disposed on the remaining housing or output member. By supplying electrical current through the coil, oscillating force is exerted on the output member by the armature, causing the output member to undergo oscillating displacement in the center axial direction of the housing, on the basis of the guiding action of the guide rod by the guide hole.

In order to actuate vibration of an output member in a high frequency range of several tens of Hz or greater, it is appropriate to employ a guide mechanism for guiding the output member in the actuation direction, and to ensure that the gap between the opposed faces of the coil member and the armature has size that is small and controlled with a high degree of accuracy.

However, where a guide rod guide mechanism relying on a guide hole, and a tiny gap structure for the output portion is employed, components on both the output member side and the housing side should be assembled with a high degree of accuracy. Therefore, when assembling the housing equipped with either the coil member or armature, and the output member affixed to the remaining coil member or armature by inserting the guide rod of the output member into the housing in the axial direction, it is necessary to take extreme care in positioning of the members in a direction perpendicular to an axis direction of the housing (hereinafter refereed to as the "axis-perpendicular direction"), leading to a tendency of increasing difficulty in assembling operation. Even after assembly, a high degree of accuracy in relative positioning of the housing and output member (guide rod, etc.) is also required in order to efficiently obtain consistent output characteristics, which has the problem of being difficult to achieve.

[Citation 1]
JP-A-9-49541
[Citation 2]
JP-A-9-89040
[Citation 3]
JP-A-10-231886
[Citation 4]
JP-A-2001-1765

SUMMARY OF THE INVENTION

It is therefore one object of the invention to provide a vibration damping actuator of novel structure, which permits an easy and consistent positioning of an output member with respect to a housing in an axis-perpendicular direction with a high degree of accuracy, even if is employed a guide rod guide mechanism needing a high precise dimensional accuracy in positioning between components on both the output member side and the housing side.

It is a further object of the invention to provide an active vibration damping mount and active vibration damper, as active vibration damping devices of novel structure constructed using such a vibration damping actuator of the invention.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first aspect of the invention relates to an active damping actuator. A first mode of the first aspect of the invention is a vibration damping actuator comprising: a cup-shaped housing having a guide hole disposed extending therethrough on a center axis thereof; an output member disposed spaced apart from an opening end of the housing; a guide rod disposed on the output member and positioned inserted into the guide hole; a coil member provided to one of the housing and the output member; an armature disposed on an other of the housing and the output member, the armature being adapted to exert actuating force on the output member by means of application of electric current to the coil member; an annular fixing member arranged about the output member with a spacing therebetween; a support rubber plate disposed in the spacing between the annular fixing member and the output member for elastically connecting the output member to the annular fixing member, an outside peripheral edge of the fixing member being caulked to an rim of an opening of the housing, whereby the output member is supported in an elastically displaceable manner by means of the housing; and a positioning projection formed at an inside peripheral edge of the fixing member by projecting the inside peripheral edge of the fixing member in cylindrical configuration in an axial direction towards an inside of the housing with a projected distal end thereof being projected in flange-like configuration toward an outside, the positioning projection provided for positioning the fixing member relatively in an axis-perpendicular direction with respect to an inner circumferential surface of the housing at a location situated inward by a predetermined distance from the opening of the housing.

With the vibration damping actuator of structure according to this mode, the fixing member, which is connected to the output member via a support rubber elastic body, is provided with a positioning projection formed at a location axially inward from the opening of the housing. With this arrangement, when the guide rod of the output member is inserted in the axial direction into the housing to assemble them, the positioning projection provides positioning action in the axis-perpendicular direction prior to the output member reaching the final assembly position relative to the housing, namely, before or at an early stage just after the guide rod is inserted into the guide hole. Accordingly, when inserting the guide rod of the output member into the guide hole of the housing to assemble them, positioning action in the axis-perpendicular direction can be afforded by the positioning projection, from the initial insertion position to the final inserted position in the axial direction.

Since the positioning action in the axis-perpendicular direction afforded by the positioning projection is creased as a result of an action of the positioning projection on the inner circumferential surface of the opening of the housing closest to the outside peripheral portion of the output member. As compared to the case where, for example, positioning in the axis-perpendicular direction occurs at a location close to the center axis, positioning in the axis-perpendicular direction can be performed with higher strength, and with an advantage in terms of high accuracy as well. Thus, the vibration damping actuator of structure according to this mode is able to carry out positioning of the output member and the housing in the axis-perpendicular direction with better stability and durability.

Moreover, since the positioning projection, when assembled, is accommodated within the interior of the housing, problems resulting from interference of other components positioned outside the housing are effectively prevented, whereby more consistent positioning action is achieved, and increased size of the actuator may be avoided as well.

A second mode of the first aspect of the invention is a vibration damping actuator according to the above-described first mode, further comprising: a compression rubber bonded on the fixing member, and clamped between the fixing member and the housing in the axial direction. In this element, caulking force exerted on the fixing member and the housing is cushioned by the compression rubber. Thus, any dimensional error of the fixing member of housing can be compensated for by elastic deformation of the compression rubber, making it possible to exert a consistent level of caulking force. Additionally, infiltration of foreign matter, such as water or dust, from the outside into the housing is prevented by the sealing function of the compression rubber, so that stability of operation may be improved as well, since the guide mechanism having small gap dimensions is equipped with the housing. By means of the compression rubber being interposed and compressed between the fixing member and the housing, it is possible to increase frictional resistance to relative rotation of the fixing member and the housing in the circumferential direction. Thus, an additional advantage is that mispositioning is prevented in cases where there is specified a relative positional relationship in the circumferential direction between the output member side and the housing side.

In this mode, in order to adjust or set the level of clamping force exerted on the compression rubber in the axial direction, it is preferable to provide a spacer member for regulating the dimensions of the gap between the opposed faces of the fixing member and the housing which compress or clamp the compression rubber. More preferably, the spacer member will be formed by means of an annular projection integrally formed projecting from either the fixing member and the housing, towards the other member.

A third mode of the first aspect of the invention is a vibration damping actuator according to the above-described second mode, wherein the compression rubber abuts the housing in the axis-perpendicular direction at a location further inward from the opening of the housing so that clamping force is exerted on the compression rubber in the axial direction and the axis-perpendicular direction between the fixing member and the housing. In this element, by clamping the compression rubber between the fixing member and the housing in the axis-perpendicular direction, improvement in the accuracy of positioning of the fixing member and the housing in the axis-perpendicular direction and improvement in positioning strength in the circumferential direction may be achieved. In particular, as positioning of the positioning projection of the fixing member with respect to the housing in the axis-perpendicular direction represents positioning of metal components, a small gap is preferable when the assembly operation, machining precision, and the like are taken into consideration. Accordingly, by utilizing the positioning action in the axis-perpendicular direction afforded by the compression rubber according to this element, it is possible to realize a higher level of positioning accuracy. In this instance as well, control of mispositioning of the fixing member and the housing in the axis-perpendicular direction may be achieved with adequate strength by means of metal-to-metal abutment by the housing and positioning projection at the final position.

In this element in particular, the positioning projection and caulking location at the two axial ends of the fixing member are each formed projecting in flange configuration outwardly in the diametrical direction; and an annular groove element space open at the outside peripheral face and extending in the circumferential direction, formed between the axially juxtaposed faces of the caulked location and positioning projection, is utilized for formation and placement of a compression rubber thereat, whereby a compression rubber clamped between the fixing member and the housing may be realized while utilizing space effectively.

A fourth mode of the first aspect of the invention is a vibration damping actuator according to any one of the above-described first through third modes, wherein a housing flange is formed on the rim of the opening of the housing, and the outside peripheral edge of the fixing member is placed over the housing flange, with a overlapped portion of the housing flange and fixing member being caulked by means of a caulking member which is separate from both the housing flange and the fixing member. In this mode, it is possible to overlap the housing flange of the housing and the fixing member in sufficiently stable manner in the axial direction, and to caulk these more securely.

A second aspect of the invention relates to an active vibration damping mount. A first mode of the second aspect of the invention is an active vibration damping mount comprising: a first mounting member fixable to one of two members that are mutually connected to make up a vibration transmission system; a second mounting member fixable to an other one of the two members; a rubber elastic body connecting the first and second mounting members and partially defining a pressure receiving chamber which has a non-compressible fluid sealed therein; an oscillating member partially defining the pressure receiving chamber; and an actuator for exerting oscillation force on the oscillating member so that oscillation of the oscillating member is actuated by means of the actuator in order to control pressure in the pressure receiving chamber, wherein the actuator comprises a vibration damping actuator according to the above described first through fourth modes of the first aspect of the invention, and the housing of the vibration damping actuator is fixed to the second mounting member, while the oscillating member constituted by means of the output member of the vibration damping actuator. According to this aspect of the present invention, it is possible to effectively realize an active vibration damping mount suitable for use as an automobile engine mount, for example.

In conventional active vibration damping mounts, as disclosed inter alia in JP-A-2000-227137 and JP-A-2002-286082, typically, a first mounting member is disposed a distance apart from one open end of a second mounting member of generally cylindrical configuration, and the first mounting member and the second mounting member are connected by a rubber elastic body, whereby one opening of the second mounting member is sealed off fluid-tightly. At the other opening of the second mounting member a shoulder portion is provided and a large-diameter caulking sleeve portion is integrally formed, and a lid member is caulked by means of the caulking sleeve portion to provide fluid-tight closure to the other opening of the second mounting member, thereby forming between the rubber elastic body and the lid member a fluid chamber in which is sealed a non-compressible fluid.

When attaching the actuator to the second mounting member, it would be conceivable, as taught in the aforementioned Citations 1 and 2 for example, to caulk the housing flange, provided on the actuator housing, together with the lid member by means of the caulking sleeve portion of the second mounting member.

However, where the actuator housing is caulked directly to the second mounting member, vibration of a vibrating member exerted on the second mounting member will be transmitted directly to the actuator, leading to a likelihood of adverse effects of input vibration on the durability and accuracy of assembly of the actuator. Particularly, in the case of an actuator whose output portion is actuated with a very small gap dimension, such as electromagnetic actuating means, there is a risk of adverse effects on stability of output characteristics as well.

Additionally, as the number of caulked components at caulking locations to the second mounting member increases, it becomes correspondingly more difficult to achieve consistent levels of caulking force due to cumulative dimensional accuracy of the components or the like.

Accordingly, a second mode of the second aspect of the invention relating to an active vibration damping mount has as an object to provide an active vibration damping mount of novel structure, which is able to caulk the lid member or similar member to the second mounting member with a consistently high degree of accuracy, and able to provide cushioned assembly of an active controlling actuator to the second mounting member, by means of a simple structure.

The second mode of the second aspect of the invention is an active vibration damping mount according to the above-described first mode, further comprising: a large-diameter caulking sleeve portion integrally formed at an other opening of the second mounting member and providing a shoulder portion; a lid member including an annular fixing member bonded to an outside peripheral portion of a support rubber plate having an oscillating plate bonded to a central portion thereof, the lid member being disposed at an other opening of the second mounting member, and the fixing member is press-fitted into the caulking sleeve portion, superimposed against the shoulder portion, and fixedly caulked, thereby providing a fluid-tight closure to the other opening of the second mounting member and forming between the rubber elastic body and the lid member a fluid chamber having the non-compressible fluid sealed therein; a cylindrical base bracket comprising a bracket flange at one opening thereof, the bracket flange being superimposed against the fixing member from an outside of the one opening onto the fixing member, and caulked therewith by means of the caulking sleeve portion, thereby attaching the base bracket to the second mounting member; and an annular press-fit portion formed by bending an outside peripheral edge of the fixing member towards the base bracket side, with a projecting distal end face thereof being superimposed directly against the outside peripheral face of the bracket flange in the axial direction, wherein the actuator is disposed to an opposite side of the oscillating plate from the fluid chamber, with the housing of the actuator extending out in a cylindrical configuration toward the fixing member and the housing flange disposed at the opening thereof supported, with caulking force exerted thereon via a compression rubber, while clamped between the fixing member and the bracket flange of the base bracket in the portion located on the inner peripheral side of the annular press-fit portion.

In the active vibration damping mount constructed according to this mode, the bracket flange of the base bracket for mounting the second mounting member onto one of the members to be connected in a vibration-damped manner is caulked together with the fixing member of the lid member. Further, the actuator housing is supported clamped, in cushion-wise fashion via the compression rubber, between the bracket flange and the fixing member. Accordingly, transmission of vibration from the second mounting member to the actuator is moderated or minimized on the basis of the elasticity of the compression rubber, thereby minimizing or eliminating problems which could result from direct vibration transmission to the actuator.

Also in this mode, the outside peripheral edge of the fixing member constitutes an annular press-fit portion having press fitting face that is made large in the axial direction vis-á-vis the caulking sleeve portion. Therefore, when, for example, the lid member is attached to the second mounting member (one of whose openings in the axial direction has already been provided closure by a rubber elastic body) while immersed in a mass of a non-compressible fluid, the press-fitting area of the fixing member can be advantageously assured, while the other opening of the second mounting member can be provided fluid-tight closure by means of the lid member. By means of this arrangement, the fluid-tightness of the fluid chamber can be consistently assured, after the assembly produced by press-fitting the fixing member of the second mounting member and attaching the lid member has been withdrawn from the mass of the non-compressible fluid, whereby attachment of the actuator housing and the base bracket as well as caulking of the caulking sleeve portion can be carried out in the air, thus facilitating the assembly procedure.

Additionally, since the annular press-fit portion projected from the outside peripheral edge of the fixing member is subjected to caulking force exerted in the axial direction by the caulking sleeve portion via the bracket flange of the base bracket, a caulking sleeve portion mating area is advantageously assured at the bracket flange of the base bracket. This arrangement makes it possible to prevent unstable deformation of the caulking sleeve portion during the caulking process, whereby effective and consistent caulking force can be exerted by the caulking sleeve portion, even in the case of a thin-walled annular press-fit portion or the like, so that, overall, effective caulking force can be caused to act on the components.

A third mode of the second aspect of the invention is an active vibration damping mount according to the above-described first or second mode, further comprising: an elastic body outer member bonded by vulcanization to an outside peripheral portion of the rubber elastic body, wherein an outside peripheral edge portion of the elastic body outer member is interposed between the shoulder portion of the second mounting member and the fixing member, and caulked by means of the caulking sleeve portion, thereby fastening the outside peripheral edge portion of the rubber elastic body to the second mounting member. In this mode, the second mounting member comprising a caulking sleeve portion is formed separately from the rubber elastic body, so that subsequent fastening of the second mounting member thereto can be done after vulcanization molding of the rubber elastic body, thereby improving the degree of freedom in design of the second mounting member and the rubber elastic body.

A fourth mode of the second aspect of the invention is an active vibration damping mount according to the above-described second or third mode, further comprising: a flexible rubber layer disposed straddling the first mounting member and the second mounting member to the outside of the rubber elastic body; an equilibrium chamber of variable volume partially defined by flexible rubber layer and having the non-compressible fluid sealed therein, the equilibrium chamber being disposed on an opposite side of the rubber elastic body from the fluid chamber; and an orifice passage permitting a fluid communication between the fluid chamber and the equilibrium chamber. In this mode, passive vibration damping action can be obtained on the basis of resonance or flow action of the fluid flowing between the pressure receiving chamber and equilibrium chamber during vibration input.

The fourth mode of the second aspect of the invention is favorably employed in combination with the above-described third mode. In this case, further employed is an elastic body inner member that is bonded by vulcanization to the central portion of the rubber elastic body, and the rubber elastic body is post-fixed to the first mounting member by means of the elastic body inner member. This makes it easy to advantageously provide a structure wherein a diaphragm composed of a thin rubber layer separately from the rubber elastic body is formed straddling the first mounting member and the second mounting member, and bonded by vulcanization to the two members, while being arranged so as to cover the rubber elastic body. In this mode, the orifice passage through which the pressure receiving chamber and equilibrium chamber communicate with each other another is advantageously formed at the diametrically opposed faces of the elastic body outer member and the second mounting member, for example.

A fifth mode of the second aspect of the invention is an active vibration damping mount according to the above-described third or fourth modes, further comprising a partition member of smaller diameter than the shoulder portion in the second fixing member, the partition member being disposed accommodated within the fluid chamber; with an outside peripheral edge portion of the partition member being sandwiched between the elastic body outer member and the fixing member and subjected to caulking force via a compression rubber to clamp and support the partition member, thereby partitioning the fluid chamber into a pressure receiving chamber on one side of the partition member partially defined by the rubber elastic body and adapted to give rise to pressure fluctuations during vibration input, and an oscillating chamber on an other side of the partition member partially defined by the oscillating plate and adapted to be pressure-controlled by means of oscillatory actuation of the oscillating plate, the pressure receiving chamber and the oscillating chamber being held in fluid communication via a pressure transmission passage.

In this mode, the partition member dividing the pressure receiving chamber from the oscillating chamber can be attached utilizing the caulking location for the second mounting member. In particular, the partition member is caulked to the second mounting member elastically and indirectly sandwiching the compression rubber via the elastic body outer member and the fixing member, without the partition member caulked between the shoulder portion and the caulking sleeve portion while directly abutting the metal members. Therefore, the axial dimension of the caulking location, produced by assembling the partition member, between the shoulder portion and caulking sleeve portion does not become large, and the effects of dimensional error of the partition member may be avoided, whereby the partition member may be assembled while effectively ensuring consistent fixation accuracy.

A sixth mode of the second aspect of the invention is an active vibration damping mount according to the above-described second through fifth modes, wherein the compression rubber is bonded on and covering a flange-portion-side face of the fixing member at a location a predetermined distance away inwardly from the annular press-fit portion on a face at the flange portion side of the actuator with respect to the fixing member. This mode makes it possible to easily form a compression rubber at the same time as the support rubber plate formed covering the fixing member.

As taught in JP-A-2002-286082, a typical conventional active vibration damping mount or similar fluid-filled vibration damping apparatus has a structure wherein a first mounting member is disposed spaced apart from one opening of a second mounting member of generally cylindrical configuration, the first mounting member and the second mounting member are connected by means of a rubber elastic body thereby to provide fluid-tight closure to the one opening of the second mounting member, while a shoulder portion is formed to provide an integrally formed caulking sleeve portion at the other opening of the second mounting member. By means of the calking sleeve portion, an outside peripheral edge of the lid member is caulked to provide fluid-tight closure at the other opening of the second mounting member, thereby forming between the rubber elastic body and lid member a fluid chamber in which a noncompressible fluid is sealed.

As disclosed in JP-A-2002-286082, typically, in the second mounting member a bracket flange disposed at one opening of a base bracket of cylindrical configuration is superimposed against and caulked to a caulking sleeve portion to which the peripheral edge portion of a lid member has been caulked, and the second mounting member is mounted on a member to be vibration-damped, such as a vehicle body, via this base bracket.

In a fluid-filled vibration damping apparatus of the type described above, as taught in the above mentioned reference as well, a stop mechanism is typically employed to limit the amount of relative displacement of the first mounting member and second mounting member. The stop mechanism is advantageously composed by disposing a stopper fixing projection to the outer peripheral side from the second mounting member, by welding to or integrally forming with the second mounting member. A stop member is fixed to the stopper fixing projection positioned in opposition of the first mounting member in the direction of vibrational load input, and exhibiting a stop function by coming into abutment with the first mounting member.

In order to realize a stop function in the rebound direction to limit the amount of relative separation-wise displacement of the first mounting member and second mounting member in the axial direction, in this type of apparatus, the stop member is bolted to the stopper fixing projection of the second mounting member during the final assembly step. Incidentally, when the fixing bolt for the stop member is tightened with the tightening reaction force of the bolt being taken by base bracket caulked to the second mounting member, it is difficult to produce an adequate level of tightening reaction force, and in some instances the base bracket will slip out of position in the circumferential direction relative to the second mounting member, making a bolt tightening procedure cumbersome.

As a result of extensive research and detailed examination of the problem, the inventors arrived at the conclusion that there are special circumstances regarding the caulking structure in the caulking sleeve portion of the second mounting member, which require remediation. Namely, in the caulking sleeve portion, the lid member and the base bracket are assembled in a superimposed configuration. In particular, the caulked outside peripheral edge portion of the lid member is composed of an annular fixing member, and has been press-fit to the caulking sleeve portion while immersed in noncompressible fluid in order to fill and seal non-compressible fluid in the fluid chamber, whereafter the entire assembly, including the second mounting member, is withdrawn from the non-compressible fluid and the base bracket attached under the air, followed by the step of caulking to the caulking sleeve portion.

For the purpose of increasing the press-fit area vis-á-vis the caulking sleeve portion in order to provided the fluid chamber with consistent liquid-tightness, the outside peripheral edge portion of the lid member typically has integrally formed thereon an annular press-fit portion raised up by bending to one side in the axial direction.

Where a press-fit portion of this kind is formed on the fixing member, the caulking force exerted in the axial direction on the fixing member between the shoulder portion and the caulking sleeve portion acts exclusively on the narrow projecting distal end in the press-fit portion. Particularly where, as taught in Citation 1, the press-fit portion projects towards the shoulder portion side, the peripheral edge portion of the shoulder portion abutted by the projecting distal end of the press-fit portion constitutes a curved portion where the caulking sleeve portion rises up from the shoulder portion. Accordingly, the condition of abutment becomes unstable, resulting in the problem of difficultly in producing stable caulking force at fixing member of the lid member, or at the base bracket.

Additionally, with the press-fit portion formed on the fixing member, a space is formed between the fixing member and the shoulder portion on the inner peripheral side of the press-fit portion. Even if, for example, a rubber elastic body or the like were packed into this space, when subjected to a high level of caulking force during the caulking operation, inconsistent deformation thereof against the shoulder portion or caulking sleeve portion would nevertheless tend to occur due to the presence of this space. This reveals a problem of increased difficulty in producing a consistent level of caulking force.

The inventors then made the new discovery that, as a result of an insufficient level of caulking force of the bracket to the second mounting member due to structural causes in the caulking portion as described above, the problem of slippage of the base bracket relative to the second mounting member in the circumferential direction tends to occur during tightening of the bolt to affix the stop member as described above. Also, the inventor also arrived at discovery of a new issue, namely, that such slippage occurring the circumferential direction vis-á-vis the caulking area poses the risk of damaging the seal rubber interposed in the caulking area, thereby diminishing the liquid-tightness of the fluid chamber and the reliability thereof.

Accordingly, it is an object of a seventh mode of the invention relating to an active vibration damping mount to provide an active vibration damping mount of novel structure, whereby it is possible to effect caulking to the shoulder portion while ensuring an adequate level of fluid-tightness in the press-fit area of the fixing member of the lid member to the caulking sleeve portion of the second mounting member, thereby providing a consistently high level of caulking force acting on the bracket flange of the base bracket.

A seventh mode of the second aspect of the invention is an active vibration damping mount according to the above-described first mode, wherein the first mounting member is disposed spaced apart from one opening of the second mounting member of generally cylindrical configuration, with the first mounting member and the second mounting member being connected by means of the rubber elastic body to provide fluid-tight closure to the one opening of the second mounting member, while a shoulder portion at an other opening of the second mounting member is disposed to integrally form a caulking sleeve portion, the mount further comprising: a lid member including an annular fixing member that is press-fit at an outside peripheral edge thereof into the caulking sleeve portion, and superimposed and caulked against the shoulder portion to provide fluid-tight closure to the other opening of the second mounting member, thereby forming between the rubber elastic body and the lid member a fluid chamber in which a non-compressible fluid is sealed; a cylindrical base bracket disposed at one opening thereof with a bracket flange portion thereof being superimposed against the fixing member from the outside of the other opening of the second mounting member and, together with the fixing member, caulked by means of the caulking sleeve portion to attach the second mounting member; and a stopper fixing projection disposed projecting to an outer peripheral side in the second mounting member, the stopper fixing projection having a stop member bolted thereto for limiting an amount of relative displacement of the first mounting member and the second mounting member, wherein the outside peripheral edge portion of the fixing member is bent towards a base bracket side to form an annular press-fit portion, and a projecting distal end face of the annular press-fit portion is superimposed directly in the axial direction against an outside peripheral edge portion of the bracket flange, while an outer peripheral corner of one of opposite face of the bracket flange remote from the fixing member is subjected to chamfering around an entire circumference in the circumferential direction, over a width dimension smaller than a thickness dimension of the annular press-fit portion.

In the active vibration damping mount constructed according to this mode, the annular press-fit portion that projects towards the base bracket side is formed on the outside peripheral edge of the fixing member in the lid member, thereby making it possible to advantageously ensure the press-fit area with respect to the caulking sleeve portion of the second mounting member, and obtain good fluid-tightness at the press-fit area thereby. When press-fitting the annular press-fit portion into the caulking sleeve portion, the annular press-fit portion can be press fit easily into the caulking sleeve portion by utilizing as a guide face the rounded face formed on the curving outer peripheral face of the annular press-fit portion that rises up from the fixing portion, thus facilitating the assembly process.

In this mode, the projecting distal end face of the annular press-fit portion of the fixing member is superimposed directly against the bracket flange of the base bracket. This base bracket is formed with sufficient rigidity, since it is a strong member on the transmission path of load exerted from the outside. Thus, even where the distal end face of the annular press-fit portion abutting against the bracket flange of the base bracket is subjected to large load exerted locally on the bracket flange over a narrow width during the caulking process or the like, deformation of the base bracket can be prevented to a sufficient degree, and the caulking force of the caulking sleeve portion can be made to act effectively and consistently on both the fixing member and the bracket flange, so that strong, stable caulking may be achieved. Additionally, since the face of the shoulder portion of the fixing member does not have a projecting annular press-fit portion and is superimposed directly, or indirectly via another interposed member, against the shoulder portion over a sufficiently wide area, a consistent level of effective caulking force can be exerted.

According to this mode, the outside peripheral edge portion of the bracket flange is subjected to chamfering at the outer peripheral corner opposed to the abutting face of the annular press-fit portion. By means of this arrangement, even if high caulking load should be exerted on the caulking sleeve portion during the caulking process, the caulking sleeve portion will not undergo localized thinning and loss of strength of durability due to a sharp corner at the outer peripheral corner portion, so that a high level of caulking strength can be achieved more advantageously and efficiently.

Additionally, the chamfered face is formed with a width dimension smaller than the width dimension at the distal end of the annular press-fit portion superimposed against the bracket flange. With this arrangement, even if chamfering should produce a gap between the bracket flange and caulking sleeve portion, there will be no significant drop in the caulking force exerted on the annular press-fit portion by the caulking sleeve portion via the bracket flange, and a consistently high level of caulking force can be made to act on both the fixing member and base bracket.

Additionally, while the chamfered face formed on the bracket flange of the base bracket can also employ a rounded chamber having a curved outside peripheral face, when ease of machining and stability of shape are taken into consideration, a flat C chamfer is preferable. Specific chamfer dimensions will depend on the material and dimensions of the members employed, but typically, in order to hold the reduction in thickness to a level posing no problems for the caulking sleeve portion during the caulking process, it is preferable to form a chamfer having width dimension of 0.2 mm or greater. In terms of effectively exerting caulking force, it is preferable to form a chamfer having width dimension of 0.5 mm or less. In order to more effectively exert caulking force on the annular press-fit portion, it is preferable to form a chamfer having width dimension equivalent to ½ or less the width dimension of the distal end face of the annular press-fit portion (typically, the thickness dimension of the fixing member).

A eighth mode of the second aspect of the invention is an active vibration damping mount according to the above-described seventh mode, wherein the lid member has a structure in which the fixing member bonded by vulcanization to an outside peripheral edge portion of a readily deformable, flexible rubber layer, and in the fluid chamber is housed a partition member spreading in a generally axis-perpendicular direction, with an outside peripheral edge portion of the partition member caulked to the second fixing member by means of the caulking sleeve portion, thereby forming to one side of the partition member the pressure receiving chamber, and forming to the other side of the partition member an equilibrium chamber partially defined by the flexible rubber layer and designed to readily allow change in volume, the partition member being utilized to form an orifice passage through which the pressure receiving chamber and the equilibrium chamber are held in fluid communication with each other. In the active vibration damping mount according to this mode, during vibration input across the first mounting member and second mounting member, passive vibration damping action is achieved on the basis of resonance or flow action of the fluid caused to flow through the orifice passage on the basis of relative pressure fluctuations created between the pressure receiving chamber and the equilibrium chamber.

A ninth mode of the second aspect of the invention is an active vibration damping mount according to the above-described seventh mode, wherein the lid member includes an oscillating plate elastically connected to the fixing member by a support rubber plate, and the actuator that actuates oscillation of the oscillating plate is arranged on an opposite side of the lid member from the fluid chamber, with a cylindrical portion of the housing of the actuator extending towards a lid member side and having a housing flange formed on the opening rim thereof, the housing flange being arranged to an inner peripheral side of the annular press-fit portion of the fixing member, and supported in the axial direction by being clamped via a compression rubber, between the fixing member and the bracket flange of the base bracket.

In this mode, by actuating oscillation of an oscillating plate while controlling the actuator depending on the frequency and phase of input vibration to be damped, it is possible to control pressure in the fluid chamber to achieve relative and positive damping action. Also, by retaining the actuator housing clamped via the compression rubber, between the fixing member and the base bracket, at the caulking location the space formed between the fixing member and the base bracket at the inner peripheral side of the annular press-fit portion and the caulking force exerted on the fixing member and the base bracket can be skillfully utilized to attach the actuator. Additionally, since any dimensional error of the actuator housing is absorbed by the compression rubber, adverse effects on dimensional error of the caulking location resulting from clamping the actuator housing can be avoided, ensuring a consistent level of effective caulking force exerted on the fixing member and the base bracket.

A tenth mode of the second aspect of the invention is an active vibration damping mount according to the above-described ninth mode, wherein a partition member extending in the generally axis-perpendicular direction is housed in the fluid chamber, with an outside peripheral edge portion of the partition member caulked to the second fixing member by means of the caulking sleeve portion, thereby forming to one side of the partition member the pressure receiving chamber, and forming to an other side of the partition member an oscillating chamber that is pressure-controlled by means of oscillating action of the oscillating plate, the partition member being utilized to form a pressure transmission passage whereby pressure in the oscillating chamber is exerted on the pressure receiving chamber. In this mode, pressure fluctuations created in the oscillating chamber by means of oscillating action of the oscillating plate are exerted on the pressure receiving chamber in association with fluid flow through the pressure transmission passage, whereby pressure control of the pressure receiving chamber can be carried or more efficiently, utilizing resonance action or the like on the part to the fluid flowing through the pressure transmission passage.

An eleventh mode of the second aspect of the invention is an active vibration damping mount according to the any one of the above-described seventh through tenth modes, further comprising; an elastic body outer member bonded by vulcanization to an outer peripheral portion of the rubber elastic body, with an outside peripheral edge portion of the elastic body outer member superimposed against the shoulder portion of the second mounting member, and with the partition member and the fixing member sequentially superimposed against the elastic body outer member and caulked thereto by means of the caulking sleeve portion, for supporting an outside peripheral edge of the partition member between the elastic body outer member and the fixing member, at a location spaced apart inwardly in a diametrical direction from the shoulder portion of the second mounting member.

According to this mode, in addition to the fixing member and the base bracket, the elastic body outer member and partition member may also be caulked by means of the caulking sleeve portion of the second mounting member. In particular, since the outside peripheral edge of the partition member is situated at a location inwardly from the shoulder portion and fixed through caulking force exerted indirectly via the elastic body outer member and the fixing member, increase in axial dimension of the caulking location due to the stepped portion and caulking sleeve portion can be held in check, and workability in caulking operations advantageously assured.

According to this mode, the rubber elastic body is post-fixed to the second mounting member by means of the elastic body outer member. Therefore, by employing a structure wherein, for example, an elastic body inner member is bonded by vulcanization to a central portion of the rubber elastic body and the rubber elastic body then post-fixed to the first mounting member by means of the elastic body inner member, a diaphragm composed of thin rubber layer, formed separately from the rubber elastic body, can be bonded by vulcanization to the first mounting member and the second mounting member while arranged straddling between the two mounting members and covering the rubber elastic body. This makes it possible to seal non-compressible fluid between the rubber elastic body and the diaphragm to form a variable-volume equilibrium chamber. In this mode, as compared to the case where the equilibrium chamber is formed on the opposite side of the partition member from the pressure receiving chamber as in the structure pertaining to the mode eighth for example, the distance separating the first mounting member and second mounting member in the axial direction can be made smaller so that the vibration damping apparatus has more compact size in the axial direction. Alternatively by combining the mode with the aforesaid ninth or tenth mode, three chambers, namely, a pressure receiving chamber, oscillating chamber, and equilibrium chamber can be formed with excellent space efficiency and simple structure. Where a pressure receiving chamber and the equilibrium chamber are formed to either side of the rubber elastic body as described hereinabove, an orifice passage connecting the pressure receiving chamber and the equilibrium chamber to one another can advantageously be formed at the axially superimposed faces of the elastic body outer member and the second mounting member, for example.

In the active vibration damping mount herein, there is employed, as taught in Citation 5, a fluid-filled vibration damping device wherein a first mounting member fixed to one of the two members connected in vibration damping fashion, and a second mounting member fixed to an other one of the two members are elastically connected by means of a rubber elastic body; a pressure receiving chamber formed to one side of the rubber elastic body and an equilibrium chamber formed to the other side communicate through an orifice passage; and a non-compressible fluid is sealed within the pressure receiving chamber and the equilibrium chamber, whereby during vibration input, damping action is produced on the basis of resonance or flow action of the fluid forced to flow through the orifice passage between the pressure receiving chamber and the equilibrium chamber. With the fluid filled vibration damping device of such construction, the height dimension of the vibration damping apparatus overall can be reduced by forming the pressure receiving chamber and the equilibrium chamber to either side of the rubber elastic body, making it advantageous for use where installation space is limited, as with an engine mount for an automotive vehicle.

[Citation 5]
JP-A-2001-59540

With an active vibration damping mount, e.g. an engine mount, employing such a fluid-filled vibration damping device, when excessive vibrational load is input, such as when cranking while the vehicle is stopped or when driving over the step, in order to limit relative displacement of the power unit relative to the body, it is typical to employ a stop mechanism that provides limitation of elastic deformation by the rubber elastic body and cushion-wise limitation of relative displacement of the first mounting member and second mounting member. Such a stop mechanism may be realized, for example, by projecting a cushioning stop rubber integrally molded with the rubber elastic body on the faces opposed to the first mounting member and the second mounting member.

However, in the fluid-filled vibration damping device of the above-described construction having the pressure receiving chamber and equilibrium chamber formed to either side of the rubber elastic body, a problem in terms of producing the stop mechanism is the difficulty of integrally molding a stop rubber with the rubber elastic body.

Covering the rubber elastic body from the outside with a flexible rubber layer and integrally molding the rubber elastic body and the flexible rubber layer, as is taught in Citation 5 mentioned hereinabove, is difficult for reasons pertaining to mold construction, and it is structurally difficult to integrally mold a stop rubber extending outwardly from the rubber elastic body. While it would be conceivable to integrally mold the stop rubber by means of the flexible rubber layer disposed on the outside, the characteristics required of the flexible rubber layer, which basically has no load input, differ greatly from the characteristics required of the stop rubber, and thus where the stop rubber is integrally formed with the flexible rubber layer, in a material sense, it will be difficult to endow the stop rubber with the characteristics required of it.

Thus, a twelfth mode of the second aspect of the invention relating to an active vibration damping mount has as an object to provide an active vibration damping mount of novel construction, wherein a stop mechanism for limiting relative displacement of the first mounting member and the second mounting member may be effectively realized by means of a simple structure, while adequately meeting the characteristics required of it, such as load strength, and without requiring any special processing steps such as welding.

The twelfth mode of the second aspect of the invention is an active vibration damping mount according to the above-described first mode, further comprising: an elastic body central member bonded to a center portion of the rubber elastic body; an elastic body outer member bonded to an outer peripheral portion of the rubber elastic body; a rubber-layer central member bonded to a center of a flexible rubber layer disposed so as to cover an exterior of the rubber elastic body; and a rubber layer outer member bonded to an outer peripheral portion of the flexible rubber layer, wherein the elastic body central member and the rubber-layer central member are fixed to each other to constitute the first mounting member, while the elastic body outer member and the rubber layer outer member are fixed to each other to constitute the second mounting member, an equilibrium chamber having non-compressible fluid sealed therein and partially defined by the flexible rubber layer is formed on an opposite side of the rubber elastic body from the pressure receiving chamber, and an orifice passage is formed for permitting fluid communication between the pressure receiving chamber and the equilibrium chamber, wherein an annular support portion is formed by extending the rubber layer outer member to an outer peripheral side thereof, a rebound stop member of gate shape extending across an outside of the first mounting member is laminated and bonded at both basal ends thereof onto the annular support portion by means of a fastening member, wherein a rebound stop rubber is bonded to a face of the rebound stop member opposed to the first mounting member, thereby constituting a rebound stop mechanism for cushion-wise limitation of an extent of elastic deformation of the rubber elastic body in the rebound direction, by means of direct abutment of the first mounting member against the rebound stop rubber, and wherein a bound stop member is superimpose on the annular support portion, and is fastened sandwiched between at least one basal end portion of the rebound stop member and the annular support portion, by means of the fastening member, while a bound stop rubber is bonded to the surface of the bound stop member to thereby constitute a bound stop mechanism for cushion-wise limitation of an extent of elastic deformation of the rubber elastic body in a bound direction, by means of direct or indirect abutment of the first mounting member against the bound stop rubber.

In an active vibration damping mount of construction according to this mode, the rebound stop member and the bound stop member that are respectively separate elements from the first and second mounting members are employed. Further, the rebound stop rubber and bound stop rubber that are respectively separate elements for the rubber elastic body and flexible rubber layer are formed bonded to this rebound stop member and bound stop member. Here, the bound stop member in particular is not simply disposed overlapping the annular support portion provided to the rubber layer outer member, but is sandwiched between the rebound stop member and the annular support portion and, while pinched thereby over a sufficiently large area between the two fittings, is fastened with a bolt to affix it to the annular support portion. Therefore, it is possible to achieve effective reinforcing action of the bound stop member, in order to easily realize a high strength stop mechanism.

That means in short that in the rubber layer outer member, during action of the stop mechanism, a heavy load is exerted on the fixing locations of the rebound stop member and bound stop member. However, in this mode, the fixing locations of the rebound stop member and bound stop member in the rubber layer outer member are of common construction, whereby strength in the fixing locations is significantly improved by means of the rebound stop member and bound stop member positioned on the rubber layer outer member. Thus, the rebound stop mechanism and the bound stop mechanism with ample strength can be realized with a simple construction, without the need for a special reinforcing structure such as a thicker member etc.

Additionally, material design of the rebound stop rubber and the bound stop rubber, which are formed as separate elements from the rubber elastic body and flexible rubber layer, need not be constrained by the characteristics required of the rubber elastic body and flexible rubber layer, so that better stop function may be realized easily.

Further, as the rebound stop member and the bound stop member are fixed by a common fastening member, e.g. a bolt, advantages such as simpler construction, fewer number of parts, and easier assembly may be effectively achieved.

A thirteenth mode of the second aspect of the invention is an active vibration damping mount according to the above-described twelfth mode, further comprising a temporary fixing member for temporarily fixing the bound stop member to the annular support portion, in an absence of fixing force by the fastening bolt. In this mode, once the bound stop member has been assembled with the rubber layer outer member, it is possible to prevent the bound stop member from coming off the rubber layer outer member before the rebound stop member has been fastened on with the fastening bolt, or before the fastening bolt has been completely tightened. By providing appropriate temporary fixing member, the bound stop member can be prevented from slipping out of position with respect to the rubber layer outer member.

A fourteenth mode of the second aspect of the invention is an active vibration damping mount according to any one of the above-described twelfth or thirteenth mode, wherein the bound stop member is formed to have a length equal to or greater than a half of a circumference of the annular support portion, and the bound stop member is fixed to the annular support portion by means of the fastening members fixing both basal end portions of the rebound stop member. In this mode, naturally, fixing force of the bound stop member to the rubber layer outer member is increased. Additionally, it is more advantageously exhibited reinforcing action of bolt fixing locations at both sides of the rebound stop member in the annular support portion of the rubber layer outer member, affording additional improvement in withstand strength of the rebound stop mechanism as well, rather than just the bound stop mechanism.

A fifteenth mode of the second aspect of the invention is an active vibration damping mount according to any one of the above-described twelfth through fourteenth modes, wherein the rubber layer outer member has a generally cylindrical shape, and is externally fitted onto the elastic body outer member, and the orifice passage is formed so as to extend in a circumferential direction between the elastic body outer member and the rubber layer outer member, while the annular support portion is integrally formed at one axial opening of the rubber layer outer member, and a closure member is superimposed onto an other axial opening, and caulked at an outside peripheral edge thereof, together with an outside peripheral edge of the elastic body outer member, to the other opening of the rubber layer outer member so as to close the opening of the elastic body outer member in fluid-tight fashion.

In this element, the elastic body outer member and the rubber layer outer member are skillfully utilized to form the orifice passage of adequate passage length, with good space efficiency. Additionally, the axial opening on the opposite side of the rubber layer outer member from the elastic body outer member can be reliably sealed in fluid-tight fashion by means of caulking the closure member thereon. In particular, where the closure member is attached to the rubber layer outer member while immersed in a mass of a non-compressible fluid, non-compressible fluid can be readily sealed within the fluid chambers (the pressure receiving chamber and equilibrium chamber) at the same time when these are formed.

A third aspect of the invention relates to an active vibration damper adapted to be installed on a member whose vibration to be damped, in order to exert oscillating force on the member for producing active vibration damping action, comprising: a vibration damping actuator constructed according to any one of the above-described mode 1–9; a mount portion for fixation to the vibration-damper member disposed in one of the housing and the output member in the vibration damping actuator; and a mass portion disposed on an other of the housing and the output. According to this aspect of the invention, it is possible to realize the active vibration damper that exhibits desired active damping performance consistently for an extended period, thereby advantageously affording an active vibration damper suitable for use as an automobile body damper, for example.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
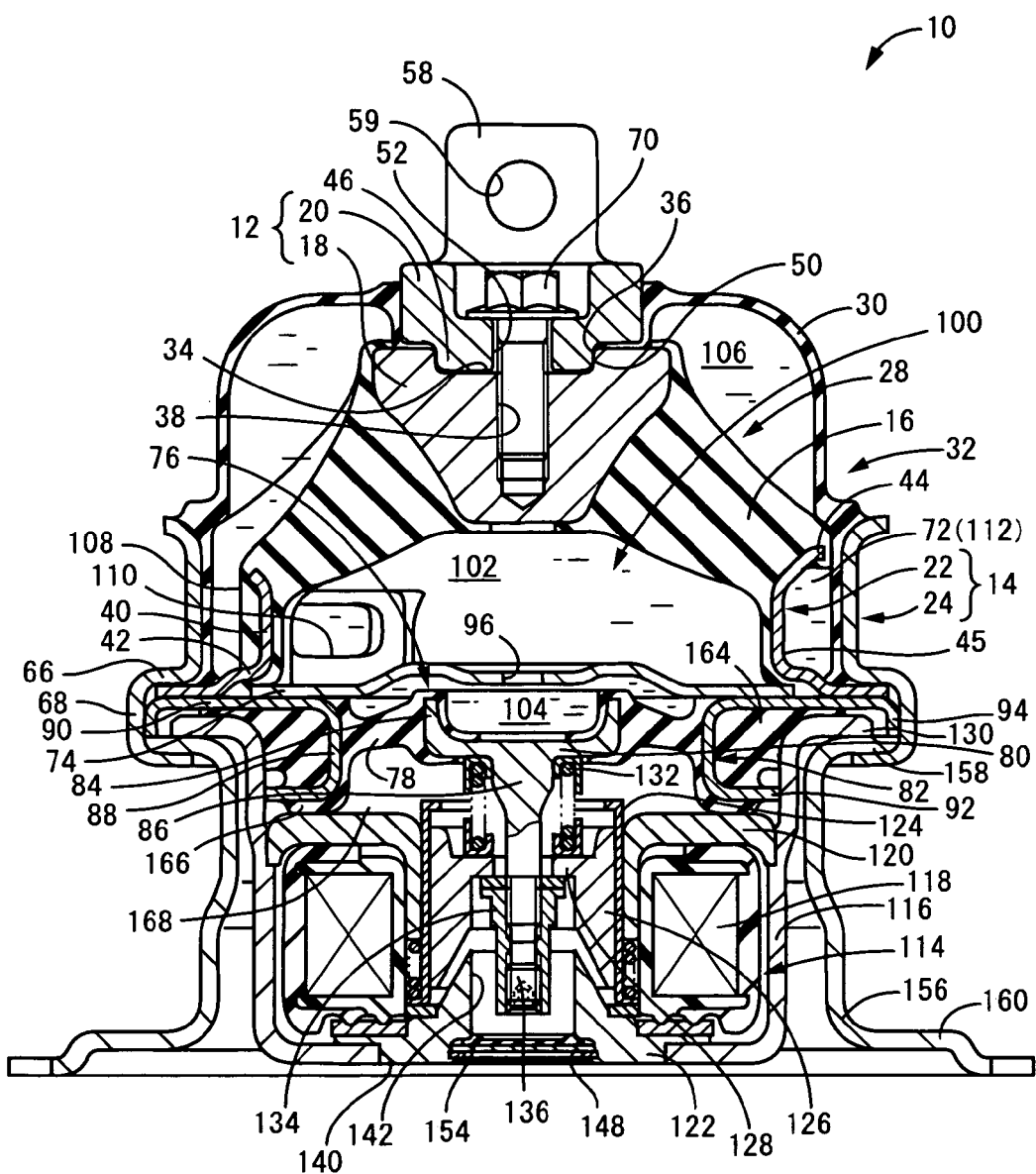
FIG. 1 is an elevational view in axial or vertical cross section of an active vibration-damping mount in the form of an automotive engine mount constructed according to a first embodiment of the invention.

Referring first to FIG. 1, shown is an active vibration damping mount in the form of an engine mount 10 constructed according to a first embodiment of the present invention. The engine mount 10 includes a first mounting member 12 and a second mounting member 14 which are both made of metal, and are elastically connected to each other via a rubber elastic body 16 interposed therebetween. With the first mounting member 12 fixed to a power unit (not shown) of the vehicle, and the second mounting member 14 fixed to a body (not shown) of the vehicle, the engine mount 10 can support the power unit on the body of the vehicle in a vibration damping fashion. With the engine mount 10 installed in position as described above, an initial load or weight of the power unit as well as a vibrational load to be damped are primarily applied between the first and second mounting members 12, 14 in an approximately axial direction of the engine mount 10, i.e., the vertical direction as seen in FIG. 1. In the following description, the vertical direction is basically equal to the vertical direction as seen in FIG. 1.

The first mounting member 12 includes an elastic body inner member 18 functioning as an elastic body central member and a diaphragm-side inner member 20 functioning as a rubber-layer central member. On the other hand, the second mounting member 14 includes an elastic body outer sleeve member 22 functioning as an elastic body outer member and a diaphragm-side outer sleeve member 24 functioning as a rubber layer outer member. The elastic body inner member 18 and the elastic body outer sleeve member 22 are bonded to the elastic body 16 by an integral vulcanization molding of a rubber material with the two members 18, 22, thereby providing a first integral vulcanization product 28 (see FIG. 3). Likewise, the diaphragm-side inner member 20 and the diaphragm-side outer sleeve member 24 are bonded to a flexible diaphragm 30 functioning as a flexible rubber layer by integral vulcanization molding of a rubber material with the two members 20, 24, thereby providing a second integral vulcanization product 32 (see FIGS. 4 and 5). These first and second integral vulcanization products 28, 32 are mutually assembled.

Figure 2:
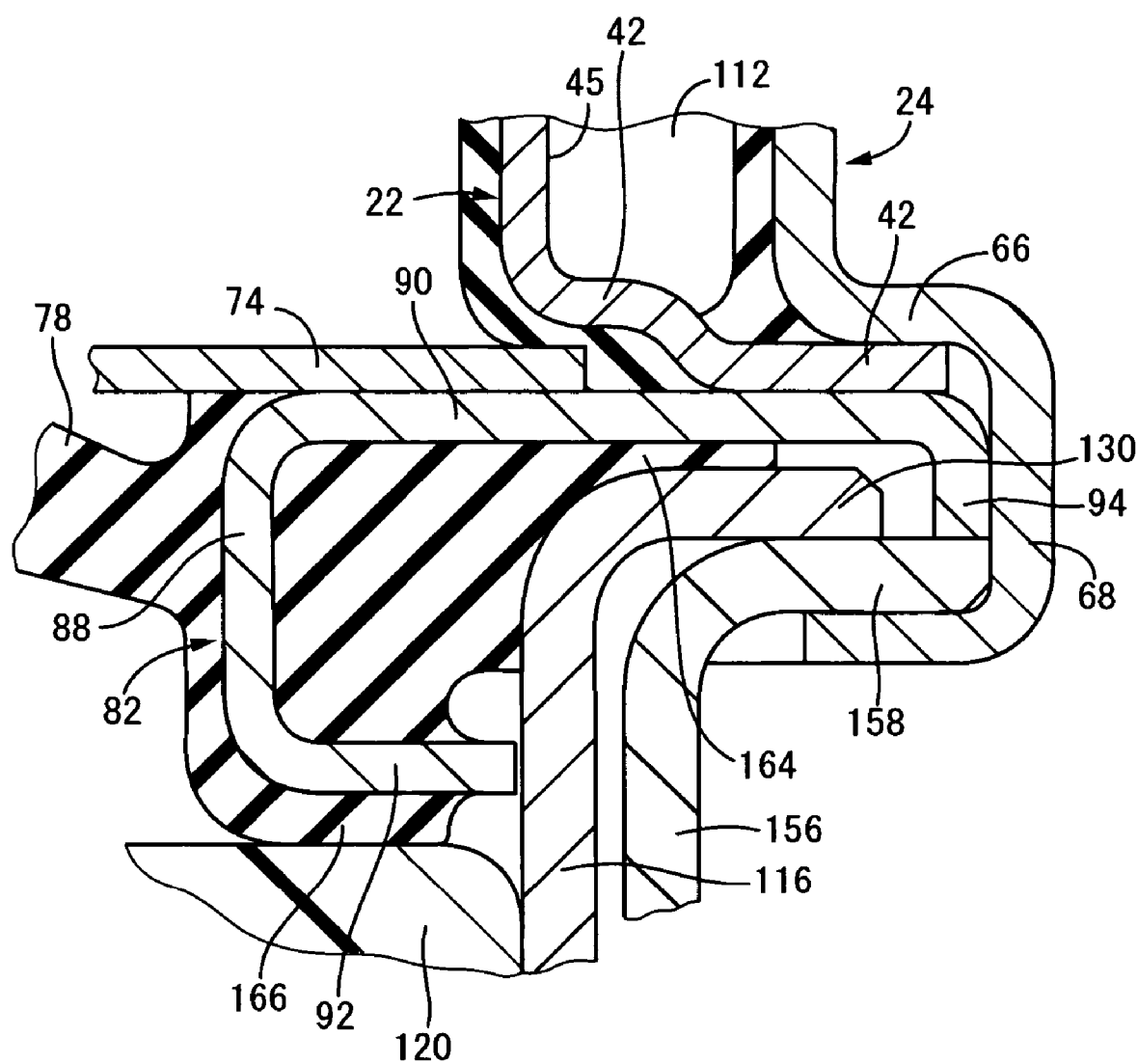
FIG. 2 is an exploded view suitable for explaining an assembly portion of an electromagnetic actuator of the engine mount of FIG. 1.

Described in detail, the elastic body inner member 18 of the first integral vulcanization product 28 has an approximately inverted truncated conical shape in its entirety. An upper end face (large diameter end face) of the elastic body inner member 18 has a fitting recess 34 open therein. As is apparent from FIGS. 1–3, the fitting recess 34 has a chord shaped portion at a circumferential position thereof to provide an engaging inner circumferential surface 36.

The elastic body inner member 18 is further formed with a tapped hole 38 open in a bottom face of the fitting recess 34. A center axis 39 of the tapped hole 38 is off-centered by a predetermined distance 6 from the center of the fitting recess 34, thereby extending parallel to a center axis 37 of the elastic body inner member 18. Preferably, the elastic body inner member 18 is formed of an aluminum alloy, which is lighter than steel or the like, and easy to mold.

The elastic body outer sleeve member 22 includes a cylindrical wall portion 40 of substantially large-diameter cylindrical configuration, and a flange portion 42 integrally formed at an axially lower end portion of the cylindrical wall portion 40, and extending diametrically outwardly. An axially upper end portion of the cylindrical wall portion 40 provides a tapered cylindrical portion 44 whose diameter gradually increases as its goes axially upward. The elastic body outer sleeve member 22 of this configuration provides a circumferential groove 45 open in an outer circumferential surface thereof and extending circumferentially with a circumferential length slightly smaller than a circumference thereof. The elastic body inner member 18 is disposed upward of and concentrically with the elastic body outer sleeve member 22 with an axial spacing therebetween, such that an outer circumferential surface of tapered configuration of the elastic body inner sleeve member 18 and an inner circumferential surface of the tapered cylindrical portion 44 of the elastic body outer sleeve member 22 are mutually opposed to each other with a spacing therebetween. The elastic body 16 is disposed in between and elastically connecting the outer circumferential surface of the elastic body inner member 18 and the inner circumferential surface of the tapered cylindrical portion 14.

The elastic body 16 has a large-diameter truncated conical shape in its entirety. In a small diameter or central portion of the elastic body 16, the elastic body inner member 18 is embedded in a coaxial relationship with the elastic body 16, by the aforesaid integral vulcanization molding. In a large diameter portion of the elastic body 16, the tapered cylindrical portion 44 of the elastic body outer sleeve member 22 is bonded to an outer circumferential surface of the elastic body 16 by the aforesaid integral vulcanization molding. Thus, the elastic body 16 is equipped with the elastic body inner member 18 and the elastic body outer sleeve member 22, providing the first integral vulcanization product 28.

The diaphragm-side inner member 20, which is one component of the second integral vulcanization product 32, is a thick disk shaped member provided with a fitting recess 34 open in a lower face thereof, and is perforated through its thickness at a location where the fitting recess 34 is formed by a through hole 52. The diaphragm-side inner member 20 further includes a fixing plate portion 58 integrally formed on and projecting out from an upper face thereof, which has a bolt hole 59 at a central portion thereof.

The diaphragm-side outer sleeve member 24 has a thin-walled large-diameter cylindrical shape in its entirety, and has a shoulder portion 66 integrally formed at its axially lower open-end portion extending diametrically outwardly. Integrally formed at an outside peripheral edge of the shoulder portion 66 is an annular caulking sleeve portion 68 projecting axially downward.

The diaphragm-side inner member 20 is disposed upward of and concentrically with the diaphragm-side outer sleeve member 24 with an axial spacing therebetween, and is elastically connected with the diaphragm-side outer sleeve member 24 by the flexible diaphragm 30.

The flexible diaphragm, 30 is a thin rubber layer of approximately annular configuration, and extends circumferentially with a curve cross section as to provide a large slack to permit an easy elastic deformation thereof. An inside peripheral edge of the flexible diaphragm 30 is bonded to an outside peripheral edge of the diaphragm-side inner member 20 by the aforesaid integral vulcanization molding, and an outside peripheral edge of the flexible diaphragm 30 is bonded to the axially upper open end portion of the diaphragm-side outer sleeve member 24 through an integral vulcanization molding. Thus, the flexible diaphragm 30 is equipped with the diaphragm-side inner member 20 and the diaphragm-side outer sleeve member 24, providing the second integral vulcanization product 32.

The second integral vulcanization product 32 is superimposed on and assembled with the first integral vulcanization product 28 such that the diaphragm-side inner member 20 is fixed to the elastic body inner member 18, while the diaphragm-side outer sleeve member 24 is fixed to the elastic body outer sleeve member 22. With the first and second vulcanization products 28, 32 assembled together, the flexible diaphragm 30 is situated outward of the elastic body 16 with a spacing therebetween, while covering an entire outer circumferential surface of the elastic body 16.

Namely, the diaphragm-side inner member 20 is directly superimposed on the upper surface of the elastic body inner member 18 with its fitting projection 46 secured press fit into the fitting recess 34 of the elastic body inner member 18. With this mating state, the diaphragm-side inner member 20 and the elastic body inner member 18 are mutually positioned in a coaxial fashion. In particular, the engaging outer circumferential surface 50 formed on the fitting projection 46 is brought into engagement with the engaging inner circumferential surface 36 of the fitting recess 34, whereby the diaphragm-side inner member 20 and the elastic body inner member 18 are mutually positioned in a circumferential direction as well. Thus, the through hole 52 of the diaphragm-side inner member 20 and the tapped hole 38 of the elastic body inner member 18 are in alignment with each other.

With the elastic body inner member 18 and the diaphragm-side inner member 20 assembled with each other as shown in FIG. 1, a connecting bolt 70 is inserted through the through hole 52 and threaded and tightened into the tapped hole 38. By connecting the elastic body inner member 18 and the diaphragm side inner member 20 together by means of the connecting bolt 70, is provided the first mounting member 12.

On the other hand, the diaphragm-side outer sleeve member 24 is assembled from the axially upper side with the elastic body outer sleeve member 22, so as to be disposed about the elastic body outer sleeve member 22. At the lower side of the elastic body outer sleeve member 22, the flange portion 42 is held in contact at its peripheral portion with the shoulder portion 66 of the diaphragm-side outer sleeve member 24 in the axial direction. At the upper side, an open peripheral portion of the tapered cylindrical portion 44 is held against an inner circumferential surface of the diaphragm-side outer sleeve member 24 in the diametric direction.

With this mating state, the caulking sleeve portion 68 of the diaphragm-side outer sleeve member 24 is caulked against the peripheral portion of the flange portion 42 of the elastic body outer sleeve member 22, whereby the elastic body outer sleeve member 22 and the diaphragm-side outer sleeve member 24 are mutually fastened together. In addition, the upper and lower end of the elastic body outer sleeve member 22 are held against the diaphragm-side outer sleeve member 24 with sealing rubber layers integrally formed with the elastic body 16 or the flexible diaphragm 30 compressed therebetween, respectively, so as to provide a fluid-tight sealing therebetween. With the elastic body outer sleeve member 22 assembled with the diaphragm-side outer sleeve member 24 as described above, the opening of the circumferential groove 45 is fluid-tightly closed by the diaphragm-side outer sleeve member 24. Thus, there is formed an annular fluid passage 72 continuously extending in the circumferential direction between the cylindrical wall portion 40 of the elastic body outer sleeve member 22 and the diaphragm-side outer sleeve member 24, with a given circumferential length, or over an entire circumference of the cylindrical wall portion 40.

On the lower side of the elastic body outer cylindrical member 22, there are disposed a partition member in the form of a partition metal plate 74 and a closure member 76. The closure member 76 includes a substantially annular support rubber plate 78 and an oscillating plate 80 functioning as an output member bonded to the central portion of the support rubber plate 78, while an annular fixing member in the form of an annular retaining member 82 is bonded onto the outside peripheral edge of the support rubber plate 78, through a vulcanization molding of the closure member 76. That is, the oscillating plate 80 and the annular retaining member 82 are elastically connected to each other via the support rubber plate 78, thereby providing an oscillating member.

The oscillating plate 80 is a disk shaped member, and has an annular linking portion 84 integrally formed at the outside edge thereof projecting upwardly. A drive shaft 86 is integrally formed extending downwardly at a central portion of the oscillating plate 80, and a thread portion is provided to the proximal end portion of the driving shaft 86. The oscillating plate 80 including the annular linking portion 84 and the drive shaft 86, is made integrally of rigid material such as metal or hard resin. The annular retaining member 82 includes a cylindrical portion 88, and a fixing plate 90 as well as a positioning projection 92, which are integrally formed at upper and lower openings of the cylindrical portion 88 with outward flange configuration. A circular press-fit portion 94 is integrally formed at the outside peripheral portion of the fixing plate 90 so as to project further downwards.

This oscillating plate 80 is arranged substantially concentrically with and spaced apart diametrically inwardly from the annular retaining member 82. The supporting rubber plate 78 is arranged so as to extend between the diametrically opposed faces of the annular retaining member 82 and the oscillating plate 80. The supporting rubber plate 78 is bonded at its inner and outer peripheral portions to the opposing faces of the outer peripheral projection of the oscillating plate 80 and a tubular portion 88 of the annular retaining member 82, through vulcanization process of a rubber material for forming the supporting rubber plate 78. With this arrangement, a gap formed between the oscillating plate 80 and the annular retaining member 82 is fluid tightly closed by means of the supporting rubber plate 78.

The partition metal plate 74 is a thin disk metallic member having an outside diameter of size extending as far as the diametric medial portion of the fixing plate 90 of the annular retaining member 82. The center portion of the partition metal plate 74 projects upward in a generally plateau-like configuration, and is perforated through its thickness on its center axis by an orifice passage 96 functioning as a pressure transmission passage.

The partition metal plate 74 is assembled in the lower opening of the diaphragm-side outer sleeve member 24, with its outside peripheral portion superimposed against and assembled with the flange portion 42 of the elastic body outer sleeve member 22 assembled therewith. Additionally, the closure member 76 is assembled in the lower opening of the diaphragm-side outer sleeve member 24 from below the partition metal plate 74, and the fixing plate 90 of the annular retaining member 82 in the closure member 76 is superimposed onto the elastic body outer sleeve member 22 and the partition metal plate 74. The thus arranged partition metal plate 74 and the closure member 76 are fixed caulkwise at their outside peripheral portions to the diaphragm-side outer sleeve member 24 by pressingly bending the cylindrical caulking sleeve portion 68 of the diaphragm-side outer sleeve member 24 against the outside peripheral portions in the process of caulking fixation.

With the arrangement as discussed above, the opening at the lower end of the diaphragm-side outer sleeve member 24 is closed in a fluid-tight fashion by the closure member 76, whereby a pressure-receiving chamber 100 having a non-compressible fluid sealed therein is formed between the rubber elastic body 16 and the closure member 76. Namely, the pressure receiving chamber 100 is partially defined by the rubber elastic body 16, and is designed to excite fluid pressure variation based on elastic deformation of the rubber elastic body 16 when vibration is input across the first mounting member 12 and second mounting member 14.

The partition metal plate 73 is disposed within the pressure-receiving chamber 100, thereby partitioning the pressure receiving chamber 100 into a vibration receiving chamber 102 on the side of the rubber elastic body 16, and an oscillating chamber 104 on the side of the closure member 76. The vibration receiving chamber 102 and the oscillating chamber 104 are held in fluid communication with each other through the orifice passage 96.

The rubber elastic body 16 and the diaphragm 30 are each directly bonded or attached at their inside peripheral portion and outside peripheral portion to the first mounting member 12 and the second mounting member 14, thereby forming an equilibrium chamber 106 having a non-compressible fluid sealed therein, between the opposing faces of the rubber elastic body 16 and the diaphragm 30. This equilibrium chamber 106 is partially defined by the readily deformable diaphragm 30, and is designed to readily allow change in volume, based on elastic deformation of the diaphragm 30. As the non-compressible fluid sealed within the pressure-receiving chamber 100 and the equilibrium chamber 106, it is typically favorable to employ a fluid having a low viscosity of not larger than 0.1 Pa·s, for example, in order to efficiently achieve effective damping action required in the automobile engine mount 10 based on resonance of fluid flowing through an orifice passage 112, which will be described later.

The aforesaid annular fluid passage 72 formed within the second mounting member 14, is connected at its opposite ends to the pressure receiving chamber 100 on the lower side of the elastic body 16 and equilibrium chamber 106 on the upper side of the elastic body 16 through communication holes 108, 110, thereby providing an orifice passage 112 with a given length which permits a fluid communication between the pressure receiving chamber 100 and the equilibrium chamber 106. As well known in the art, the fluid is forced to flow through the orifice passage 112 on the basis of relative fluid pressure variation caused between the pressure receiving chamber 100 and the equilibrium chamber 106 during input of vibrational load. Thus, the engine mount 10 can exhibit excellent damping effect with respect to the input vibrational load on the basis of resonance of the fluid flowing through the orifice passage 112. The damping performance of the engine mount 10 on the basis of the flows of the fluid through the orifice passage 112 can be adjusted in terms of a frequency characteristic, by only tuning a ratio of the cross sectional area to the length of the orifice passage 80, e.g., can be tuned to engine idling vibration.

On the side of the closure member 76 opposite the pressure-receiving chamber 100, an electromagnetic oscillator 114 is installed as an actuator. This electromagnetic oscillator 114 has a coil 118 fixedly attached while accommodated within a generally cup-shaped housing 116, and yokes 120, 122 of annular ferromagnetic material fixedly attached about the circumference of the coil 118, to form a magnetic path. On the cylindrical inner peripheral wall of the yoke 120 forming the magnetic path, a guide hole in the form of a guide sleeve 124 is elastically positioned and mounted, and a sliding member 126 fabricated of ferromagnetic material and serving as an armature, is slidably disposed inside the guide sleeve 124. The guide sleeve 124 has a thin-walled cylindrical shape, and is retained positioned with respect to the yoke 120 via a retaining coil spring 127, whereby the effects of dimensional error of the yoke 120 or other components may be avoided as much as possible. Thus, the sliding member 126 may be guided smoothly with good slidability on the inner peripheral face thereof.

The sliding member 126 has a thick-walled, generally cylindrical overall shape, the outer circumferential surface thereof having a cylindrical face for sliding contact with the guide sleeve 124 on the one hand, while on the inner circumferential surface is integrally formed a projecting annular engaging projection 128 that projects inwardly at a medial portion in the axial direction. The sliding member 126 is inserted into the guide sleeve 124, with the outer circumferential surface in the axial upper portion thereof arranged in close proximity to one yoke 120 and the axial lower face thereof positioned in juxtaposition to the other yoke 122 in the axial direction, arranged in a magnetic gap zone formed between the two yokes 120, 122. Accordingly, by applying current through coil 118, magnetic force is exerted on the sliding member 126 by the yokes 120, 122, so that the sliding member 126 is actuated in the axial direction while being guided by the guide sleeve 124.

As regards the electromagnetic oscillator 114, a housing flange 130 formed on the lip of the opening of the housing 116 is positioned on the fixing plate 90 of the annular retaining member 82 in the closure member 76, and together with the annular retaining member 82 is caulked to the second mounting member 14 by means of the caulking sleeve portion 68. By so doing, the electromagnetic oscillator 114 is attached with a center axis of slide of the sliding member 126 generally coincident with the center axes of the first and second mounting members 12, 14.

Into the electromagnetic oscillator 114 attached in this manner, the drive shaft 86 of the oscillating plate 80 is inserted from above on the center axis thereof such that the drive shaft 86 is passed through an engaging projection 128 of the sliding member 126. A coil spring 132 is inserted over the drive shaft 86 and arranged straddling the gap between the opposing faces of the oscillating plate 80 and the engaging projection 128 of the sliding member 126, with a positioning nut 134 threaded onto the distal end portion of drive shaft 86 that has been passed through the engaging projection 128. The positioning nut 134 is then threaded onto drive shaft 86 and, via the engaging projection 128 of the sliding member 126, compresses the coil spring 132 between it and the oscillating plate 80, thereby positioning the sliding member 126 with respect to the drive shaft 86, and bringing about elastic connection through the urging force of the coil spring 132. By so doing, actuating force acting on the sliding member 126 through application of current to the coil 118 may be exerted on drive shaft 86. As is apparent from the above description, the guide rod in this embodiment is constituted so as to include the sliding member 126 and drive shaft 86.

In short, by adjusting the amount by which the positioning nut 134 is screwed onto drive shaft 86, it is possible to modify in the axial direction the mount position of the sliding member 126 with respect to the oscillating plate 80, which is supported positioned elastically with respect to the second mounting member 14 by support rubber plate 78. This arrangement makes it possible to make fine adjustment of the distance between the opposed, magnetic force working faces of sliding member 126 with respect to yoke 122. Additionally, in this embodiment, a locking bolt 136 is tightened into the positioning nut 134 from the axial lower side. With the locking bolt 136 coming into abutment with the distal end of the drive shaft 86 within the screw hole of positioning nut 134, the fastening location of the positioning nut 134 with respect to the drive shaft 86 is locked.

Also, a through hole 140 is formed in the center of the bottom wall in the housing 116 of electromagnetic oscillator 114, so that the yoke 122 positioned opposed to the sliding member 126 and exerting magnetic force thereon is exposed to the outside, as well as allowing the internal space of the electromagnetic oscillator 114 in which the sliding member 126 is placed to open directly to the outside via the central hole 142 of yoke 122. Also, by inserting a hexagonal wrench or similar tool through this opening and into the opening of the central hole 142 of yoke 122, it is possible to operate the aforementioned locking bolt 136 and positioning nut 134 to adjust the position of the sliding member 126 from the outside.

In the engine mount 10 having the structure described hereinabove, a cylindrical bracket 156 is externally fitted onto the electromagnetic oscillator 114. The cylindrical bracket 156 has a bracket flange 158 formed at the upper end opening. This bracket flange 158, together with the flange portion 42 of the elastic body outer sleeve member 22, fixing plate 90 of the annular retaining member 82, and the housing flange 130 of the housing 116, is caulked to the diaphragm-side outer sleeve member 24 by forcedly bending the calking lip 68 against these members through a caulking fixation process. A fixing plate member 160 is formed at the bottom end opening of the cylindrical bracket 156, and a plurality of mount holes (not shown) are formed on the fixing plate member 160.

In the engine mount 10 having the structure described hereinabove, it is advantageous to assemble the partition metal plate 74 and the closure member 76 in the axial direction with an assembled first integral vulcanization product 28 including the rubber elastic body 16 and the second integral vulcanization product 32 including the diaphragm 30, and press fit the annular press-fit portion 94 of the closure member 76 into the caulking sleeve portion 68 of the second mounting member 14, while these components are submerged in a mass of non-compressible fluid, in order to seal in the non-compressible fluid at the same time the pressure receiving chamber 100 (i.e. the vibration receiving chamber 102 and the oscillating chamber 104) and the equilibrium chamber 106 are formed. With this regards, since the press-fit portion 94 has a cylindrical configuration projecting downward from an outside peripheral edge of the fixing plate 90, a press-fit area vis-á-vis the caulking sleeve portion 68 can be effectively obtained, thereby providing the fluid chambers with consistent liquid-tightness. Then the assembly is withdrawn from the non-compressible fluid, whereby attachment of the housing 116 of the actuator 114, which has been incorporated with a coil 118 in a separate step, can be carried out in the air. Namely, the housing 116 is assembled externally fitting onto the closure member 76, and an housing flange 130 of the housing 116 is superimposed against the fixing plate 90 of the closure member 76, while the cylindrical bracket 156 is externally fitted onto the superimposed housing flange 130 and the fixing plate 90 so that a bracket flange 158 of the bracket 156 is superimposed against the housing flange 130. Subsequently, the caulking sleeve portion 68 of the second mounting member 14 is subjected to caulking fixation so that the partition metal plate 74, the closure member 76 and the fixing plate 90 superimposed against the shoulder portion 66 in this order, are fixed together by caulking to the second mounting member 14 by means of the caulking sleeve portion 68.

In an assembly of the electromagnetic oscillator 114, a coil 118, yokes 120, 122, a guide sleeve 124, a sliding member 126 and other required members are assembled within the housing 116 in advance. When the housing flange 130 of the housing 116 is superimposed against the fixing plate 90 of the closure member 76, the drive shaft 86 projecting downward from the oscillating plate 80 of the closure member is inserted from the above into the sliding member 126. During this assembly, the positioning projection 92 can be brought into sliding contact with the inner circumferential surface of the housing 116 over an axial length corresponding to an axial dimension of the tubular portion 88 thereof, prior to the housing flange 130 of the housing 116 reaching to the fixing plate 90 of the closure member 76. This sliding contact of the positioning projection 92 with respect to the inner circumferential surface of the housing 116 provides a displacement limiting action of the closure member 76 relative to the housing 116 in the axis-perpendicular direction, so that the closure member 76 can be suitably positioned relative to the housing 116 in the axis-perpendicular direction. In the present embodiment, since the axial dimension of the tubular portion 88 is made substantially equal to an axial length of insertion of the drive shaft 86 into the sliding member 126, the positioning projection 92 can continuously afford its positioning or guiding action from an initial stage of insertion process of the guide rod 86 into the sliding member 126. Once the drive shaft 86 is inserted into the sliding member 126, a high strengthen positioning of the guide rod 86 relative to the housing 116 in the axis-perpendicular direction can be assured through metal-to-metal abutment in this direction of the positioning projection 92 against the housing 116.

The housing flange 130 of the housing 116 in the electromagnetic actuator 114 has an outside diameter smaller than those of the press-fit portion 94 of the annular retaining member 82 and the bracket flange 158 of the cylindrical bracket 156, and has a wall thickness smaller than a projecting height of the press-fit portion 94. The protruding end face of the press-fit portion 94 of the annular retaining member 82 is directly superimposed against the outside peripheral portion of the bracket flange 158 of the cylindrical bracket 156. The housing flange 130 of the housing 116 is superimposed between the annular retaining member 82 and the bracket flange 158 of the cylindrical bracket 156, while being situated diametrically inwardly away from the press-fit portion 94, whereby the housing flange 130 is clamped and supported in the axial direction in a cushion-wise manner via a compression rubber 164 bonded to the lower face of the fixing plate 90 of the annular retaining member 82.

In the annular retaining member 82, the tubular portion 88 is integrally formed with the fixing plate 90 and the positioning projection 92 disposed at both axial end portions thereof, respectively. With this arrangement, an annular groove-like hollow space is formed around an outer circumferential surface of the tubular portion 88, and filled with the compression rubber 164 over its substantially entire area. The compression rubber 164 is compressed between the fixing plate 90 and the housing flange 130, as well as between the tubular portion 88 and the inner circumferential surface of the housing 116. Accordingly an axial caulking force created between the shoulder portion 66 and the caulking sleeve portion 68 is exerted cushion-wise on the housing flange 130 via the compression rubber 164. That is, the housing 116 is elastically supported by the second mounting member 14 so that transmission to the actuator 114 of vibration exerted on the second mounting member 214 or the cylindrical bracket 156, thereby ensuring improved durability of the engine mount 10. While a portion where the second mounting member 14 and the cylindrical bracket 156 are connected together, may be subjected to a relatively large load, the fixation at this portion can be established with high strength through caulking fixation in a state of substantial metal-to-metal abutment between the annular retaining member 82 and the tubular portion 88 in the axial direction. Additionally, by means of the compression rubber 164 being interposed and compressed between the tubular portion 88 of the retaining member 82 and the housing 116 in the axis-perpendicular direction, it is possible to increase frictional resistance to relative rotation of the fixing member and the housing in the circumferential direction, thereby assuring a stable positioning of the electromagnetic oscillator 114 in the circumferential direction thereof during assembly of the electromagnetic oscillator 114.

The compressed rubber 164 is advantageously obtained, for example, by being passed through a through-hole bored in annular retaining member 82 and integrally formed with support rubber plate 78. In this element, on the bottom face of positioning projection 92 of annular retaining member 82, a sealing rubber 166 is formed covering integrally with support rubber plate 78, and by means of the sealing rubber 166 being pressed against the upper face of yoke member 120, working space 168 for sliding displacement of electromagnetic oscillator 114 by a particularly small gap dimension is sealed in cooperation with the sealing structure provided by the lid metal plate 148 and annular sealing rubber 154 in the central hole 142 of the aforementioned yoke 122.

While not shown in the drawings, the engine mount 10 is installed between the power unit and the body, by fixing the fixing plate portion 58 of the first mounting member 12 to the power unit by a fastening bolt passed through the bolt hole 59, while fixing the second mounting member 14 to the car body with a fastening bolt, via the cylindrical bracket 156. In the installed state, when vibration is input across the first mounting member 12 and the second mounting member 14, fluid flow through the orifice passage 112 is generated on the basis of a pressure differential generated between the pressure receiving chamber 100 and the equilibrium chamber 106 in association with elastic deformation of the rubber elastic body 16, so that passive vibration damping action is exhibited on the basis of resonance or flow action of the fluid. By controlling current flow to the coil 118 at frequency and phase depending on the vibration being damped while actuating oscillation of the oscillating plate 80 with the electromagnetic oscillator 114, pressure fluctuations are exerted by the oscillating chamber 104 on vibration receiving chamber 102 through the orifice passage 96, so that active damping action of input vibration is obtained through active control of fluid pressure fluctuations in the vibration receiving chamber 102.

As discussed above, the electromagnetic oscillator 114 is constituted by means of assembly of the closure member 76 attached to the second mounting member 14 with the housing 116 equipped with the coil 116 and the yoke 120 therein and being externally fit onto the closure member 76. During this assembly, since the positioning projection 92 is provided, in this embodiment, the positioning projection 92 sets into the housing 116 from the closure member 76, and positions the housing 116 in the axis-perpendicular direction through interfering action on the inside peripheral face of the housing 116. Therefore, the provision of the positioning projection 92 makes it easy to carry out the aforesaid assembly procedure of the housing 116, and makes it possible to retain after assembly positioning with a high degree of strength consistently. In particular since the positioning action of the positioning projection 92 is carried out at a location a large distance away from the center of the housing 116 in the axis-perpendicular direction, by utilizing the inside peripheral face of the housing 116, making it possible to advantageously achieve both accuracy and strength during positioning in the axis-perpendicular direction.

While the invention has been shown and described hereinabove with reference to one preferred embodiments for the illustrative purpose only, it is to be understood that the present invention is not limited to the details of the illustrated embodiments. It is also to be understood that the present invention may be embodied with various changes, modifications and improvements which may occur to those skilled in the art, without departing from the spirit and scope of the invention.

For instance, the electromagnetic oscillator 114 of a structure wherein the armature consisting of the sliding member 126 is arranged to the inner peripheral side of the coil 118 in the illustrated embodiment, but instead it would be possible to employ an electromagnetic oscillator of a structure wherein an armature consisting of sliding member or permanent magnet is arranged to the outside peripheral side of a coil, as disclosed in the aforementioned Citations 1, 2 and 3, for example.

In the embodiment hereinabove, the electromagnetic oscillator 114 is provided by assembling the housing 116 with the coil 118 or the yoke 120 assembled therewith, with the closure member 76 that has been previously press-fit into the mount body (i.e. the second mounting member 14). However, instead, a structurally complete electromagnetic oscillator having a mounting member, with an oscillating plate or other output member connected by means of a support rubber, attached to the housing could be subsequently installed on the mount body.

Besides the engine mount as exemplified hereinabove, the principle of the invention may also be implemented in an active vibration damper as disclosed, for example, in the aforementioned Citation 2. Specifically, a vibration damper can be constructed using, for example, the electromagnetic oscillator 114 of the illustrated embodiment by itself independently from the first and second integral vulcanization products 28, 32, by assembling the closure member 76 to the opening of the housing 116 thereof, and caulking the fixing plate 90 of annular retaining member 82 to the housing flange 130 of the housing 116. That is, in a vibration damper of such an arrangement, the oscillating plate 80 is stationarily mounted on a vibrating member to be damped, and the housing 116, including the coil 118, is supported elastically connected to the vibrating member via support rubber plate 78, whereby through application of electrical current through the coil 118, it can function as an actively oscillating mass for the vibrating member. In the electromagnetic oscillator 114 of this structure as well, the positioning action and effect on the housing 116 by the positioning projection 92 formed on the annular retaining member 82 is similar to those in the embodiment hereinabove.

Figure 3:
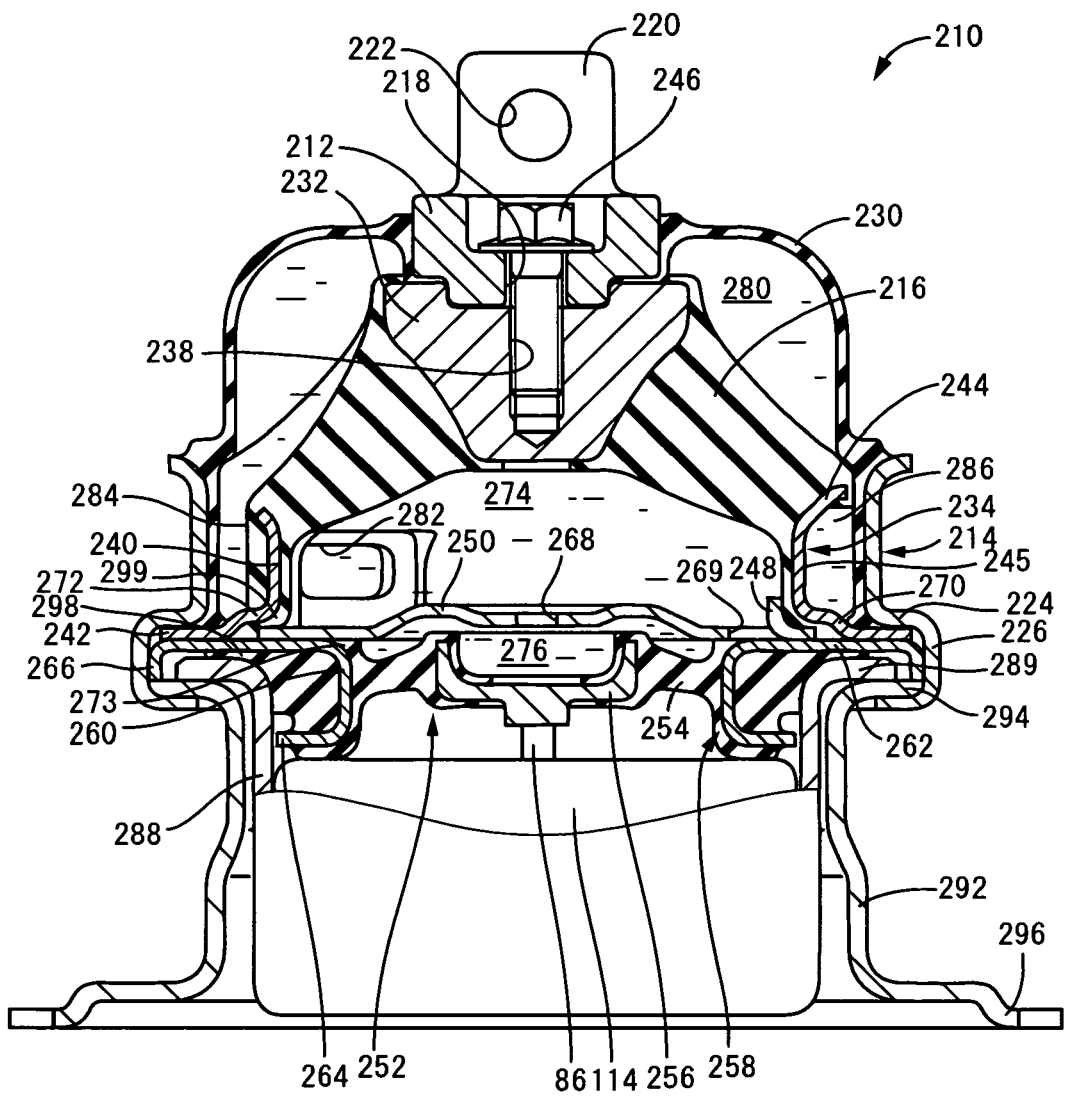
FIG. 3 is an elevational view in axial or vertical cross section of an automotive engine mount constructed according to a second embodiment of the invention.

Referring next to FIG. 3, shown is an active vibration damping mount in the form of an engine mount 210 constructed according to a second embodiment of the present invention. In the second embodiment, the same electromagnetic actuator 114 is employed as an active vibration damping actuator. The same reference numerals as used in the first embodiment are used for identifying structurally and functionally corresponding elements, and redundant description for the electromagnetic actuator 114 will not be provided. The engine mount 210 includes a first mounting member 212 and a second mounting member 214 which are both made of metal, and are elastically connected to each other via a rubber elastic body 216 interposed therebetween. With the first mounting member 212 fixed to a power unit (not shown) of the vehicle, and the second mounting member 214 fixed to a body (not shown) of the vehicle, the engine mount 210 can support the power unit on the body of the vehicle in a vibration damping fashion. With the engine mount 210 installed in position as described above, an initial load or weight of the power unit as well as a vibrational load to be damped are primarily applied between the first and second mounting members 212, 214 in an approximately axial direction of the engine mount 210, i.e., the vertical direction as seen in FIG. 3. In the following description, the vertical direction is basically equal to the vertical direction as seen in FIG. 3.

The second mounting member 214 has a thick-walled cylindrical shape, at the lower opening in the axial direction thereof is formed an annular plate-shaped shoulder portion 224 which extends diametrically outward. Further, on the outside peripheral edge portion of the shoulder portion 224 is integrally formed an annular caulking sleeve portion 226 projecting downward in the axial direction.

The first mounting member 212 is arranged spaced some distance apart above the second mounting member 214 in the axial direction, and on generally the same center axis therewith, with the first mounting member 212 and second mounting member 214 elastically connected by means of the diaphragm 230. A diaphragm 230 is formed by means of a thin rubber film, and in order to permit it to readily undergo elastic deformation has a generally annular shape extending in the circumferential direction, with a bowed cross section having appreciable sag. The inside peripheral edge of the diaphragm 230 is bonded by vulcanization to the outside peripheral edge of the first mounting member 212, and the outside peripheral edge of the diaphragm 230 is bonded by vulcanization to the rim of the opening at the axial upper end of the second mounting member 214. In this arrangement, the diaphragm 230 is formed as an integral vulcanization product comprising the first mounting member 212 and the second mounting member 214.

A separately vulcanization molded rubber elastic body 216 is subsequently assembled to the integral vulcanization product, with first mounting member 212 and the second mounting member 214 being elastically connected by means of the rubber elastic body 216.

The rubber elastic body 216 has overall a large-diameter frustoconical shape, and in the central portion thereof has the elastic body inner member 232 positioned coaxially therewith and vulcanization bonded 2hereto. An elastic body outer sleeve member 234 is positioned on and vulcanization bonded to the outer peripheral face at the large diameter end of the rubber elastic body 216.

The elastic body inner member 232 has an inverted, generally frustoconical shape, with a tapped hole 238 opening onto the upper face formed in the generally central portion thereof. The elastic body outer sleeve member 234, on the other hand, comprises a cylindrical wall portion 240 having a generally large diameter cylindrical shape. At the lower axial end of this cylindrical wall portion 240 is integrally formed a flange portion 242 that spreads outwardly in the diametrical direction, and the upper axial end of this cylindrical wall portion 240 constitutes a tapered cylindrical portion 244 that gradually opens out moving upward in the axial direction. By means of this arrangement, a circumferential groove 245 open at the outside peripheral face and extending a length just short of one turn in the circumferential direction is formed on the elastic body outer sleeve member 234. In the state of being vulcanization bonded to the rubber elastic body 216, the inverted taper-shaped outside peripheral face of the elastic body inner member 232 and the tapered cylindrical portion 244 of the elastic body outer sleeve member 234 are positioned in opposition spaced apart from one another, with the opposing faces of the elastic body inner member 232 and body-side outer sleeve member 234 elastically connected by means of the rubber elastic body 216.

The integral vulcanization molded product of diaphragm 230 is mated from above and assembled with the integral vulcanization molded product of rubber elastic body 216, superposing and fixing the first mounting member 212 onto the upper face of the elastic body inner member 232, while fixing the second mounting member 214 externally fitted onto the body-side outer sleeve member 234. The diaphragm 230 is arranged spaced apart to the outside of the rubber elastic body 216, covering completely the outside face of the rubber elastic body 216. By means of this arrangement, the first mounting member 212 and the second mounting member 214 are elastically connected by means of the rubber elastic body 216.

That is, the first mounting member 212 mated directly against the upper face of the elastic body inner member 232, fixing them together with a connecting bolt 246. A concave/convex mating portion is formed at the mated interface of the first mounting member 212 and elastic body inner member 232, positioning them in the axis-perpendicular direction and circumferential direction. At the lower end of the elastic body outer sleeve member 234, the flange portion 242 is superimposed at an outside peripheral edge portion thereof directly against the shoulder portion of the second mounting member 214, while at the upper end of the elastic body outer sleeve member 234, the tapered cylindrical 244 is superimposed at the rim of the opening thereof against the inner circumferential surface of the second mounting member 214 all the way around the circumference.

The caulking sleeve portion 266 of the second mounting member 214 is then caulked to the outside peripheral edge portion of the flange portion 242 of the elastic body outer sleeve member 234, thereby assembling the elastic body outer sleeve member 234 and the second mounting member 214 fixed to each another. In order to provide a fluid-tight sealing, the locations at the upper and lower ends of the elastic body outer sleeve member 234 where it mates with the second mounting member 214 in the diametrical and axial directions, have respective sealing rubbers. The sealing rubbers are integrally formed with the rubber elastic body 216 and the diaphragm 230, respectively. By means of this arrangement, the circumferential groove 45 formed on the elastic body outer sleeve member 234 is covered fluid-tightly by the second mounting member 214, thereby forming a passage of predetermined length in the circumferential direction between the diametrically opposed faces of the second mounting member 214 and the cylindrical wall portion 240 of the elastic body outer sleeve member 234.

At the lower end of the elastic body outer sleeve member 234 are assembled a partitioning member, namely, a partition plate member 250 and a lid member 252. The lid member 252 comprises a support rubber plate 254 of generally annular plate configuration as a support rubber elastic body, to the central portion of which is bonded by vulcanization an oscillating plate 256, and to the peripheral edge portion of which is bonded by vulcanization an annular mounting member 58. Thus, the oscillating plate 256 and the fixing member 258 are elastically connected to the support rubber plate 254.

The oscillating plate 256 is of a disk shape, and has an annular outside peripheral projection that projects upward from the annular outside peripheral edge portion thereof The oscillating plate 256 is fabricated of rigid material such as metal or hard resin. On the other hand, the fixing member 258 has a fixing plate portion 262 and a positioning projection 264 each extending outward in flange configuration at the upper and lower openings of a tubular portion 260 of cylindrical shape. An annular press-fit portion 266 of downward-projecting configuration is also integrally formed on the outside peripheral edge portion of the fixing plate portion 262.

The oscillating plate 256 is disposed spaced apart diametrically inward from the fixing member 258 and on generally the same center axis therewith, with the support rubber plate 254 arranged spreading out between the diametrically opposed faces of the fixing member 258 and oscillating plate 256. The support rubber plate 254 is vulcanization bonded at the inner and outside peripheral edge portions thereof to the opposing faces of the outside peripheral projection of oscillating plate 256 and the tubular portion 260 of fixing member 258, respectively, so that fluid-tight closure is provided between the oscillating plate 256 and fixing member 258 by the support rubber plate 254.

The partition plate member 250 is of thin disk shape, having an outside diameter dimensioned to be of a size that extends up to the diametrical medial portion of fixing plate portion 262 in fixing member 258. In this embodiment, the outside diameter of partition plate member 250 is smaller, by a predetermined amount, than the inside diameter of the shoulder portion 224 in the second mounting member 214. The center portion of the partition plate member 250 has a circular area, of generally the same size as the outside diameter of the oscillating plate 256, projecting upward in a generally plateau configuration, thereby avoiding coming into abutment with the oscillating plate 256. A pressure transmission passage, e.g., a fluid communication hole 268, is bored with its center axis passing through the thickness of partition plate member 250. Additionally, the partition plate member 250 further includes three or more engaging plates 248, which are integrally formed along the circumference in proximity to the outside peripheral edge portion of the partition plate member 250, while rising upwardly from the partition plate member 250.

At the lower opening of the second mounting member 214, the partition plate member 250 is assembled with the outside peripheral edge portion superimposed against the flange portion 242 of the elastic body outer sleeve member 234 assembled thereat. At the lower opening of the second mounting member 214, the lid member 252 is then assembled from below the partition plate member 250, and the fixing plate portion 262 of the fixing member 258 of lid member 252 is then superimposed against the elastic body outer sleeve member 234 and the partition plate member 250, with the outside peripheral edge portion of each being caulked to the second mounting member 214 by means of the caulking sleeve portion 226.

The outside diameter of the partition plate member 250 is arranged not to reach the shoulder portion 224 of the second mounting member 214, while the outside peripheral edge of the partition plate member 250 is clamped in the axial direction between the outside peripheral edge portion 234 and the fixing member 258 (fixing plate portion 262) which are caulked directly between the shoulder portion 224 and the caulking sleeve portion 226. Accordingly, the caulking force produced by the second mounting member 214 is exerted on the partition plate member 250 via the elastic body outer sleeve member 234 and the fixing member 258, thereby fixedly attaching the partition plate member 250 to the second mounting member 214. There, the engaging plates 248 integrally formed on partition plate member 250 each fit axially inward into elastic body outer sleeve member 234 from the opening and mate against the inside peripheral face of elastic body outer sleeve member 234, thereby effecting positioning in the axis-perpendicular direction.

On the flange portion 242 of the elastic body outer sleeve member 234 is disposed an annular shoulder portion 270 extending in the circumferential direction in the diametrically medial portion. The outside peripheral portion from the shoulder portion 270 is superimposed against the shoulder portion 224, and the inside peripheral portion from the shoulder portion 270 constitutes an annular grip portion 272 positioned in opposition to the fixing plate portion 262, spaced apart thereabove. The partition plate member 250 is held clamped in the axial direction with the outside peripheral edge portion thereof inserted between the annular grip portion 272 and the fixing plate portion 262.

That is, the partition plate member 250 is not positioned or fixed directly with respect to the second mounting member 214, but rather positioned and fixed indirectly with respect to the second mounting member 214, via the elastic body outer sleeve member 234 that is positioned and fixed directly with respect to the second mounting member 214. At the bottom face of partition plate member 250, the fixing plate portion 262 of the fixing member 258 extends diametrically inward from the elastic body outer sleeve member 234 and superimposed against the bottom face of the partition plate member 250. At the inside peripheral edge portion of the fixing plate portion 262, which is situated further towards the inside from the punch holes 269 created in the partition plate member 250 when the engaging plates 248 upraised, a sealing rubber 273 integrally formed with the support rubber plate 254 and bonded by vulcanization to the fixing plate portion 262 is clamped between the fixing plate portion 262 and the partition plate member 250. By means of this arrangement, the punch holes 269 formed in partition plate member 250 are provided substantially fluid-tight closure.

The lower opening of the second mounting member 214 is provided fluid-tight closure by the lid member 252. At the upper side of the partition member 250, which is supported fixedly by the second mounting member 214 and disposed extending in the axis-perpendicular direction, there is formed a pressure receiving chamber 274 whose wall is partially defined by the rubber elastic body 216 and which has a non-compressible fluid sealed therein. That is, the pressure fluctuations are brought about in the pressure receiving chamber 274 through vibration input on the basis of the elastic deformation of the rubber elastic body 216 during vibration input across the first mounting member 212 and second mounting member 214. On the other hand, on the lower side, i.e., the opposite side of the partition plate member 250 from the pressure receiving chamber 274, there is formed an oscillating chamber 276 whose wall is partially defined by the oscillating plate 256 and which has the non-compressible fluid sealed therein. Oscillation of this oscillating chamber 276 is actuated by the electromagnetic oscillator 114, described later, so as to actively control pressure fluctuations in the pressure receiving chamber 274.

The pressure receiving chamber 274 and the oscillating chamber 276 formed above and below the partition plate member 250 in this manner communicate with each other through a fluid communication hole 268 formed in the center of the partition plate member 250. Pressure fluctuations produced in the oscillating chamber 276 by means of oscillation of the oscillating plate 256 are exerted on the pressure receiving chamber 274 through the fluid communication hole 268, whereby pressure in the pressure receiving chamber 274 may be actively controlled.

Further, the rubber elastic body 216 and the diaphragm 230 are directly fixed or post-fixed at their inside peripheral edge portions and the outside peripheral edge portions, respectively, to the first and second mounting members 212, 214, thereby forming an equilibrium chamber 280 having non-compressible fluid sealed therein, between the opposed faces of the rubber elastic body 216 and the diaphragm 230. That is, the equilibrium chamber 280 is partially defined by the readily-deformable diaphragm 230, and readily permits change in volume based on elastic deformation of the diaphragm 230.

A circumferential passage formed between the second mounting member 214 and the elastic body outer sleeve member 234 are held in fluid communication with the pressure receiving chamber 274 and the equilibrium chamber 280 through communication holes 282, 284 formed at the two circumferential ends of the passage, thereby providing an orifice passage 286 extending over a predetermined distance in the circumferential direction for permitting a fluid communication between two chambers 274, 280. The orifice passage 286 can be tuned through appropriate selection of cross section or passage length, so as to give effective passive damping action of, for example specific frequencies such as engine shake, based on resonance of the fluid caused to flow through the orifice passage 286 based on a pressure difference between the pressure receiving chamber 274 and the euqilibrium chamber 280 during vibration input.

As the non-compressible fluid sealed in the pressure receiving chamber 274, the oscillating chamber 276, and the equilibrium chamber 280, it is typically favorable to use low-viscosity fluid with viscosity of 0.1 Pa·s or lower, in order to efficiently obtain vibration damping action based on resonance or flow action of the fluid flowing among chambers 274, 276, 280.

On the opposite side of the lid member 252 from the pressure receiving chamber 274, there is disposed an electromagnetic oscillator 114 as a vibration damping actuator having structure similar to the first embodiment. This electromagnetic oscillator 114 may be chosen appropriately from those known conventionally, on the condition that it be able to generate uniaxial oscillating force, and have controllable oscillation frequency and phase. For instance, the electromagnetic oscillator taught in JP-A-9-89040 or JP-A-2001-1765, or the pneumatic electromagnetic oscillator taught in JP-A-10-238586 or the like may be employed. The electromagnetic oscillator 114 has a generally cup-shaped housing 116, with a flange portion 280 formed on the rim of the opening of this housing 116 caulked while held between the shoulder portion 224 of the second mounting member 214 and the caulking sleeve portion 226, thereby attaching the electromagnetic oscillator 114 to the second mounting member 214.

The drive shaft 86 of the electromagnetic oscillator 114 projects axially upward and is attached to the oscillating plate 256. Like in the first embodiment, oscillating force in the axial direction by the drive shaft 86 of the electromagnetic 114 is exerted on the oscillating plate 256, actuating reciprocation of the oscillating plate 256 in the axial direction.

A tubular bracket 292 is externally fitted onto the outside of the electromagnetic oscillator 114. This tubular bracket 292 has a bracket flange 294 formed at the upper end opening, and a fixing plate portion 296 formed at the lower end opening. The bracket flange 294, together with the housing flange 130 of the housing 116 of the electromagnetic oscillator 114, is caulked while held between the shoulder portion 224 of second mounting member 214 and the caulking sleeve portion 226. A plurality of mounting holes (not shown) are formed in the fixing plate portion 296, and by means of fixing bolts passing through these mounting holes, the tubular bracket 292 is fixed onto a vehicle body (not shown).

The tubular bracket 292, which constitutes a transmission path for load or vibration, together with the second mounting member 214, is disposed with its bracket flange 294 superimposed against the elastic body outer sleeve member 234 and the fixing member 258. With this arrangement, the members are disposed in metal-to-metal abutment with one another with no rubber elastic body interposed and caulked directly by means of the shoulder portion 224 of second mounting member 214 and the caulking sleeve portion 226, whereby they are attached securely to the second mounting member 214. On the other hand, the housing 116 of the actuator 114 is disposed with the housing flange 130 held clamped in the axial direction between the fixing plate portion 262 of the fixing member 258 and the bracket flange 294 of the tubular bracket 292, via a compression rubber 298 serving as a compression rubber affixed to the fixing member 258.

By means of this arrangement, transmission to the actuator 86 of vibration exerted on second mounting member 214 or the tubular bracket 292 is moderated on the basis of elastic deformation by the compression rubber 298. Additionally, the extent of dimensional error in the housing flange 130 of the electromagnetic oscillator 114 can be absorbed through the elastic deformation by the compression rubber 298, thereby avoiding adverse effects on caulking accuracy by the caulking sleeve portion 226.

The engine mount 210 having the construction described above is installed between the power unit and the body in the manner described previously, with the first mounting member 212 mounted on the power unit, and the second mounting member 214 mounted on the body of the vehicle. In the installed state, when vibration is input across the first mounting member 212 and second mounting member 214, fluid flow through the orifice passage 286 is generated on the basis of a pressure differential brought about between the pressure receiving chamber 274 and the equilibrium chamber 280 in association with elastic deformation of the rubber elastic body 216, so that passive vibration damping action is exhibited on the basis of flow action, such as resonance, of the fluid. Also, oscillation of the oscillating plate 256 is controlled by means of actuation control of the electromagnetic oscillator 114 in terms of frequency and phase depending on the vibration being damped, and pressure fluctuations actively generated in the oscillating chamber 276 is transmitted to the pressure-receiving chamber 274 through the orifice passage 268, to thereby actively control pressure fluctuation in the pressure receiving chamber 274. Therefore, the engine mount 210 can provide active damping action with respect to input vibration through active control of pressure fluctuations in vibration receiving chamber 274. In particular, active vibration damping action may be effectively achieved against vibration in the medium-to-high frequency range, which is difficult to damp effectively through passive vibration damping based on resonance or flow action of the fluid caused to flow through orifice passage 268.

In the engine mount 210 of this embodiment, components caulked directly to the second mounting member 214 are the elastic body outer sleeve member 234, the fixing member 258, and the tubular bracket 292. These components are caulked securely through substantial metal-to-metal abutment in the axial direction at the caulking location produced by the shoulder portion 224 and the caulking sleeve portion 226. On the other hand, the electromagnetic oscillator 114 is disposed with the housing flange 130 of the housing 116 held clamped between the fixing plate portion 262 of the fixing member 258 and the bracket flange 294 of the tubular bracket 292, and with caulking force exerted cushion-wise thereon via the compression rubber 298. Therefore, vibration input from the second mounting member 214 to actuator 278 may be reduced on the basis of elastic deformation of compression rubber 298, thereby improving electromagnetic oscillator 114 durability and stability of output characteristics, to more effectively produce the desired active vibration damping action.

According to the engine mount 210 of this embodiment, elastic clamping force exerted in the axial direction on the housing flange 130 can be readily adjusted by appropriately designing the axial height dimension of the annular press-fit portion 266 formed on the fixing member 258.

Also, the fixing plate portion 262 of the fixing member 258 has integrally formed at the outside peripheral edge portion thereof an annular press-fit portion 266 which projects downward in the axial direction. The provision of the press-fit portion 266 advantageously ensures a press fit area on the part of the fixing plate portion 262 vis-á-vis the caulking sleeve portion 226. This facilitates the operation for filling the pressure-receiving chamber 274, the equilibrium chamber 280 and the oscillating chamber 276 with the non-compressible fluid, for example. For instance, the partition plate member 250 is assembled to the second mounting member 214 in the integral vulcanization product of the diaphragm 230 assembled with the integral vulcanization product of the rubber elastic body 216 so as to press fit the fixing member 258 into the caulking sleeve portion 226 while immersed in non-compressible fluid, thereby sealing in the non-compressible fluid at the same time that the pressure receiving chamber 274 and the equilibrium chamber 280 and the oscillating chamber 276 are formed. Then the assembly is withdrawn from the non-compressible fluid, and assembling and caulking the actuator 278 and tubular bracket 292 under the air. That is, by forming the annular press-fit portion 266 on the fixing member 258, it is possible to consistently achieve strong press fit force when press fitting the fixing member 258 into the caulking sleeve portion 226 while immersed in non-compressible fluid, and to consistently seal the non-compressible fluid simply by press fitting of the fixing member 258, thereby making it even easier to consistently perform subsequent caulking in air.

Additionally, the annular press-fit portion 266 formed on the fixing member 258 is disposed with the axial projection distal end face thereof abutting the caulking sleeve portion 226 and having caulking force exerted thereon, via the bracket flange 294 of the tubular bracket 292. Thus, even where the annular press-fit portion 266 is thin-walled, caulking force by the caulking sleeve portion 226 can be exerted consistently. Since the caulking location of the caulking sleeve portion 226 is also superimposed against the highly rigid bracket flange 294, even if a space or rubber elastic body should be present to the inner peripheral side of the annular press-fit portion 226, unwanted deformation during the caulking process can be prevented, affording a more consistent level of caulking force.

In the engine mount 210 of this embodiment, the partition plate member 250 is disposed diametrically inward and away from the shoulder portion 224, and fastened clamped between the elastic body outer sleeve member 234 and the fixing member 258, whereby caulking force on the partition plate member 250 is simply exerted cushion-wise via the elastic body outer sleeve member 234 and fixing member 258, and via a sealing rubber layer 299 bonded by vulcanization to the flange portion 242 of the elastic body outer sleeve member 234. This makes it as much as possible to avoid adverse effects of dimensional error of the partition plate member 250 on caulking accuracy at the caulking location of the elastic body outer sleeve member 234 or the fixing member 258 by the shoulder portion 224 and the caulking sleeve portion 226, so that more consistent caulking is achieved. Further, while it is not the case that partition plate member 250 is positioned directly in the axis-perpendicular with respect to the second mounting member 214, by means of the plurality of engaging plates 248 that fit against the inside peripheral face of the opening of elastic body outer sleeve member 234, it is positioned in the axis-perpendicular direction with respect to the second mounting member 214, via the elastic body outer sleeve member 234.

In short, by disposing both the actuator 278 housing 116 and the partition plate member 250 substantially away from the second mounting member 214 caulking location, the number of parts of the caulking members may be reduced to a corresponding extent, and dimensional accuracy of caulking locations may be advantageously maintained, whereby it becomes possible to carry out consistent caulking, and to advantageously achieve high fixing strength of the elastic body outer sleeve member 234, fixing member 258 and tubular bracket 292 to the second mounting member 214, where fixing strength is especially required.

Additionally, the equilibrium chamber 280 connected to the pressure receiving chamber 274 through orifice passage 286 is formed with an annular configuration to the outside of the rubber elastic body 216. This arrangement makes it possible to form the equilibrium chamber 280 while avoiding as much as possible increased size of the mount in the axial direction, and to provide a fluid filled elastic mount with compact axial size which is capable of obtaining a desired vibration damping action based on actuated oscillation of the oscillating plate 256 as well as passive vibration damping based on resonance of fluid flowing between the pressure receiving chamber 274 and the equilibrium chamber 280.

While the two embodiments of the invention have been shown and described hereinabove with reference to one preferred embodiments for the illustrative purpose only, it is to be understood that the present invention is not limited to the details of the illustrated embodiments. It is also to be understood that the present invention may be embodied with various changes, modifications and improvements which may occur to those skilled in the art, without departing from the spirit and scope of the invention.

For example, whereas in the second embodiment, the partition plate member 250 is provided in order to form the pressure receiving chamber 274 and the oscillating chamber 276, instead, a single pressure receiving chamber may be constituted without providing a fixing plate member. In this case, a portion of the wall of the pressure receiving chamber is constituted by the rubber elastic body 216, and another portion constituted by the oscillating plate 256, so that fluid pressure in the pressure receiving chamber is controlled directly by actuation oscillation of the oscillating plate 256 by means of the electromagnetic oscillator 114.

Even where the partition plate member 250 is employed to form the pressure receiving chamber 274 and oscillating chamber 276, it is possible to form the fluid communication hole 68 connecting the two chambers 274, 276 as a fluid passage that extends a predetermined distance in the circumferential direction, for example. The design of the fluid communication hole 68 may be modified appropriately depending on the damping characteristics required.

Figure 4:
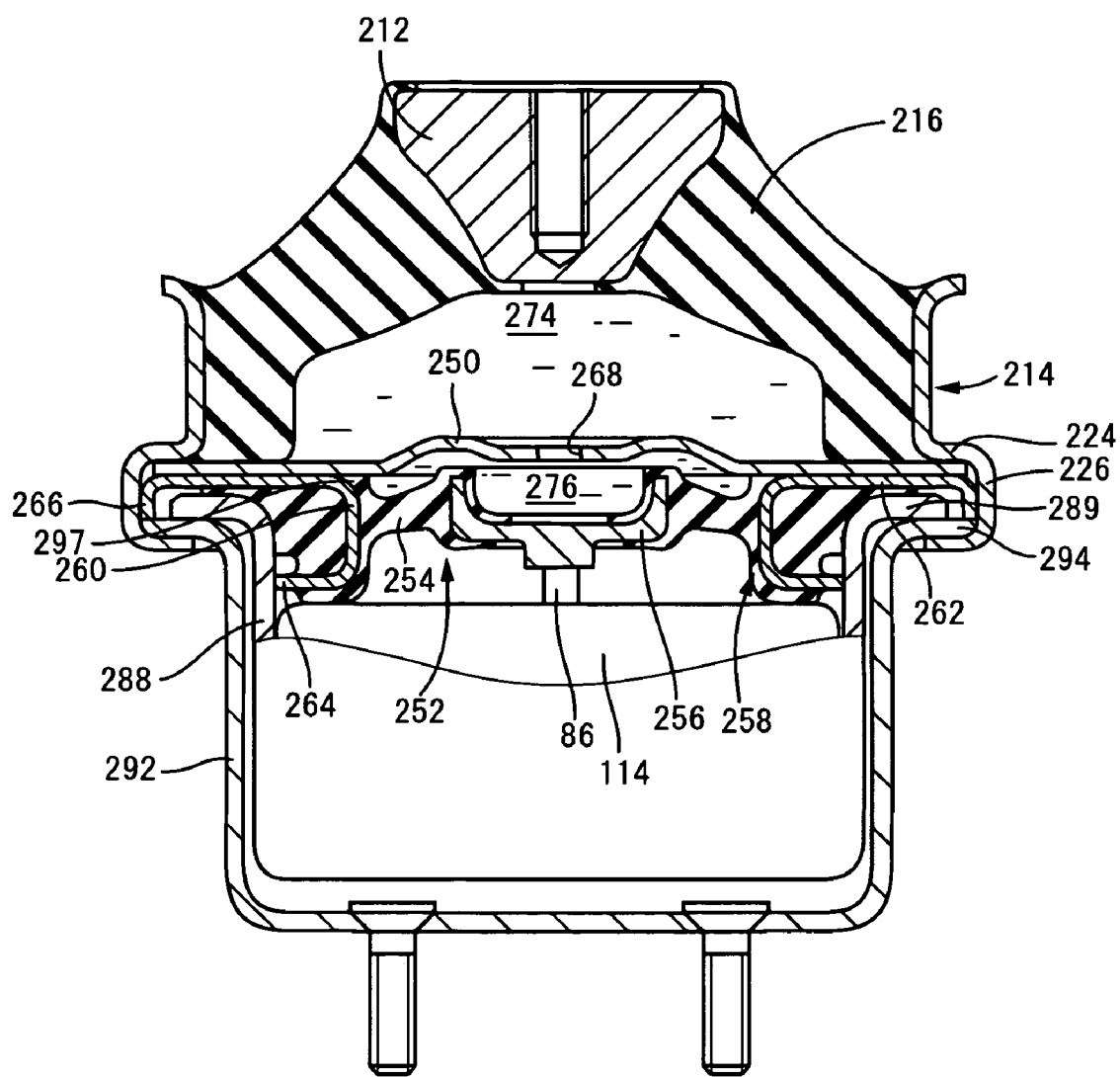
FIG. 4 is a vertical cross sectional view showing a modification of the engine mount of FIG. 3.

The equilibrium chamber 280 and the orifice passage 286 connecting the equilibrium chamber 280 to the pressure receiving chamber 274 employed in the embodiment hereinabove are not essential to practice the present invention. One specific element thereof is shown in FIG. 4, by way of a modification of the second embodiment of the invention. In this arrangement, the first mounting member 212 and the second mounting member 214 are vulcanization bonded directly to the rubber elastic body 216 to form an integral vulcanization product, and the outside peripheral edge portion of the partition plate member 250, together with the fixing member 258 and the tubular bracket 292, is caulked directly to the second mounting member 214. A tubular bracket 292 of bottomed cylindrical shape is employed as a cylindrical base bracket, and by means of a bolt implanted on the floor is attached to the body of the vehicle (not shown). In FIG. 4, parts and areas generally similar in structure to those of the second embodiment are assigned the same reference numbers as in the second embodiment, and are not described in detail.

In the shoulder portion 224 and the caulking sleeve portion 226, to which the fixing member 258 and tubular bracket 292 are caulked directly, a thin sealing rubber layer may be formed covering the inside peripheral face of the shoulder portion 224 and the caulking sleeve portion 226, in order to ensure sealing of the sealed non-compressible fluid, on the condition that caulking strength through substantial metal-to-metal abutment in the axial direction is ensured.

Figure 5:
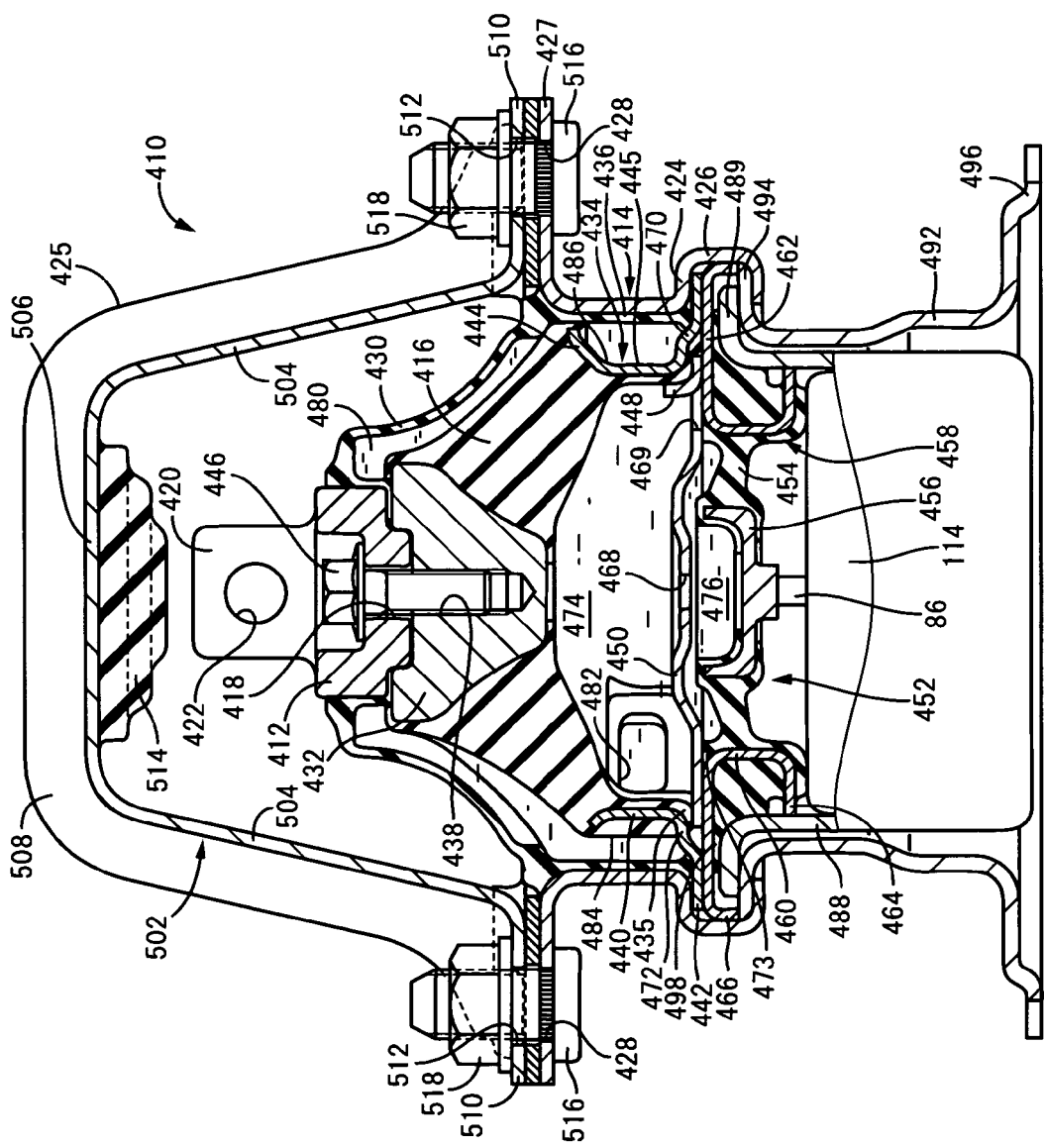
FIG. 5 is an elevational view in axial or vertical cross section of an automotive engine mount constructed according to a third embodiment of the invention.
Figure 6:
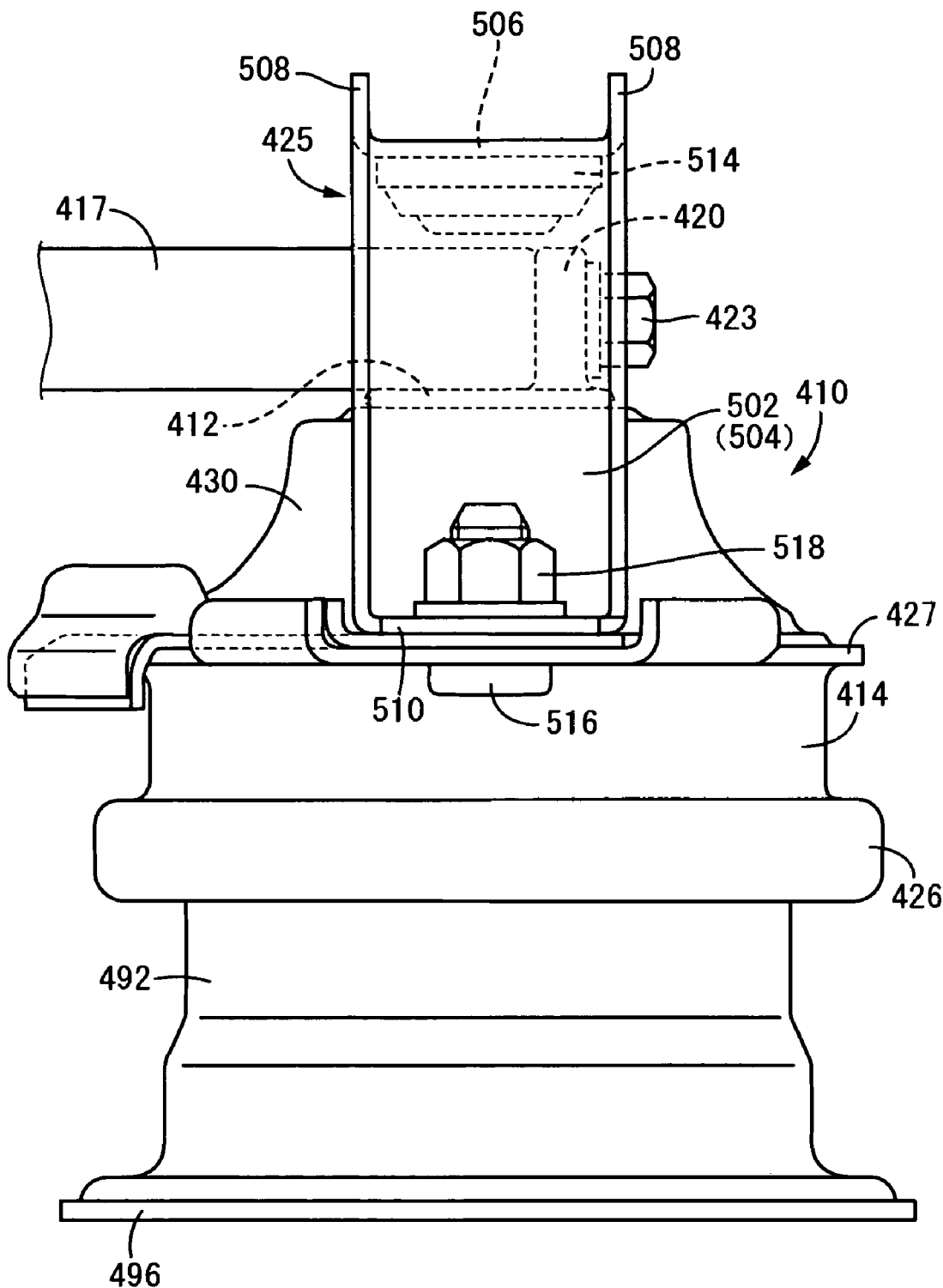
FIG. 6 is a side elevational view of the engine mount of FIG. 5.

Referring next to FIGS. 5–6, there is depicted an automobile engine mount 410 by way of a third element of the invention. In the third embodiment, the same electromagnetic actuator 114 is employed as an active vibration damping actuator. The same reference numerals as used in the first embodiment are used for identifying structurally and functionally corresponding elements, and redundant description for the electromagnetic actuator 114 will not be provided. This engine mount 410 includes a first mounting member 412; a second mounting member 414; and a rubber elastic body 416 elastically connecting the first and second mounting members 412, 414 which are both made of metal. The engine mount 410 is installed on the vehicle such that the first mounting member 412 is attached to a power unit of the vehicle (not shown), while the second mounting member 414 is attached to a body of the vehicle (not shown), so that the power unit is mounted on the body in a vibration-damping or isolating manner. With the engine mount 410 installed on the vehicle as described above, both of the weight of the power unit and a primary vibrational load act across the first mounting member 412 and the second mounting member 414 in an approximately axial direction of the engine mount 410 (i.e., the vertical direction as seen in FIG. 1). In the following description, the vertical direction is basically equal to the vertical direction as seen in FIG. 1, that is substantially equal to the vertical direction of the engine mount installed in position.

Described in detail, the first mounting member 412 takes the form of a thick-walled disk. The first mounting member 412 includes a through hole 418 perforated in its central portion, and a fixing plate portion 420 integrally projecting from an upper face thereof. This first mounting member 412 is fixed to a horizontally extending bracket 417 fastened to the power unit (not shown), by means of a fastening bolt 423 (not shown) passed through a bolt hole 422 bored in the fixing plate portion 420 via a bracket 417 extending in a generally horizontal direction.

The second mounting member 414 takes the form of a thin-walled, large-diameter cylinder. The second mounting member 414 includes a stopper fixing projection 427 integrally formed at an upper axial opening thereof, extending radially outward with a generally annular plate shape. The stopper fixing member 427 has bolt holes 428, 428 for receiving fastening bolt by which a stop member 425 is attached to the stopper fixing member 427. A shoulder portion 424 is integrally formed at a lower axial opening of the second mounting member 414, so as to provide an integrally formed annular cylindrical caulking portion 426 extending axially downward at an outside peripheral portion of the shoulder portion 424.

The first mounting member 412 is arranged some distance upward in the axial direction away from the second mounting member 414, in a coaxial relationship with the member 412. These first and second mounting members 412, 414 are connected together by means of by means of a flexible rubber layer in the form of a diaphragm 430. The diaphragm 430 is formed of a thin rubber film of generally annular shape, which extends in the circumferential direction with a curve cross section having appreciable slack so as to readily permit elastic deformation. The inside peripheral portion of the diaphragm 430 is bonded to the outside peripheral portion of the first mounting member 412 through vulcanization of a rubber material for forming the diaphragm 430. The outside peripheral portion of the diaphragm 430 is bonded through the vulcanization to the peripheral portion of an opening situated at the axial upper end of the second mounting member 414. Namely, the diaphragm 430 is formed as an integral vulcanization molded product comprising the first mounting member 412 and the second mounting member 414.

This integral vulcanization molded product is subsequently assembled with a rubber elastic body 416 (which has been separately vulcanization molded) so that the first mounting member 412 and the second mounting member 414 are connected by means of the rubber elastic body 416.

The rubber elastic body 416 has an overall shape of a large-diameter truncated cone. In the center portion of the rubber elastic body 416, an elastic body inner member 432 is concentrically disposed and bonded through vulcanization of a rubber material for forming the elastic body 416. On an outer circumferential surface of the large diameter end portion of the elastic body 416, an elastic body inner outer sleeve 34 is superimposed and bonded through the vulcanization.

The elastic body inner member 432 has an inverted truncated cone shape, with a tapped hole 438 that opens onto the upper face disposed in the generally center portion thereof. On the other hand, the elastic body outer sleeve 434 comprises a cylindrical wall portion 440 having generally large-diameter cylindrical shape, with a flange 442 spreading diametrically outward being integrally formed at the lower axial end of this cylindrical wall portion 440, and with the axial upper end of the cylindrical wall portion 440 constituting a tapered cylindrical portion 444 that gradually flares out as it goes upwards in the axial direction. With this arrangement, a circumferential groove 445 is formed extending about an outer circumferential surface of the elastic body outer sleeve 434 over a distance just shorter than a circumference of the cylindrical wall portion 440, while being open in an outer circumferential surface of the elastic body outer sleeve 434. When bonded through the vulcanization to the rubber elastic body 416, an outer circumferential surface of the inverted taper of the elastic body inner member 432 and the tapered cylindrical portion 444 of the elastic body outer sleeve 434 are positioned spaced apart facing to each other, with the opposing faces of the elastic body inner member 432 and elastic body outer sleeve 434 being elastically connected by means of the rubber elastic body 416.

The integral vulcanization molded product of the diaphragm 430 is then assembled with the integral vulcanization molded product of the rubber elastic body 416 by being superimposed thereon from above. With this arrangement, the first mounting member 412 is superposed on the upper face of the elastic body inner member 432 and fixed thereon, and the second mounting member 414 is externally fitted onto the elastic body inner member 434, while the diaphragm 430 disposed some distance outward from the rubber elastic body 416, so as to cover the entire outside face of the rubber elastic body 416.

That is, the first mounting member 412 is superimposed directly on the upper face of the elastic body inner member 432, and these are fastened together by a connecting bolt 446. Projection/recess mating portions are disposed on the superimposed faces of the first mounting member 412 and the elastic body inner member 432, to position them in the axis-perpendicular and circumferential directions. On the other hand, the elastic body outer sleeve 434, meanwhile, is arranged at the lower end thereof such that an outside peripheral portion of the flange 442 is superimposed directly in the axial direction onto the shoulder portion 424, and at the upper end thereof such that the peripheral portion of the opening of the tapered cylindrical portion 444 is superimposed in the diametrical direction onto the inner circumferential surface of the second mounting member 414 over the entire circumference thereof.

The elastic body outer sleeve 434 and the second mounting member 414 are fastened together by being assembled through caulkwise fixation of the cylindrical caulking portion 426 of the second mounting member 414 to the outside peripheral portion of the flange 442 of the elastic body outer sleeve 434. At locations where the upper and lower edges of the elastic body outer sleeve 434 are superimposed against the second mounting member 414, there is interposed a sealing rubber 436 integrally formed with the rubber elastic body 416 or the diaphragm 430, to thereby provide a fluid-tight sealing. By means of this arrangement, the circumferential groove 445 formed about the elastic body outer sleeve 434 is covered in a fluid-tight fashion, by the second mounting member 414. Thus, a passage extending a predetermined distance in the circumferential direction is formed between the diametrically opposed faces of the second mounting member 414 and the cylindrical wall portion 440 of the elastic body outer sleeve 424.

To the lower opening of the elastic body outer sleeve 434 is assembled a partition member composed of the partition member 450 and the lid member 452. The lid member 452 includes a supporting rubber elastic body in the form of a support rubber plate 454. An oscillating plate 456 bonded by vulcanization of a rubber material for forming the support rubber plate 454 to the central portion of the support rubber plate 454. Likewise, a fixing member 458 is bonded by the vulcanization to the outer peripheral portion of the support rubber plate 454. Therefore, the oscillating plate 456 and the fixing member 458 are elastically connected by the supporting rubber plate 54.

The oscillating plate 456 is a disk shaped member made of rigid material such as metal or hard resin, and has a circular peripheral projection integrally formed at the outside edge thereof projecting upwardly. The annular fixing member 460 is a metallic member having a cylindrical shaped tubular portion 460. A fixing plate portion 462 (which extends in a flange configuration), and a positioning projection 454 are integrally formed at the upper and lower openings of the tubular portion 460, respectively. A circular press-fit part 466 is integrally formed at the outside peripheral portion of the fixing plate portion 462 so as to project further downwards.

This oscillating plate 456 is arranged substantially concentrically with and spaced apart diametrically inwardly from the fixing member 458. The supporting rubber plate 454 is arranged so as to extend between the diametrically opposed faces of the fixing member 58 and the oscillating plate 56. The supporting rubber plate 54 is bonded at its inner and outer peripheral portions to the opposing faces of the outer peripheral projection of the oscillating plate 56 and the tubular portion 60 of the fixing member 58, through vulcanization process of a rubber material for forming the supporting rubber plate 54. With this arrangement, a gap formed between the oscillating plate 56 and the fixing member 58 is fluid tightly closed by means of the supporting rubber plate 54.

The partition member 450 is a thin disk metallic member having an outside diameter of size extending as far as the diametric medial portion of the fixing plate portion 462 of the fixing member 458. In this embodiment, the outside diameter of the partition member 450 is smaller, by a predetermined amount, than the inside diameter dimension of the shoulder portion 424 of the second mounting member 414. The center portion of the partition member 450 is a circular zone of size approximately equal to the outside diameter of the oscillation plate 456, projecting upward in a generally plateau-like configuration, so as to avoid contact with the oscillation plate 456. The partition member 450 is perforated through its thickness on its center axis by a fluid passage 468 that serves as a pressure transmission flow passage. The partition member 450 further includes three engaging plate 448, which are integrally formed along the circumference in proximity to the outside peripheral edge portion of the partition plate member 250, while rising upwardly from the partition plate member 250.

The partition member 450 is assembled in the lower opening of the second mounting member 414, with its outside peripheral portion superimposed against the flange 442 of the elastic body outer sleeve 434 assembled therewith. Additionally, the lid member 452 is assembled in the lower opening of the second mounting member 414 from below the partition member 450, and the fixing plate portion 462 of the fixing member 458 in the lid member 452 is superimposed onto the elastic body outer sleeve 434 and the partition member 450. The thus arranged partition member 450 and the lid member 452 are fixed caulkwise at their outside peripheral portions to the second mounting member 414 by pressingly bending the cylindrical caulking portion 426 of the second mounting member 414 against the outside peripheral portions in the process of caulking fixation.

The partition member 450 has an outside diameter adjusted so as not to reach the shoulder portion 424 of the second mounting member 414. That is, the outside peripheral portion of the partition member 450 is sandwiched in the axial direction between the fixing member 458 (fixing plate portion 462) and the elastic body outer sleeve 434, which are fixed caulkwise directly between the shoulder portion 424 and the cylindrical caulking portion 426. With this arrangement, the partition member 450 is attached fixedly to the second mounting member 414, with the caulking force of the second mounting member 414 exerted indirectly thereon via the elastic body outer sleeve 434 and the fixing member 458. The three engaging projections 448 integrally formed on partition member 450 fit in the axial direction into the elastic body outer sleeve 434 through the opening, and by being superimposed against the inner circumferential surface of the elastic body outer sleeve 434, whereby the partition member 450 is effectively positioned in the axis-perpendicular direction.

On the flange 442 of the elastic body outer sleeve 434, there is disposed an annular stepped portion 470 that extends in the circumferential direction in the diametrically medial portion of the flange 442. The portion situated radially outward of the stepped portion 470 is superimposed on the shoulder portion 424 of the first mounting member 414, whereas the portion situated radially inward of the stepped portion 470 is deflected upwardly from the fixing plate portion 462, thereby forming an annular gripping part 472. This annular gripping part 472 cooperates with the fixing plate portion 462 to grip therebetween the outside peripheral portion of the partition member 450 inserted into the spacing therebetween. Thus, the partition member 450 is held fixed in the axial direction.

That is, the partition member 450 is neither positioned nor fixed directly with respect to the second mounting member 414, but is rather positioned and fixed indirectly with respect to the second mounting member 414 via the elastic body outer sleeve 434, which is positioned directly and fixed caulkwise to the second mounting member 414. At the bottom face of the partition member 450, the fixing plate portion 462 of the fixing member 452 extends diametrically inward beyond the elastic body outer sleeve 434, and is superimposed against the bottom face of the partition member 450. The inside peripheral portion of the fixing plate portion 462 is positioned radially inward of the punch-out holes 469 of the partition member 450, where a sealing rubber layer 473, integrally formed with the supporting rubber plate 454 and bonded by vulcanization to the fixing plate portion 462, is held sandwiched between the fixing plate portion 462 and the partition member 450. By means of this arrangement, the punch-put holes 469 and the cutout openings for the engaging projections 448 in partition member 450 may be provided with substantially liquid-tight closure. As is understood from the above description, a sealing portion in this embodiment is constituted by a sealing rubber layer 73 and the fixing plate portion of the fixing member 58.

With the arrangement as discussed above, the opening at the lower end of the second mounting member 414 is closed in a fluid-tight fashion by the lid member 452, and a pressure-receiving chamber 474 having a non-compressible fluid sealed therein and partially defined by the rubber elastic body 416, is formed on the upper side of the partition member 450, which extends in the axis-perpendicular direction fixedly supported by the second mounting member 414. This pressure-receiving chamber 474 is designed to excite fluid pressure variation based on elastic deformation of the rubber elastic body 416 when vibration is input across the first mounting member 412 and second mounting member 414. On the other side of the partition member 450, i.e. opposite from the pressure-receiving chamber 474, there is formed an oscillating chamber 476 having a non-compressible fluid sealed therein and partially defined by the oscillation plate 456. This oscillating chamber 476 is designed to be positively controlled in its fluid pressure variations, in response to oscillatory actuation of the oscillation plate 456 by an electromagnetic actuator 114 (which will be described later).

The pressure-receiving chamber 474 and the oscillating chamber 476 formed above and below the partition member 450 are held in fluid communication with each other through a fluid passage 468 formed in the center of the partition member 450. Therefore, pressure variations produced in the oscillating chamber 476 by oscillation of the oscillation plate 56 are transmitted via the fluid passage 68 to pressure-receiving chamber 74, whereby pressure in the pressure-receiving chamber 474 can be positively or actively controlled.

Furthermore, the rubber elastic body 416 and the diaphragm 430 are each directly bonded or attached at their inside peripheral portion and outside peripheral portion to the first mounting member 412 and the second mounting member 414, thereby forming an equilibrium chamber 480 having a non-compressible fluid sealed therein, between the opposing faces of the rubber elastic body 416 and the diaphragm 430. This equilibrium chamber 480 is partially defined by the readily deformable diaphragm 430, and is designed to readily allow change in volume, based on elastic deformation of the diaphragm 430.

Additionally, a circumferential passage formed between the second mounting member 414 and the elastic body outer sleeve 434 connects at both circumferential ends thereof with the pressure-receiving chamber 474 and equilibrium chamber 480 via communication holes 482, 484. This arrangement provides a fluid communication between the pressure-receiving chamber 474 and equilibrium chamber 480, and forms over a predetermined distance an orifice passage 486 that permits flow of fluid between the two chambers 474, 480. The orifice passage 486 is tuned by suitably adjusting the passage cross sectional area and the passage length so that the engine mount 410 can exhibit damping effect with respect to a specific frequency range of input vibration, e.g., a low frequency range of engine shakes, based on resonance of fluid flows through the orifice passage 486 due to a pressure differential between the pressure-receiving chamber 474 and equilibrium chamber 480.

As the non-compressible fluid sealed within the pressure-receiving chamber 474, oscillating chamber 476 and equilibrium chamber 480, it is typically favorable to employ a fluid having a low viscosity of not larger than 0.1 Pa·s, for example, in order to efficiently achieve effective damping action based on resonance of fluid induced to flow among the chambers 474, 476, 480.

The aforesaid actuator 114 is disposed on the opposite side of the lid member 452 remote from the pressure-receiving chamber 474. As the actuator 114, there may be employed any suitable component known in the art, with the proviso that it be able to generate unidirectional oscillating force, and have controllable oscillating force frequency and phase. Besides the electromagnetic actuators disclosed JP-A-9-89040 and JP2001-1765, for example, there could be employed the pneumatic actuator disclosed in JP-A-10-238586, for example, or other similar device. This kind of actuator 478 comprises a generally cup-shaped housing 116, with a housing flange 130 formed on the rim of the housing 116, which is fixed caulkwise held between the shoulder portion 424 of the second mounting member 414 and the cylindrical caulking portion 426, to assemble the actuator 478 to the second mounting member 414.

A cylindrical base bracket 492 is attached to the actuator 478, fitted about the exterior thereof. This base bracket 492 has a flange 494 formed at the upper end opening and a fixing plate portion 496 formed at the lower end opening. The flange 494, together with the housing flange 130 of the actuator 114, is fixed caulkwise held between the shoulder portion 424 of the second mounting member 414 and the cylindrical caulking portion 426. A plurality of mounting holes (not shown) are formed in the fixing plate portion 496, and the cylindrical bracket 492 is fastened to the body of the vehicle (not shown) by means of fastening bolts passed through these mounting holes.

The base bracket 492, which together with the second mounting member 414 constitutes a transmission path for load or vibration, is disposed with the bracket flange 494 thereof superimposed directly against the elastic body outer sleeve member 434 and the fixing member 458 in metal-to-metal abutment therewith, and caulked directly by the shoulder portion 424 of second mounting member 414 and the caulking sleeve portion 426, whereby it is attached securely to the second mounting member 414. On the other hand, the housing 116 of electromagnetic oscillator 114 is disposed with the housing flange 130 thereof held clamped in the axial direction between the fixing plate portion 462 of the fixing member 458 and the bracket flange 494 of the base bracket 492, via a compression rubber 498 serving as a compression rubber affixed to the fixing member 458.

By means of this arrangement, transmission to the actuator 114 of vibration exerted on the second mounting member 414 or the base bracket 492 is moderated on the basis of the elastic deformation by the compression rubber 498. Additionally, the extent of dimensional error in the housing flange 130 of the housing 116 of the electromagnetic oscillator 114 can be absorbed through elastic deformation by the compression rubber 498, thereby avoiding adverse effects on caulking accuracy by the caulking sleeve portion 426. Positioning of the electromagnetic oscillator 114 and the housing 116 in the diametrical direction on the second mounting member 414 is effected by means of the outside peripheral face of the opening of the tapered cylindrical portion 444 of the elastic body outer sleeve member 434 fitting together with the second mounting member 414.

The base bracket 492 in its entirety, including the bracket flange 494 and fixing plate 496 thereof, is formed from rigid metal material of sufficient thickness dimension, to give high strength sufficient to withstand vibration load and support load from the power unit. The outside diameter dimension of the bracket flange 494 is slightly smaller than the inside diameter dimension of the caulking sleeve portion 426 of the second mounting member 414. By means of this arrangement, the projecting distal end face of annular press-fit portion 466 is directly mated in abutment against the outside peripheral edge portion of bracket flange 494. That is, in the constricted location in the axial direction produced by caulking between the caulking sleeve portion 426 and shoulder portion 424 of the second mounting member 414, the fixing plate member 450, fixing member 458 (annular press-fit portion 466) and base bracket 492 (bracket flange 494) are fixed while mated in a state of substantial metal-to-metal abutment between the shoulder portion 424 and caulking sleeve portion 426.

The outside diameter dimension of the flange portion 442 of elastic body outer sleeve member 434 fixedly supported by means of second mounting member 414 is smaller by a predetermined amount than the inside diameter dimension of the caulking sleeve portion 426, forming a gap in the diametrical direction between the outside peripheral face of the flange portion 442 and the caulking sleeve portion 426. By means of this arrangement, even if the connection location of shoulder portion 424 and caulking sleeve portion 426 (the riser location of caulking sleeve portion 426) has a curving shape, adverse effects resulting from abutment by the flange portion 442 are avoided. In order for caulking force to be exerted effectively between the flange portion 442 and annular press-fit portion 466 of fixing member 458, dimensions are established such that the flange portion 442 extends out into proximity with the riser location of annular press-fit portion 466. Preferably, the outside diameter dimension of the flange portion 442 may be about the same as the inside diameter dimension of the annular press-fit portion 466.

Additionally, the base bracket 492 has a chamfer 500 extending all the way around the circumference thereof, on the outside peripheral corner of the face opposed to the superimposed face of the annular press-fit portion 466 in the bracket flange 494. This chamfer 500 is a 45° chamfer of a shape produced by cutting off a corner portion of its cross sectional shape. In the enlarged view shown in FIG. 7, the size thereof is preferably a chamfer width "y" such that $0.2$ mm $\leq y \leq x$, and more preferably $0.2$ mm$\leq y \leq x/2$, where x denotes the width dimension of the distal abutting face of annular press-fit portion 466. Where the mounting member and the base bracket are fabricated of typical steel plate several millimeters in thickness, it is preferable that $0.2$ mm $\leq y \leq 1.0$ mm, and more preferable that $0.2$ mm$\leq y \leq 0.5$ mm.

On the other hand, a stopper member 502 is assembled to the upper opening end of the second mounting member 414. This stopper member 502 has a generally gate shape overall, obtained by bending a metal plate of predetermined width, and comprises a pair of leg portions 504, 504 and an upper wall portion 506 extending generally horizontally. At the two widthwise ends of rebound stop member 502, there are formed a pair of reinforcing ribs 508, 508 extending across the entire length of the pair of leg portions 504, 504 and upper wall portion 506. The distal end portions of the pair of leg portions 504, 504 are bent horizontally to produce flat fixation plate portions 510, 510, with a fixation bore 512 formed in each fixation plate portion 510.

The stopper member 502 is superimposed from above against the opening of the second mounting member 414, and disposed straddling, in one direction along the diametrical direction, the rubber elastic body 416 that projects from the opening of the second mounting member 414, the diaphragm 430, the first mounting member 412, etc. The stopper member 502 is assembled spaced apart by a predetermined distance from the rubber elastic body 416, diaphragm 430, and first mounting member 412. In particular, the upper wall portion 506 is positioned in opposition to the first mounting member 412 and spaced apart thereabove in the axial direction, and the bottom face, i.e., the face the upper wall portion 506 opposed to the first mounting member 12, is covered with a projecting rubber buffer 514.

The fixation plate portions 510, 510 at the two ends of stopper member 502 are superimposed against the stopper fixing portion 427 of the second mounting member 414, with the fixation bores 512, 512 of fixation plate portions 510, 510 aligned with bolt holes 428, 428 formed in the stopper fixing portion 427. Fixation bolts 516, 516 implanted in the bolt holes 428, 428 are passed through fixation bores 512, 512 and fastened to the stopper fixing portion 427 by means of fastening nuts 518, 518. This arrangement constitutes a stopper mechanism in the rebound direction. With the engine mount 410 installed in position, when vibrational load is exerted in the rebound direction (direction of separation of the two members 412, 414) across the first mounting member 412 and the second mounting member 414, the bracket 417 bolted to the first mounting member 412 abuts against the stopper member 502 via the rubber buffer 514, providing cushion-wise limitation of relative displacement of the first mounting member 412 and the second mounting member 414 in direction of separation thereof.

The engine mount 410 having the construction described above is installed between the power unit and the body in the manner described previously, with the first mounting member 412 attached to the power unit on the one hand, and with the second mounting member 414 attached to the vehicle body. In this installed state, when vibration is input across the first mounting member 412 and second mounting member 414, fluid flow through the orifice passage 486 is generated on the basis of a pressure difference brought about between pressure receiving chamber 474 and the equilibrium chamber 480 in association with elastic deformation of rubber elastic body 416, so that passive vibration damping action is exhibited on the basis of flow action such as resonance of the fluid. Further, by controlling actuation of electromagnetic oscillator 414 depending on the vibration being damped when actuating oscillation of the oscillating plate 456, pressure fluctuations may be exerted by oscillating chamber 476 on pressure receiving chamber 474 through orifice passage 468, so that active damping action of input vibration can be obtained through active control of pressure fluctuations in vibration receiving chamber 474. In particular, active vibration damping action may be effectively achieved against vibration in the medium-to-high frequency range, which is difficult to damp effectively through passive vibration damping based on flow action of fluid caused to flow through orifice passage 486.

The fixing plate portion 462 of fixing member 458 has integrally formed at the outside peripheral edge portion thereof the annular press-fit portion 466 which projects upward in the axial direction, advantageously ensuring a press fit area on the part of the fixing plate portion 462 vis-á-vis the caulking sleeve portion 426. This facilitates the operation for filling the pressure-receiving chamber 474, the equilibrium chamber 480 and the oscillating chamber 476 with the non-compressible fluid. For instance, the partition plate member 450 is assembled to the second mounting member 414 in the integral vulcanization product of the diaphragm 430 assembled with the integral. vulcanization product of the rubber elastic body 416 so as to press fit the fixing member 458 into the caulking sleeve portion 426 while immersed in non-compressible fluid, thereby sealing in the non-compressible fluid at the same time that the pressure receiving chamber 474 and the equilibrium chamber 480 and the oscillating chamber 476 are formed. Then the assembly is withdrawn from the non-compressible fluid, and assembling and caulking the actuator 478 and the base bracket 492 under the air. That is, by forming the annular press-fit portion 466 on the fixing member 458, it is possible to consistently achieve strong press fit force when press fitting the fixing member 458 into the caulking sleeve portion 426 while immersed in non-compressible fluid, and to consistently seal the non-compressible fluid simply by press fitting of the fixing member 458, thereby making it even easier to consistently perform subsequent caulking in air. Additionally, since the annular press-fit portion 466 is disposed projecting downward, it is possible to readily press fit the annular press-fit portion 466 into the caulking sleeve portion 426 utilizing as a guide face the rounded outer peripheral face formed in the curved portion from the fixing plate portion 462, which is the basal end of the annular press-fit portion 466.

The chamber 500 of specific size is produced on the bottom outside peripheral corner of the bracket flange 494 of the base bracket 492 caulked by caulking sleeve portion 426, whereby component strength, durability and caulking force at the caulking location may each be advantageously and consistently achieved. That is, since a chamfer 500 is produced on the corner of the bracket flange 494 which is caulked abutting against the curved portion of the caulking sleeve portion 426, even where caulking force is quite strong, plastic deformation and localized thinning of the caulking sleeve portion 426 due to the corner of the bracket flange 494 entering the curved portion of the caulking sleeve portion 426 can be reduced or avoided altogether, so that even when caulked under strong caulking force, diminished component strength or durability due to localized thinning can be avoided, so that good caulking force is consistently achieved.

The chamfer 500 on the bracket flange 494 is smaller than the width dimension of the distal end abutting face of the annular press-fit portion 466 which superimposed with the upper face of the outside peripheral edge portion of the bracket flange 494. Therefore, the caulking force of the caulking sleeve portion 426 is exerted on the annular press-fit portion 466 directly via the bracket flange 494, with no intervening space, whereby a high level of caulking force may be achieved more efficiently and consistently, and made to act on the fixing member 458 and the bracket flange 494. Accordingly, when assembling the engine mount 10 of this embodiment, where with the base bracket 492 attached, the fastening nuts 518, 518 are tightened onto the fixation bolts 516, 516 to mount the stopper member 102 onto the second mounting member 414. Thus, a high level of tightening reaction force can be exerted consistently from base bracket 492 to the second mounting member 414, so that fastening nuts 518, 518 can be consistently and readily tightened securely with a high level of force.

Figure 7:
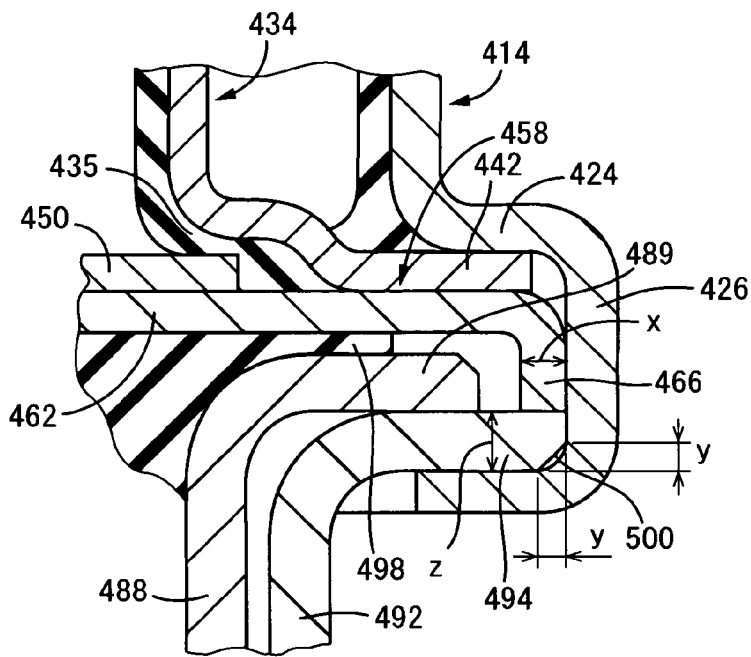
FIG. 7 is an enlarged fragmental view showing a principle part of the engine mount of FIG. 5.
Figure 8:
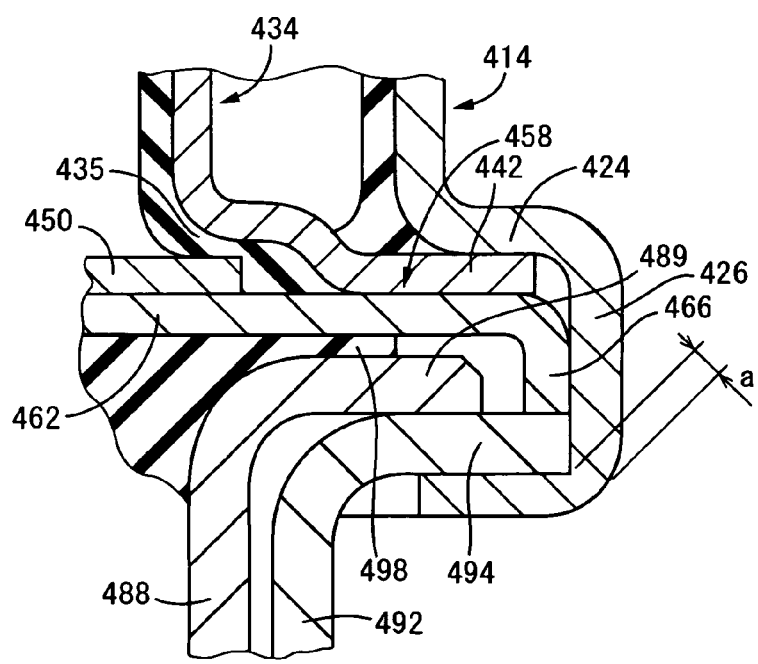
FIG. 8 is a view corresponding to FIG. 7, showing a principle part of an engine mount of a comparative example.

Fixing force produced by varying component dimensions as indicated in FIG. 7 were actually measured, and obtained measurements of relative rotational torque (kgf·m) in the caulking location of the second mounting member 414 and the base bracket 492, are given in Table 1 hereinbelow. During the measurement, comparison with a structure in which the bracket flange 494 was not chamfered, as in a comparison illustrated in FIG. 8, demonstrated that whereas with the comparison structure, the thickness dimension "a" of the curved portion of caulking sleeve portion 426 experience thinning, the structures according to the invention given in Table 1 all ensured ample thickness dimension in the curved portion of the caulking sleeve portion 426. Accordingly, taken into consideration together with the results in Table 1, it is clear that structures according to the invention can afford both excellent caulking force, and good component strength and durability. In the Table, z denotes thickness dimension of the bracket flange 494.

TABLE 1

| Examples | x (Dimension) | y (Dimension) | z (Dimension) | y/z | Rotational Torque (kgf · m) |
|---|---|---|---|---|---|
| No. 1 | 2.0 mm | 2.0 mm | 3.2 mm | 1.0 | 6–5 |
| No. 2 | 2.0 mm | 1.0 mm | 3.2 mm | 0.5 | 12–15 |
| No. 3 | 2.0 mm | 0.5 mm | 3.2 mm | 0.25 | 20 or greater |

The annular press-fit portion 466 formed on fixing member 458 exerts caulking force by means of the axial projecting distal end face thereof coming into abutment with the caulking sleeve portion 426 via the bracket flange 494 of the base bracket 492, so that even if the annular press-fit portion 466 should undergo thinning, consistent caulking force will nevertheless be exerted by the caulking sleeve portion 426. Also, since the caulking location of the caulking sleeve portion 426 mates against the highly rigid bracket flange 494, even if a space or rubber elastic body should be present to the inner peripheral side of the annular press-fit portion 466, unwanted deformation during the caulking process can be prevented, affording a more consistent level of caulking force.

In the engine mount 410 of this embodiment, components caulked directly to the second mounting member 414 are the elastic body outer sleeve member 434, fixing member 458, and the base bracket 492. These components are caulked securely through substantial metal-to-metal abutment in the axial direction at the caulking location produced by the shoulder portion 424 and the caulking sleeve portion 426. On the other hand, the electromagnetic oscillator 114 is disposed with the housing flange 130 of the housing 116 thereof held clamped between fixing plate portion 462 of the fixing member 458 and the bracket flange 494 of the base bracket 492, with caulking force exerted cushion-wise thereon via the compression rubber 498. Therefore, vibration input from the second mounting member 414 to the electromagnetic oscillator 114 may be reduced on the basis of the elastic body deformation of the compression rubber 498, thereby improving electromagnetic oscillator 114 durability and stability of the output characteristics.

Also, in the engine mount 410 of this element, the fixing plate member 450 is disposed diametrically inward away from the shoulder portion 424, and fastened clamped between the elastic body outer sleeve member 434 and fixing member 458. With this arrangement, caulking force on the fixing plate member 450 is simply exerted cushion-wise via the elastic body outer sleeve member 434 and fixing member 458, and via a sealing rubber layer 435 vulcanization bonded to the flange portion 442 of elastic body outer sleeve member 34. This makes it possible to effectively avoid adverse effects of dimensional error of the fixing plate member 450 on caulking accuracy at the caulking location of the elastic body outer sleeve member 434 or the fixing member 458 by the shoulder portion 424 and the caulking sleeve portion 426, so that more consistent caulking is achieved. Further, while it is not the case that fixing plate member 450 is positioned directly in the axis-perpendicular with respect to the second mounting member 414, by means of the plurality of engaging plates 448 that fit against the inside peripheral face of the opening of elastic body outer sleeve member 434, it is positioned in the axis-perpendicular direction with respect to the second mounting member 414, via the elastic body outer sleeve member 434.

In short, by disposing both the housing 116 of the actuator 114 and the fixing plate member 450 substantially away from the second mounting member 414 caulking location, the number of parts of the caulking members may be reduced to a corresponding extent, and dimensional accuracy of caulking locations may be advantageously maintained. This makes it possible to carry out consistent caulking, and to advantageously achieve high fixing strength of the elastic body outer sleeve member 434, the fixing member 458 and the base bracket 492 to the second mounting member 414, where fixing strength is especially required.

In the engine mount 410 of the present embodiment, since the equilibrium chamber 480 connected to the pressure receiving chamber 474 through the orifice passage 486 is formed with an annular configuration to the outside of the rubber elastic body 416, it is possible to form the equilibrium chamber 480 while avoiding as much as possible increased size of the mount in the axial direction, and to achieve, in compact mount axial size, a sealed fluid mount by which may be advantageously obtained both active vibration damping action, based on actuated oscillation of the oscillating plate 456, and passive vibration damping based on resonance of fluid flowing between pressure receiving chamber 474 and equilibrium chamber 480.

While three embodiments of the invention have been shown and described hereinabove with reference to one preferred embodiments for the illustrative purpose only, the present invention is not limited to the details of the illustrated embodiments, but may otherwise be embodied.

For example, whereas in the element hereinabove, a fixing plate member 450 is provided in order to form the pressure receiving chamber 474 and the oscillating chamber 476, instead, an entire single pressure receiving chamber could be constituted without providing a fixing plate member, with a portion of the wall of the pressure receiving chamber being constituted by the rubber elastic body 416, and another portion constituted by the oscillating plate 456, with pressure in the pressure receiving chamber being controlled directly by actuation oscillation of the oscillating plate 456 by means of the electromagnetic oscillator 114.

Even where the fixing plate member 450 is employed to form the pressure receiving chamber 474 and oscillating chamber 476, it is possible to form the fluid communication hole 468 connecting the two chambers 474, 476 as a fluid passage that extends a predetermined distance in the circumferential direction, for example. The design of the fluid communication hole 468 may be modified appropriately depending on the damping characteristics required.

Figure 9:
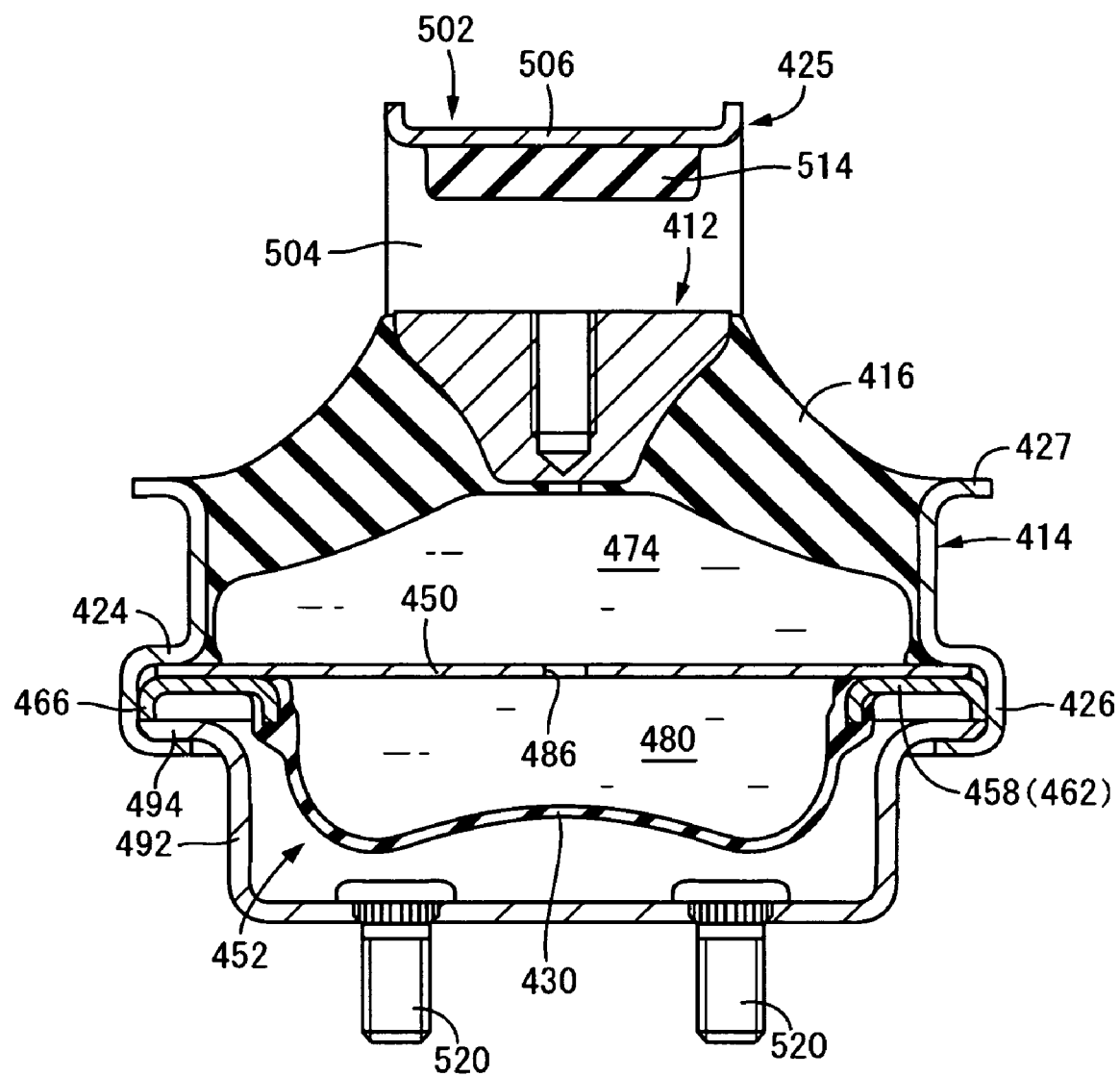
FIG. 9 is a vertical cross sectional view showing a modification of the engine mount of FIG. 5.

Further, the oscillating chamber 476 and the fluid communication hole 468 connecting the oscillating chamber 476 to the pressure receiving chamber 474 employed in the embodiment hereinabove are not indispensable in the present invention. One specific element thereof is shown in FIG. 9, by way of a modification of the third embodiment of the invention. In this modification, as shown in the drawing, the first mounting member 412 and the second mounting member 414 are vulcanization bonded directly to the rubber elastic body 416 to form an integral vulcanization product, and the outside peripheral edge portion of the fixing plate member 450, together with the fixing member 458 and the base bracket 492, is caulked directly to the second mounting member 414. On the lid member 452, there is disposed a diaphragm 430 by way of a flexible film composed of a thin rubber film, arranged so as to provide fluid-tight closure to a central through hole in fixing member 458 having an annular plate configuration. By means of this arrangement, a pressure receiving chamber 474 is formed to the upper side of fixing plate member 450 and an equilibrium chamber 480 is formed to the lower side of fixing plate member 450, the pressure receiving chamber 474 and equilibrium chamber 480 communicating with each other through an orifice passage 486 passing through fixing plate member 450. A base bracket 492 member of bottomed cylindrical shape is employed as a cylindrical base bracket, and by means of a fixing bolt 520 implanted on the floor, is attached to the body of a car, not shown. In FIG. 9, parts and areas generally similar in structure to those of the third embodiment hereinabove are assigned the same reference numerals as in the third embodiment, and are not described in detail.

According to the illustrated third embodiment, at the shoulder portion 424 and the caulking sleeve portion 426 to which the fixing member 458 and the base bracket 492 are caulked directly, the thin sealing rubber layer is formed covering the inside peripheral face of the shoulder portion 24 and the caulking sleeve portion 426, in order to ensure sealing of the sealed non-compressible fluid, on the condition that caulking strength through substantial metal-to-metal abutment in the axial direction is ensured. The sealing rubber layer may be integrally formed by extending the diaphragm 430 along the inside peripheral face of the second mounting member 414, for example.

Additionally, the present invention may be realized advantageously by including a bound stop mechanism for cushion-wise limiting of the amount of elastic deformation of the rubber elastic body in the bound direction. Hereinbelow, an active vibration damping apparatus comprising a vibration damping actuator pertaining to the present invention, equipped with such a bound stop mechanism, is described with reference to FIGS. 10–13, by way of a fourth embodiment of the invention. In the fourth embodiment hereinbelow, since an electromagnetic oscillator 114 similar to that in the preceding elements is used as the vibration damping actuator, the same symbols used in the preceding elements are assigned in the drawings, and no detailed description is provided.

Figure 10:
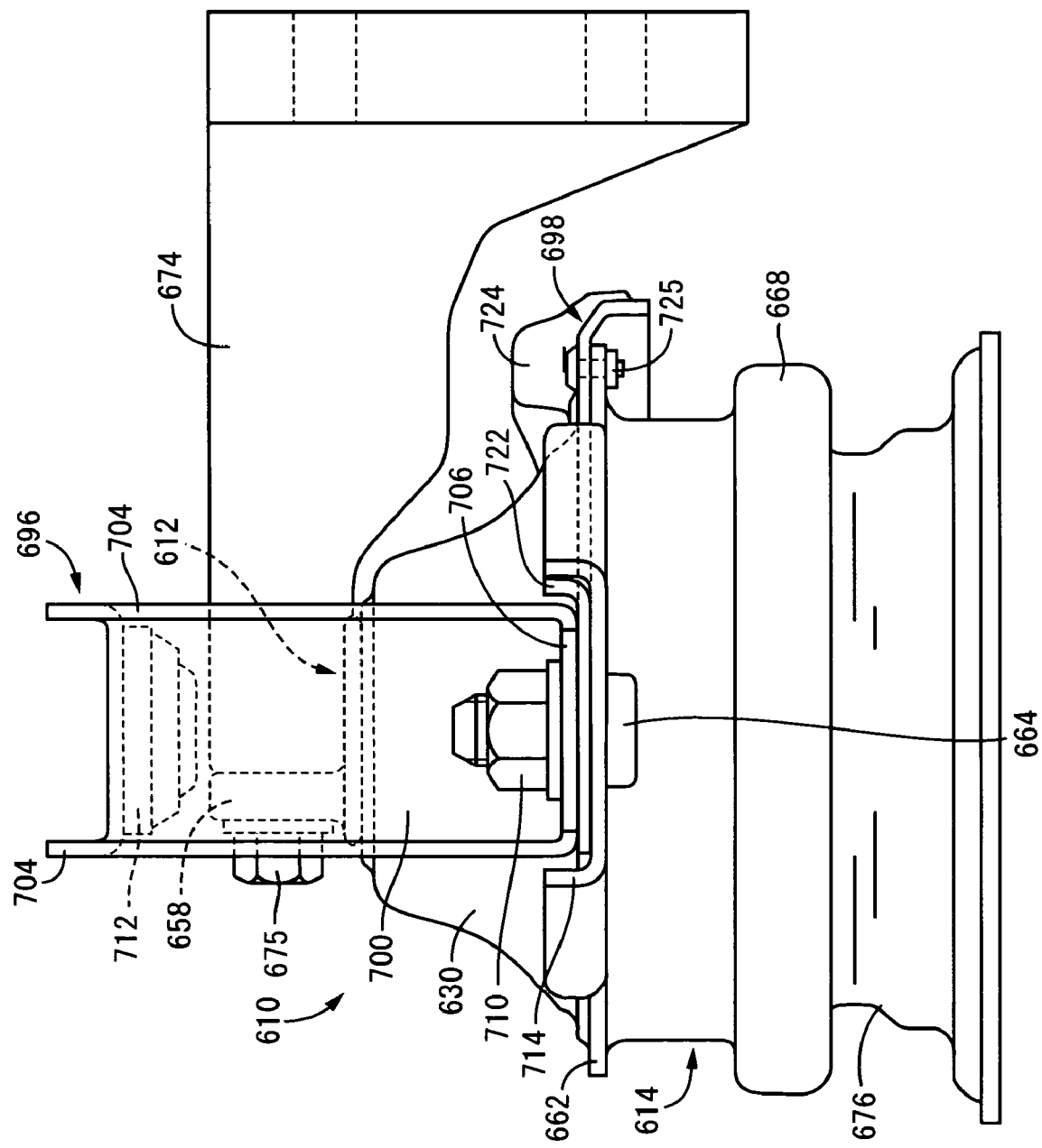
FIG. 10 is a side elevational view of an engine mount constructed according to a fourth embodiment of the invention.
Figure 11:
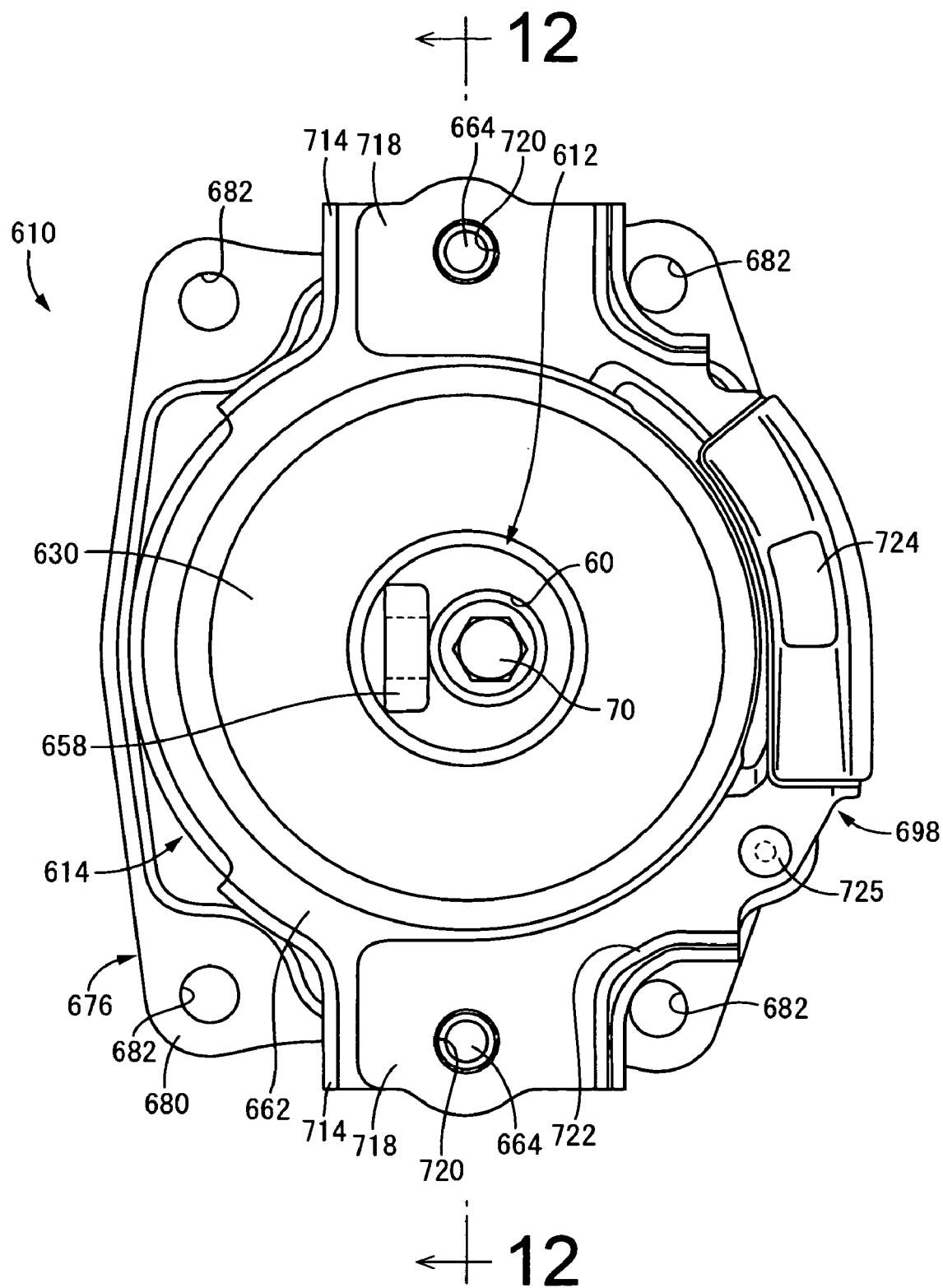
FIG. 11 is a plane view of the engine mount of FIG. 10 where a rebound stop member is removed.
Figure 12:
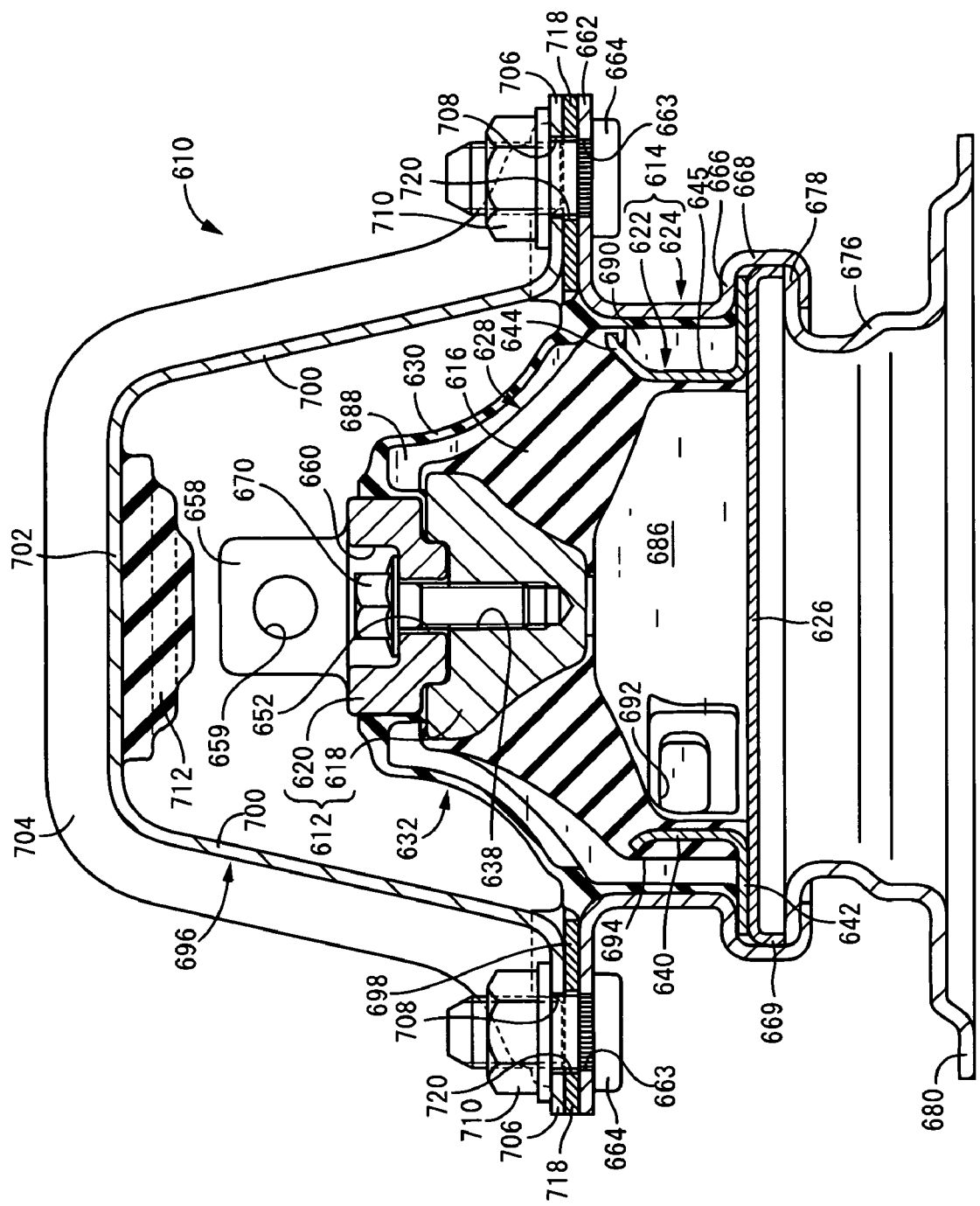
FIG. 12 is a cross sectional view taken along line 12—12 of FIG. 11.
Figure 13:
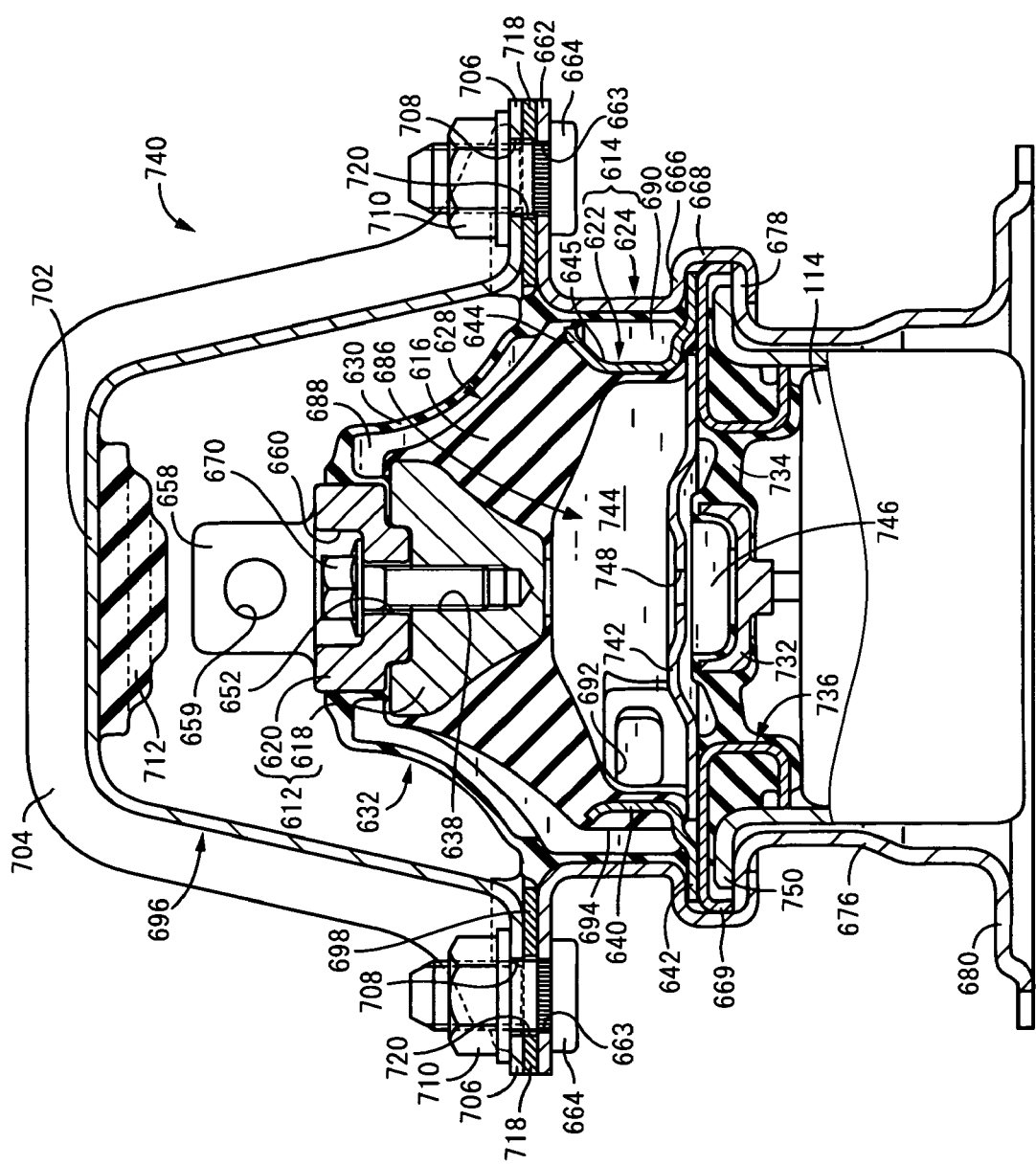
FIG. 13 is an elevational view in axial or vertical cross section of an automotive engine mount constructed according to a third embodiment of the invention.

Referring next to FIGS. 10–13, there is depicted an automobile engine mount 210 by way of a third element of the invention. To aid understanding, FIG. 11 shows the rebound stop member (described later) removed. This engine mount 610 has a structure wherein a first mounting member 612, and a second mounting member 614, are elastically connected by means of a rubber elastic body 616. The first mounting member 612 is mounted to an automobile power unit (not shown), and the second mounting member 614 is mounted to the car body (not shown), so that the power unit is provided with vibration-damped support on the body. In such an installed state, between the first mounting member 612 and second mounting member 614, any shared load of the power unit or principal vibration to be damped will be input on the center axis (the vertical direction in FIGS. 10, 12) in the engine mount 610. In the description hereinbelow, vertical direction refers as a general rule to the vertical direction in FIG. 10.

Described in detail, the first mounting member 612 is composed of an elastic body central member in the form of an elastic body inner member 618, and a rubber layer central member in the form of a diaphragm-side inner member 620. The second mounting member 614 is composed of an elastic body outer member in the form of an elastic body outer sleeve member 622, a rubber layer outer member in the form of a diaphragm-side outer sleeve member 624, and a metallic lid plate 626. The elastic body inner member 618 and the elastic body outer sleeve member 622 are vulcanization bonded to the rubber elastic body 616 to constitute a first integral vulcanization product 628, while the diaphragm-side inner member 620 and the diaphragm-side outer sleeve member 624 are vulcanization bonded to a flexible rubber layer in the form of a diaphragm 630, to constitute a second integral vulcanization product 632. The first and second integral vulcanization products 628, 632 are assembled together.

The elastic body inner member 618 of the first integral vulcanization product 628 has an inverted, generally frustoconical shape. A tapped hole 638 opening onto the upper face is formed in the elastic body inner member 618.

The elastic body outer sleeve member 622 comprises a cylindrical wall portion 640 having a generally large diameter cylindrical shape; at the lower axial end of this cylindrical wall portion 640 is integrally formed a flange portion 642 that spreads outwardly in the diametrical direction. The upper axial end of this cylindrical wall portion 640 constitutes a tapered cylindrical portion 644 that gradually opens out moving upward in the axial direction. With this arrangement, a circumferential groove 645 open on the outer circumferential surface and extending a length just short of one turn in the circumferential direction is formed on the elastic body outer sleeve member 622. Spaced some distance apart above the elastic body outer sleeve member 622, the elastic body inner member 618 is arranged some distance apart but on substantially the same center axis. In this states, the outer peripheral face of the inverted taper of elastic body inner member 618 and the inner circumferential surface of the tapered cylindrical portion 644 in the elastic body outer sleeve member 622 are arranged spaced apart in opposition with one another. The opposed faces of the outer peripheral face of the inverted taper of elastic body inner member 618 and the inner circumferential surface of tapered cylindrical portion 644 are elastically connected by means of the rubber elastic body 616.

The rubber elastic body 616 overall has a large-diameter frustoconical shape, and in the central portion thereof has the elastic body inner member 618 positioned coaxially therewith and vulcanization bonded thereto, while the tapered cylindrical portion 644 of the elastic body outer sleeve member 622 is positioned on and vulcanization bonded to the outer peripheral face of the large diameter end thereof. By means of this arrangement, the rubber elastic body 616 is constituted as the first integral vulcanization product 628 comprising the elastic body inner member 618 and elastic body outer sleeve member 622 as described above.

On the other hand, the diaphragm-side inner member 620, as a part of the second integral vulcanization product 632, has a thick-walled disk shape spreading out in the axis-perpendicular direction, with a bore 652 passing through the generally central portion thereof. At the outer peripheral portion of diaphragm-side inner member 620 a fixing plate portion 658 projects upwardly, and a through hole 659 for a fastening bolt passes through the central portion of fixing plate portion 658. A bolt head housing 660 is formed on the upper face of diaphragm-side inner member 620.

The diaphragm-side outer sleeve member 624 has a thin-walled, large diameter cylindrical shape, at the opening at the axial upper end of which is integrally formed an annular support 662 that spreads out like a flange outwardly in the diametrical direction. The annular support 662 has a pair of through holes 663, 663 bored through its side portions at opposing locations in the diametrical direction, into each of which through holes 663, 663 is forced a fixation bolt 664 that is implanted pointing upward. Additionally, a shoulder portion 666 of the annular disk shape extending diametrically outward is integrally formed at the opening on the axial bottom end of the diaphragm-side outer sleeve member 624, and a cylindrical caulking sleeve portion projecting downward in the axial direction is integrally formed on the outside peripheral edge of the shoulder portion 666.

Spaced some distance apart in the axial direction above the diaphragm-side outer sleeve member 624, the diaphragm-side inner member 620 is arranged on substantially the same center axis, with the diaphragm-side outer sleeve member 624 and diaphragm-side inner member 620 elastically connected by means of the diaphragm 630.

The diaphragm 630 is formed of a thin rubber layer, and in order to permit it to readily undergo elastic deformation, has a generally annular or cylindrical shape extending in the circumferential direction, with a bowed cross section having an appreciable slack. The inside peripheral edge of the diaphragm 630 is bonded by vulcanization to the outside peripheral edge of the diaphragm-side inner member 620, and the outside peripheral edge of the diaphragm 630 is bonded by vulcanization to the opening at the axial upper end of the diaphragm-side outer sleeve member 624.

The second integral vulcanization product 632 is assembled positioned from above onto the aforementioned first integral vulcanization product 628, and the diaphragm-side inner member 620 is fixed to the elastic body inner member 618, while the diaphragm-side outer sleeve member 624 is fixed to the elastic body outer sleeve member 622.

Additionally, the diaphragm 630 is positioned spaced apart outwardly from the rubber elastic body 616 in the diametrical direction, so as to cover the entire outer circumferential surface of the rubber elastic body 616.

That is, the diaphragm-side inner member 620 is positioned directly on the elastic body inner member 618, and a connecting bolt 670 is passed through the bore 652 in the diaphragm-side inner member 620 and threaded into the tapped hole 638 of the elastic body inner member 618, fastening together the two members 620, 618 to produce the first mounting member 612. As shown in FIG. 7, to the first mounting member 612 is attached a first bracket 674 positioned on the upper face of diaphragm-side inner member 620 and extending sideways to one side in the axis-perpendicular direction from fixing plate portion 658, and fastened with fixation bolt 675 passed through through hole 659 in fixing plate portion 658. The first mounting member 612 is then stationarily mounted on an automobile power unit (not shown) via the first bracket 674.

The diaphragm-side outer sleeve member 624 is externally fitted onto the elastic body outer sleeve member 622 from above in the axial direction. At the lower end of the elastic body outer sleeve member 622, the outside peripheral edge of the shoulder portion 666 is positioned over the shoulder portion 666 of the diaphragm-side outer sleeve member 624 in the axial direction. At the upper end, on the other hand, the opening edge of the tapered cylindrical portion 644 is positioned in the diametrical direction with respect to the inner circumferential surface of the diaphragm-side outer sleeve member 624. By caulking the caulking sleeve portion 668 of the diaphragm-side outer sleeve member 624 to the outside peripheral edge of the flange portion 642 of the elastic body outer sleeve member 622, the elastic body outer sleeve member 622 and the diaphragm-side outer sleeve member 624 are assembled by being fixed together. At each of the areas at the upper and lower ends of elastic body outer sleeve member 622 that are positioned on diaphragm-side outer sleeve member 624, there is interposed a seal rubber integrally formed with rubber elastic body 616 or diaphragm 630, providing a fluid tight sealing.

By means of this arrangement, the circumferential groove 645 formed in elastic body outer sleeve member 622 is provided with fluid-tight closure by the diaphragm-side outer sleeve member 624, thereby forming an annular passage that extends a predetermined distance in the circumferential direction between the diametrically opposed faces of the diaphragm-side outer sleeve member 624 and the cylindrical wall portion 640 of the elastic body outer sleeve member 622. Additionally, at the lower end of the elastic body outer sleeve member 622, a metallic lid plate 626 of large-diameter disk shape is positioned, with the outside peripheral edge of metallic lid plate 626 positioned directly in the axial direction on the outside peripheral edge of the flange portion 642 of elastic body outer sleeve member 622. The metallic lid plate 626 is, together with the flange portion 642, caulked by the caulking sleeve portion 668 of the diaphragm-side outer sleeve member 624. By means of this arrangement, the opening at the lower end of the elastic body outer sleeve member 622 is provided with a fluid-tight closure by the metallic lid plate 626.

On the outside peripheral edge of the metallic lid plate 626 is integrally formed an annular press-fit portion 669 that projects downward in the axial direction. Prior to caulking fixation, the annular press-fit portion 669 is press fit into the caulking sleeve portion 668 of the metallic lid plate 626, so that the lower opening of the diaphragm-side outer sleeve member 624 is provided with a fluid-tight closure by the metallic lid plate 626. Locations where the elastic body outer sleeve member 622 and metallic lid plate 626 meet are sealed in fluid-tight fashion through abutment by seal rubber integrally formed with the rubber elastic body 616.

The diaphragm-side outer sleeve member 624 and the elastic body outer sleeve member 622 assembled together in this manner are caulked together to produce the second mounting member 614, which second mounting member 614 is then elastically connected to the first mounting member 612 via the rubber elastic body 616. A second bracket 676 is attached to the lower opening of the second mounting member 614. This second bracket 676 has an overall shape that is generally a large-diameter cylinder. At the opening at the upper axial end of the second bracket 676, there is integrally formed a bracket flange 678 that spreads outwardly in the diametrical direction, and at the opening at the lower axial end thereof is integrally formed a fixation plate 680 that spreads outwardly in the diametrical direction. The second bracket 676 is assembled coaxially with the second mounting member 614 from below in the axial direction, and with respect to the shoulder portion 666 of the diaphragm-side outer sleeve member 624 of the second mounting member 614, is positioned directly on the metallic lid plate 626 and the flange portion 642 of the elastic body outer sleeve member 622 which have been positioned thereat. Together with the flange portion 642 and metallic lid plate 626, the second bracket 676 is then caulked held between the shoulder portion 666 and the caulking sleeve portion 668, and is fixedly attached thereby to the second mounting member 614. With this arrangement, the second bracket 676 projects axially downward from the second mounting member 614, and while not clearly shown in the drawings, is fixedly mounted on the car body, by means of several fastening bolts passed through a plurality of fixation holes 682 provided in the fixation plate 680 that projects from the lower opening.

By providing the lower opening of the second mounting member 614 with fluid-tight closure by means of metallic lid plate 626 as described above, a pressure receiving chamber 686 having non-compressible fluid sealed therein is formed between the opposing faces of the rubber elastic body 616 and metallic lid plate 626. This pressure receiving chamber 686 is partially defined by the rubber elastic body 616, and is designed to receive vibration and give rise to pressure fluctuations on the basis of elastic deformation of the rubber elastic body 616 during vibration input across the first mounting member 612 and the second mounting member 614.

The rubber elastic body 616 and the diaphragm 630 are respectively fastened at the inside peripheral edge and the outside peripheral edge to the first mounting member 612 and the second mounting member 614, thereby forming between the opposing faces of the rubber elastic body 616 and the diaphragm 630 an equilibrium chamber 688 having non-compressible fluid sealed therein. Specifically, this equilibrium chamber 688 is partially defined by the readily deformable diaphragm 630, and is designed to readily allow changes in volume on the basis of elastic deformation of diaphragm 630. As the non-compressible fluid sealed in the pressure receiving chamber 686 and the equilibrium chamber 688, it is typically favorable to use a fluid with viscosity of 0.1 Pa·s or lower, in order to efficiently obtain vibration damping action, based on resonance or flow of the fluid flowing through the orifice passage 690 (described later) in the vibration frequency band required by the engine mount 610 of the vehicle.

To the pressure receiving chamber 686 formed above the rubber elastic body 616 and the equilibrium chamber 688 formed therebelow is connected an annular passage formed inside the second mounting member 614, through communication holes 692, 694 formed at the two circumferential ends of the passage, thereby forming over a predetermined distance an orifice passage 690 through which the pressure receiving chamber 686 and equilibrium chamber 688 communicate with each other, allowing fluid flow between the two chambers 686, 688. As is widely known, flow of fluid through the orifice passage 690 is created by relative pressure fluctuations created between the pressure receiving chamber 686 and equilibrium chamber 688 during vibration input, and thus effective damping action of input vibration is exhibited on the basis of flow action, such as sympathetic vibration, of the fluid. Damping action exhibited on the basis of flow action of fluid caused to flow through the orifice passage 690 can be adjusted in terms of frequency characteristics, by means of tuning the ratio of orifice passage 690 passage cross section to passage length, or the like.

On the other hand, a rebound stop member 696 and a bound stop member 698 are attached, at the upper opening end, to the diaphragm-side outer sleeve member 624 which is part of the second mounting member 614.

The rebound stop member 696 has a generally gate shape overall, obtained by bending a metal plate of predetermined width, and comprises a pair of leg portions 700, 700 as well as an upper wall portion 702 extending generally horizontally. At the two widthwise ends of the rebound stop member 696 are formed a pair of reinforcing ribs 704, 704 extending across the entire length of the pair of leg portions 700, 700 and the upper wall portion 702. The lower ends of the pair of leg portions 700, 700 are bent horizontally to produce flat fixation plate portions 706, 706, with a fixation bore 708 formed in each fixation plate portion 706.

The rebound stop member 696 is positioned on the opening from above the second mounting member 614, arranged straddling, in the diametrical direction, the rubber elastic body 616 that projects from the upper opening of the second mounting member 614, the diaphragm 70, the first mounting member 612, etc. The fixation plate portions 706, 706 at the ends of rebound stop member 696 are positioned on the annular support 662 of the diaphragm-side outer sleeve member 624. With this state, the fixation bores 708, 708 of the fixation plate portions 706, 706 are lined up with through holes 663, 663 formed in the annular support 662, while the fixation bolts 664, 664 implanted in the through holes 663, 663 are passed through the fixation bores 708, 708, and fastened, whereby the fixation plate portions 706, 706 are fixed to the annular support 662 by means of fastening nuts 710, 710.

The rebound stop member 696 is attached in a state of being spaced apart by a predetermined distance to the outside of the rubber elastic body 616, the diaphragm 630, and the first mounting member 612, so as to avoid interfering when the rubber elastic body 616 or the diaphragm 630 undergoes elastic deformation by a predetermined amount. The upper wall portion 702 of rebound stop member 696 is positioned in opposition to the first mounting member 612 spaced apart therefrom in the axial direction. A projecting rebound stop rubber 712 covers the lower face of the upper wall portion 702, which is the face opposed to the first mounting member 612.

By means of this arrangement, there is constituted a stop mechanism in the rebound direction, which is the direction in which the first mounting member 612 moves away from the second mounting member 614 in the direction of principal vibration input. When excessive load is exerted in the rebound direction across the first mounting member 612 and the second mounting member 614 in the mount installed state, the first bracket 674 bolted to the first mounting member 612 is caused to abut the stop member 696 via the rebound stop rubber 712, thereby limiting cushion-wise the amount of displacement in the direction of relative separation of the first mounting member 612 and the second mounting member 614.

On the other hand, the bound stop member 698 has a plate shape that extends in a generally arcuate configuration for a predetermined width in plan view. At the two end portions of the outside peripheral edge are integrally formed reinforcing ribs 714, 714 which project upward. In particular, the two circumferential end portions of the bound stop member 698 constitute wide fixation plate portions 718, 718, with bores 720, 720 being bored in fixation plate portions 718, 718. In the circumferential central portion of bound stop member 698 is integrally formed a reinforcing rib 722 which projects upward at the outside peripheral edge, and a bound stop rubber 724 which projects upward in a state of spreading out up to the outer peripheral face of this reinforcing rib 722 is formed covering the upper face of the bound stop member 698.

The bound stop member 698 is positioned, over a range in excess of halfway around the circumferential direction, on the upper face of the annular support 662 in the diaphragm-side outer sleeve member 624 of the second mounting member 614. In the annular support 662, once the fixation plate portions 718, 788 of the bound stop member 698 have been superposed, the fixation plate portions 706, 706 of the rebound stop member 696 are superposed directly. The fixation bolts 664, 664 implanted in annular support 662 are then passed through the bores 720, 720 of these fixation plate portions 718, 718 and the fixation bores 708, 708 of fixation plate portions 706, 706, and fastening nuts 710, 710 that have been threaded onto the two fixation bolts 664, 664 are tightened, whereby the fixation plate portions 706, 706 of the rebound stop member 696 and the fixation plate portions 718, 718 of the bound stop member 698 are fixed together superposed in fluid-tight state against the annular support 662 over substantially the entire face.

With this arrangement, there is constituted a stop mechanism in the bound direction, which is the direction in which the first mounting member 612 moves closer to the second mounting member 614 in the direction of principal vibration input. When excessive load is exerted in the rebound direction across the first mounting member 612 and the second mounting member 614 in the mount installed state, the first bracket 674 bolted to the first mounting member 612 is caused to abut the bound stop member 698 via the bound stop rubber 724, thereby limiting cushion-wise the amount of displacement in the direction of relative proximity of the first mounting member 612 and the second mounting member 614.

In this embodiment, a through hole is formed at a location in the circumferential central portion of the bound stop member 698, in corresponding areas of the rebound stop member 698 and the annular support 662 of diaphragm-side outer sleeve member 624, and a rivet 725 is installed in the through hole. This rivet 725 is able to temporarily fasten the bound stop member 698 to the annular support 662 with just enough strength to prevent it from becoming detached. By installing the rivet 725 once the bound stop member 698 has been assembled onto the annular support 662, the bound stop member 698 is prevented from coming off in the course of processes up to mounting and bolt fastening of the rebound stop member 696, or when replacing the rebound stop member 696.

The engine mount 610 having the construction described above is installed between the power unit and body of the vehicle in the manner described above, with the first mounting member 612 attached to the power unit via first bracket 614, and with the second mounting member 614 attached to the car body via the second bracket 676. In the installed state, when vibration is input across the first mounting member 612 and the second mounting member 614, fluid flow through the orifice passage 690 is generated on the basis of a pressure differential generated between pressure receiving chamber 686 and equilibrium chamber 688 in association with elastic deformation of rubber elastic body 616, whereby passive vibration damping action is exhibited on the basis of resonance or flow action of the fluid.

During manufacture of the engine mount 610, it is advantageous to assemble the metallic lid plate 626 in the axial direction with the assembled first integral vulcanization product 628 and the second integral vulcanization product 632, and press fit the annular press-fit portion 669 of the metallic lid plate 626 into the caulking sleeve portion 668 of the diaphragm-side inner member 620, while these components are submerged in a mass of non-compressible fluid, in order to seal in the non-compressible fluid at the same time that the pressure receiving chamber 686 and equilibrium chamber 688 are formed. Then the assembly is withdrawn from the non-compressible fluid, and then subjected to a caulking fixation on the sleeve portion 668 in air. Preferably, the rebound stop member 696 having rebound stop rubber 712 and the bound stop member 698 having bound stop rubber 724 are assembled subsequent to caulking.

In order to constitute a rebound stop mechanism and the bound stop mechanism in engine mount 610 having the construction described above, the rebound stop member 696 and the bound stop member 698 that are both formed separately from the second mounting member 614 are employed, fastening these three members superposed in hermetic fashion over a sufficiently large area, whereby the load withstand strength of the stop mechanisms, including the second mounting member 614, can be effectively assured.

Additionally, since the rebound stop rubber constituting part of the rebound stop mechanism and the bound stop rubber constituting part of the bound stop mechanism are each molded by vulcanization separately from both the rubber elastic body 616 and the diaphragm 630, they are not subject to restriction by the rubber elastic body 616 or diaphragm 630, thereby assuring a degree of freedom in terms of selection of rubber material, etc.

The shape and structure of the orifice passage 690 connecting the pressure receiving chamber 686 and the equilibrium chamber 688 may be modified according to the required vibration damping characteristics and the like. For instance, it is possible to form an orifice passage that extends over a length equivalent to the entire way around the circumference or longer, by means of assembling a separate orifice member.

In the engine mount 610 of the embodiment described above, it would be possible to replace the metallic lid plate 626 installed in the lower opening of the diaphragm-side outer sleeve member 624 of the second mounting member 614 with a generally disk-shaped oscillating plate 732. The disk-shaped oscillating plate 732 is elastically supported at its outside peripheral edge, via an annular disk-shaped support rubber 734, on an annular support member 736 that has been caulked to the diaphragm-side outer sleeve member 624. On the other hand, the vibration damping actuator of the present invention, i.e., the electromagnetic oscillator in this embodiment, is arranged axially below the diaphragm-side outer sleeve member 624, so that oscillation of the oscillating plate 732 in the mount center axis direction (vertical direction in the drawing) is actuated by the electromagnetic oscillator 114, in order to impart an active vibration damping mechanism. FIG. 10 shows such an arrangement, with electromagnetic oscillator 114 installed as the vibration damping actuator of the present invention. Here, a partition metal plate 742 is arranged between the opposed faces of the rubber elastic body 616 and the oscillating plate 732. The outside peripheral edge of the partition metal plate 742 is subjected to caulking force while held between the elastic body outer sleeve member 622 and the annular support member 736, whereby the pressure receiving chamber 686 is partitioned into a working chamber 744 and an oscillating chamber 746. This working chamber 744 and oscillating chamber 746 communicate through a communication passage 748 bored through the partition metal plate 742, so that pressure fluctuations produced in oscillating chamber 746 by oscillating actuation of the oscillating plate 732 are transmitted through the communication passage 748 to the working chamber 744. Additionally, the electromagnetic oscillator 114 is mounted to the second mounting member 614 with a flange portion 130 integrally formed on the peripheral edge of the opening of the bottomed cylindrical housing is caulked to the caulking sleeve portion 668, while supported by the caulking sleeve portion 668.

According to the engine mount 610 of the third embodiment of the present invention, oscillation control of the oscillating plate 732 is controlled in the active vibration damping mechanism thereof at frequency and phase corresponding to input vibration. Therefore, pressure in the pressure-receiving chamber 686 can be actively controlled to adjust vibration damping performance of the engine mount 610, thus permitting the engine mount 610 to exhibit good damping performance over a wider frequency range.

Alternatively, the bound stop member may be constructed with an annular plate configuration superposed around the entire circumference on the upper face of the annular support 662 of the diaphragm-side outer sleeve member 624, with the bound stop rubber provided at several locations.

The means for temporarily attaching the bound stop member 698 to the annular support 662 may be means other than the rivet 725, for example, a convex/concave interlocking structure or the like may be employed. Temporary attachment means are not essential to practice the present invention.

The present invention can be similarly applicable to an automotive body mount or member mount, or in a mount, damper, or other vibration damping device in various non-automotive apparatus, or in a vibration damping actuator for use in such a device.

What is claimed is:

1. An active vibration damping mount comprising:
   a first mounting member fixable to one of two members that are mutually connected to make up a vibration transmission system;
   a second mounting member fixable to an other one of the two members;
   a rubber elastic body connecting the first and second mounting members and partially defining a pressure receiving chamber which has a non-compressible fluid sealed therein;

an oscillating member partially defining the pressure receiving chamber; and
an actuator for exerting oscillation force on the oscillating member so that oscillation of the oscillating member is actuated by means of the actuator in order to control pressure in the pressure receiving chamber,
wherein the actuator comprises a vibration damping actuator having:
a cup-shaped housing having a guide hole disposed extending therethrough on a center axis thereof;
an output member disposed spaced apart from an opening end of the housing;
a guide rod disposed on the output member and positioned inserted into the guide hole;
a coil member provided to one of the housing and the output member;
an armature disposed on an other of the housing and the output member, the armature being adapted to exert actuating force on the output member by means of application of electric current to the coil member;
an annular fixing member arranged about the output member with a spacing therebetween;
a support rubber plate disposed in the spacing between the annular fixing member and the output member for elastically connecting the output member to the annular fixing member, an outside peripheral edge of the fixing member being caulked to an rim of an opening of the housing, whereby the output member is supported in an elastically displaceable manner by means of the housing; and
a positioning projection formed at an inside peripheral edge of the fixing member by projecting the inside peripheral edge of the fixing member in cylindrical configuration in an axial direction towards an inside of the housing with a projected distal end thereof being projected in flange configuration toward an outside,
the positioning projection provided for positioning the fixing member relatively in an axis-perpendicular direction with respect to an inner circumferential surface of the housing at a location situated inward by a predetermined distance from the opening of the housing, and
the housing of the vibration damping actuator is fixed to the second mounting member, while the oscillating member constituted by means of the output member of the vibration damping actuator.

2. An active vibration damping mount according to claim 1, further comprising:
a large-diameter caulking sleeve portion integrally formed at an other opening of the second mounting member and providing a shoulder portion;
a lid member including an annular fixing member bonded to an outside peripheral portion of a support rubber plate having an oscillating plate bonded to a central portion thereof, the lid member being disposed at an other opening of the second mounting member, and the fixing member is press-fitted into the caulking sleeve portion, superimposed against the shoulder portion, and fixedly caulked, thereby providing a fluid-tight closure to the other opening of the second mounting member and forming between the rubber elastic body and the lid member a fluid chamber having the non-compressible fluid sealed therein;
a cylindrical base bracket comprising a bracket flange at one opening thereof, the bracket flange being superimposed against the fixing member front an outside of the one opening onto the fixing member, and caulked therewith by means of the caulking sleeve portion, thereby attaching the base bracket to the second mounting member; and
an annular press-fit portion formed by bending an outside peripheral edge of the fixing member towards the base bracket side, with a projecting distal end face thereof being superimposed directly against the outside peripheral face of the bracket flange in the axial direction,
wherein the actuator is disposed to an opposite side of the oscillating plate from the fluid chamber, with the housing of the actuator extending out in a cylindrical configuration toward the fixing member and the housing flange disposed at the opening thereof supported, with caulking force exerted thereon via a compression rubber, while clamped between the fixing member and the bracket flange of the base bracket in the portion located on the inner peripheral side of the annular press-fit portion.

3. An active vibration damping mount according to claim 2, further comprising: an elastic body outer member bonded by vulcanization to an outside peripheral portion of the rubber elastic body, wherein an outside peripheral edge portion of the elastic body outer member is interposed between the shoulder portion of the second mounting member and the fixing member, and caulked by means of the caulking sleeve portion, thereby fastening the outside peripheral edge portion of the rubber elastic body to the second mounting member.

4. An active vibration damping mount according to claim 2, further comprising:
a flexible rubber layer disposed straddling the first mounting member and the second mounting member to the outside of the rubber elastic body;
an equilibrium chamber of variable volume partially defined by flexible rubber layer and having the non-compressible fluid sealed therein, the equilibrium chamber being disposed on an opposite side of the rubber elastic body from the fluid chamber; and
an orifice passage permitting a fluid communication between the fluid chamber and the equilibrium chamber.

5. An active vibration damping mount according to claim 4, further comprising a partition member of smaller diameter than the shoulder portion in the second fixing member, the partition member being disposed accommodated within the fluid chamber; with an outside peripheral edge portion of the partition member being sandwiched between the elastic body outer member and the fixing member and subjected to caulking force via a compression rubber to clamp and support the partition member, thereby partitioning the fluid chamber into a pressure receiving chamber on one side of the partition member partially defined by the rubber elastic body and adapted to gave rise to pressure fluctuations during vibration input, and an oscillating chamber on an other side of the partition member partially defined by the oscillating plate and adapted to be pressure-controlled by means of oscillatory actuation of the oscillating plate, the pressure receiving chamber and the oscillating chamber being held in fluid communication via a pressure transmission passage.

6. An active vibration damping mount according to claim 2, wherein the compression rubber is bonded on and covering a flange-portion-side face of the fixing member at a location a predetermined distance away inwardly from the annular press-fit portion on a face at the flange portion side of the actuator with respect to the fixing member.

7. An active vibration damping mount according to claim 1, wherein the first mounting member is disposed spaced apart from one opening of the second mounting member of generally cylindrical configuration, with the first mounting member and the second mounting member being connected by means of the rubber elastic body to provide fluid-tight closure to the one opening of the second mounting member, while a shoulder portion at an other opening of the second mounting member is disposed to integrally form a caulking sleeve portion, the mount further comprising;

a lid member including an annular fixing member that is press-fit at an outside peripheral edge thereof into the caulking sleeve portion, and superimposed and caulked against the shoulder portion to provide fluid-tight closure to the other opening of the second mounting member, thereby forming between the rubber elastic body and the lid member a fluid chamber in which a non-compressible fluid is sealed;

a cylindrical base bracket disposed at one opening thereof with a bracket flange portion thereof being superimposed against the fixing member from the outside of the other opening of the second mounting member and, together with the fixing member, caulked by means of the caulking sleeve portion to attach the second mounting member; and a stopper fixing projection disposed projecting to an outer peripheral side in the second mounting member, the stopper fixing projection having a stop member bolted thereto for limiting an amount of relative displacement of the first mounting member and the second mounting member, wherein the outside peripheral edge portion of the fixing member is bent towards a base bracket side to form an annular press-fit portion, and a projecting distal end face of the annular press-fit portion is superimposed directly in the axial direction against an outside peripheral edge portion of the bracket flange, while an outer peripheral corner of one of opposite face of the bracket flange remote from the fixing member is subjected to chaffering around an entire circumference in the circumferential direction, over a width dimension smaller than a thickness dimension of the annular press-fit portion.

8. An active vibration damping mount according to claim 7, wherein the lid member has a structure in which the fixing member bonded by vulcanization to an outside peripheral edge portion of a readily deformable, flexible rubber layer, and in the fluid chamber is housed a partition member spreading in a generally axis-perpendicular direction, with an outside peripheral edge portion of the partition member caulked to the second fixing member by means of the caulking sleeve portion, thereby forming to one side of the partition member the pressure receiving chamber, and forming to the other side of the partition member an equilibrium chamber partially defined by the flexible rubber layer and designed to readily allow change in volume, the partition member being utilized to form an orifice passage through which the pressure receiving chamber and the equilibrium chamber are held in fluid communication with each other.

9. An active vibration damping mount according to claim 7, wherein the lid member includes an oscillating plate elastically connected to the fixing member by a support rubber plate, and the actuator that actuates oscillation of the oscillating plate is arranged on an opposite side of the lid member from the fluid chamber, with a cylindrical portion of the housing of the actuator extending towards a lid member side and having a housing flange formed on the opening rim thereof, the housing flange being arranged to an inner peripheral side of the annular press-fit portion of the fixing member, and supported in the axial direction by being clamped via a compression rubber, between the fixing member and the bracket flange of the base bracket.

10. An active vibration damping mount according to claim 9, wherein a partition member extending in the generally axis-perpendicular direction is housed in the fluid chamber, with an outside peripheral edge portion of the partition member caulked to the second fixing member by means of the caulking sleeve portion, thereby forming to one side of the partition member the pressure receiving chamber, and forming to an other side of the partition member an oscillating chamber that is pressure-controlled by means of oscillating action of the oscillating plate, the partition member being utilized to form a pressure transmission passage whereby pressure in the oscillating chamber is exerted on the pressure receiving chamber.

11. An active vibration damping mount according to claim 7, further comprising: an elastic body outer member bonded by vulcanization to an outer peripheral portion of the rubber elastic body, with an outside peripheral edge portion of the elastic body outer member superimposed against the shoulder portion of the second mounting member, and with the partition member and the fixing member sequentially superimposed against the elastic body outer member and caulked thereto by means of the caulking sleeve portion, for supporting an outside peripheral edge of the partition member between the elastic body outer member and the fixing member, at a location spaced apart inwardly in a diametrical direction from the shoulder portion of the second mounting member.

12. An active vibration damping mount according to claim 1, further comprising:

an elastic body central member bonded to a center portion of the rubber elastic body;

an elastic body outer member bonded to an outer peripheral portion of the rubber elastic body;

a rubber-layer central member bonded to a center of a flexible rubber layer disposed so as to cover an exterior of the rubber elastic body; and a rubber layer outer member bonded to an outer peripheral portion of the flexible rubber layer, wherein the elastic body central member and the rubber-layer central member are fixed to each other to constitute the first mounting member, while the elastic body outer member and the rubber layer outer member are fixed to each other to constitute the second mounting member, an equilibrium chamber having non-compressible fluid sealed therein and partially defined by the flexible rubber layer is formed on an opposite side of the rubber elastic body from the pressure receiving chamber, and an orifice passage is formed for permitting fluid communication between the pressure receiving chamber and the equilibrium chamber, wherein an annular support portion is formed by extending the rubber layer outer member to an outer peripheral side thereof, a rebound stop member of gate shape extending across an outside of the first mounting member is laminated and bonded at both basal ends thereof onto the annular support portion by means of a fastening member, wherein a rebound stop rubber is bonded to a face of the rebound stop member opposed to the first mounting member, thereby constituting a rebound stop mechanism for cushion-wise limitation of an extent of elastic deformation of the rubber elastic body in the rebound direction, by means of direct abutment of the first mounting member against the rebound stop rubber, and wherein a bound stop member is superimpose on the annular support portion, and is fastened sandwiched between at least one basal end portion of the rebound stop member and the annular support portion, by means of the fastening member, while a bound stop rubber is bonded to the surface of the bound stop member to thereby constitute a bound stop mechanism for cushion-wise limitation of an extent of elastic deformation of the rubber elastic body in a bound direction, by means of direct or indirect abutment of the first mounting member against the bound stop rubber.

13. An active vibration damping mount according to claim 12, further comprising: a temporary fixing member for temporarily fixing the bound stop member to the annular support portion, in an absence of fixing force by the fastening bolt.

14. An active vibration damping mount according to claim 12, wherein the bound stop member is formed to have a length equal to or greater than a half of a circumference of the annular support portion, and the bound stop member is fixed to the annular support portion by means of the fastening members fixing both base end portions of the rebound stop member.

15. An active vibration damping mount according to claim 12, wherein the rubber layer outer member has a generally cylindrical shape, and is externally fitted onto the elastic body outer member, and the orifice passage is formed so as to extend in a circumferential direction between the elastic body outer member and the rubber layer outer member, while the annular support portion is integrally formed at one axial opening of the rubber layer outer member, and a closure member is superimposed onto an other axial opening, and caulked at an outside peripheral edge thereof, together with an outside peripheral edge of the elastic body outer member, to the other opening of the rubber layer outer member so as to close the opening of the elastic body outer member in fluid-tight fashion.

16. An active vibration damper adapted to be installed on a member whose vibration to be damped, in order to exert oscillating force on the member for producing active vibration damping action, comprising:
   a vibration damping actuator constructed having:
   a cup-shaped housing having a guide hole disposed extending therethrough on a center axis thereof;
   an output member disposed spaced apart from an opening end of the housing;
   a guide rod disposed on the output member and positioned inserted into the guide hole;
   a coil member provided to one of the housing and the output member;
   an armature disposed on an other of the housing and the output member, the armature being adapted to exert actuating force on the output member by means of application of electric current to the coil member;
   an annular fixing member arranged about the output member with a spacing therebetween;
   a support rubber plate disposed in the spacing between the annular fixing member and the output member for elastically connecting the output member to the annular fixing member, an outside peripheral edge of the fixing member being caulked to an rim of an opening of the housing, whereby the output member is supported in an elastically displaceable manner by means of the housing; and
   a positioning projection formed at an inside peripheral edge of the fixing member by projecting the inside peripheral edge of the fixing member in cylindrical configuration in an axial direction towards an inside of the housing with a projected distal end thereof being projected in flange configuration toward an outside,
   the positioning projection provided for positioning the fixing member relatively in an axis-perpendicular direction with respect to an inner circumferential surface of the housing at a location situated inward by a predetermined distance from the opening of the housing;
   a mount portion for fixation to the vibration-damper member disposed in one of the housing and the output member in the vibration damping actuator; and
   a mass portion disposed on an other of the housing and the output.

17. An active vibration damping mount according to claim 1, wherein the vibration damping actuator further comprises: a compression rubber bonded on the fixing member, and compressed between the fixing member and the housing in the axial direction.

18. An active vibration damping mount according to claim 1, wherein in the vibration damping actuator, the compression rubber abuts the housing in the axis-perpendicular direction at a location further inward from the opening of the housing so that clamping force is exerted on the compression rubber in the axial direction and the axis-perpendicular direction between the fixing member and the housing.

19. An active vibration damping mount according to claim 1, wherein in the vibration damping actuator, a housing flange is formed on the rim of the opening of the housing, and an outside peripheral edge of the fixing member is placed over the housing flange, with a overlapped portion of the flange portion and the fixing member being caulked by means of a caulking member which is separate from both the housing flange and the fixing member.

* * * * *